(12) United States Patent  (10) Patent No.: US 8,947,382 B2
Winkler et al.  (45) Date of Patent: Feb. 3, 2015

(54) WEARABLE DISPLAY DEVICE, CORRESPONDING SYSTEMS, AND METHOD FOR PRESENTING OUTPUT ON THE SAME

(75) Inventors: David P. Winkler, Palatine, IL (US); Michael J. Erpenbeck, Gurnee, IL (US); John C. Johnson, Spring Grove, IL (US)

(73) Assignee: Motorola Mobility LLC, Libertyville, IL (US)

( * ) Notice: Subject to any disclaimer, the term of this patent is extended or adjusted under 35 U.S.C. 154(b) by 144 days.

(21) Appl. No.: 13/407,026

(22) Filed: Feb. 28, 2012

(65) Prior Publication Data

US 2013/0222270 A1  Aug. 29, 2013

(51) Int. Cl.
*G06F 3/041* (2006.01)

(52) U.S. Cl.
USPC .......................................... 345/173; 345/156

(58) Field of Classification Search
USPC ..................... 345/156–184; 455/575.1–575.9
See application file for complete search history.

(56) References Cited

U.S. PATENT DOCUMENTS

| | | | |
|---|---|---|---|
| 5,625,697 A | 4/1997 | Bowen et al. | |
| 5,872,744 A | 2/1999 | Taylor | |
| 5,889,737 A | 3/1999 | Alameh et al. | |
| 5,898,161 A | 4/1999 | DeVita et al. | |
| 5,912,721 A | 6/1999 | Yamaguchi et al. | |
| 6,095,984 A | 8/2000 | Amano et al. | |
| 6,115,025 A | 9/2000 | Buxton et al. | |
| 6,151,208 A | 11/2000 | Bartlett | |
| 6,154,214 A | 11/2000 | Uyehara et al. | |
| 6,216,490 B1 | 4/2001 | Radley-Smith | |
| 6,281,872 B1 | 8/2001 | Cariffe | |
| 6,285,757 B1 | 9/2001 | Carroll et al. | |
| 6,329,986 B1 * | 12/2001 | Cheng ............................ | 345/419 |
| 6,525,997 B1 | 2/2003 | Narayanaswami et al. | |
| 6,556,222 B1 | 4/2003 | Narayanaswami | |
| 6,661,406 B1 | 12/2003 | Enoki | |

(Continued)

FOREIGN PATENT DOCUMENTS

| | | |
|---|---|---|
| EP | 1396984 A1 | 3/2004 |
| EP | 1655931 A1 | 5/2006 |

(Continued)

OTHER PUBLICATIONS

Pcmac.com, "Nike+FuelBand turns Life into Exercise", Feb. 23, 2012, 4 pages, http://www.pcmag.com/article2/0,2817,2399096,00.asp.

(Continued)

*Primary Examiner* — Gene W Lee
(74) *Attorney, Agent, or Firm* — Shumaker & Sieffert, P.A.

(57) ABSTRACT

An electronic device can include detectors for altering the presentation of data on one or more displays. In a wearable electronic device, a flexible housing can be configured to enfold about an appendage of a user, such as a user's wrist. A display can disposed along a major face of the flexible housing. A control circuit can be operable with the display. A gaze detector can be included to detect a gaze direction, and optionally a gaze cone. An orientation detector can be configured to detect an orientation of the electronic device relative to the user. The control circuit can alter a presentation of data on the display in response to a detected gaze direction, in response to detected orientation of the wearable electronic device relative to the user, in response to touch or gesture input, or combinations thereof. Secondary displays can be hingedly coupled to the electronic device.

9 Claims, 34 Drawing Sheets

(56) References Cited

U.S. PATENT DOCUMENTS

| | | | |
|---|---|---|---|
| 6,788,621 B2 | 9/2004 | Meylan et al. | |
| 6,882,335 B2 | 4/2005 | Saarinen | |
| 6,950,685 B2 | 9/2005 | Barras et al. | |
| 6,977,868 B2 | 12/2005 | Brewer et al. | |
| 6,982,728 B1 | 1/2006 | Nicolas et al. | |
| 7,184,025 B2 | 2/2007 | Williams et al. | |
| 7,331,929 B2 | 2/2008 | Morita et al. | |
| 7,460,150 B1 | 12/2008 | Coughlan et al. | |
| 7,535,481 B2 | 5/2009 | Dehlin | |
| 7,784,366 B2 | 8/2010 | Daverman et al. | |
| 7,814,419 B2 | 10/2010 | Fabritius | |
| 7,844,301 B2 | 11/2010 | Lee et al. | |
| 7,874,983 B2 | 1/2011 | Zancho et al. | |
| 7,999,789 B2 | 8/2011 | Ha et al. | |
| 8,031,212 B2 | 10/2011 | Nicolas et al. | |
| 8,082,003 B2 | 12/2011 | Jee | |
| 8,279,716 B1 | 10/2012 | Gossweiler, III et al. | |
| 8,493,390 B2 | 7/2013 | Kalinli | |
| 8,541,745 B2 | 9/2013 | Dickinson et al. | |
| 8,543,168 B2 | 9/2013 | Zurek et al. | |
| 2001/0011993 A1 | 8/2001 | Saarinen | |
| 2002/0097227 A1 | 7/2002 | Chu et al. | |
| 2003/0184525 A1 | 10/2003 | Tsai | |
| 2004/0203414 A1* | 10/2004 | Satou et al. | 455/66.1 |
| 2005/0141788 A1 | 6/2005 | Ikeda et al. | |
| 2005/0276164 A1 | 12/2005 | Amron | |
| 2005/0285845 A1 | 12/2005 | Dehlin | |
| 2006/0026536 A1 | 2/2006 | Hotelling et al. | |
| 2006/0073891 A1 | 4/2006 | Holt | |
| 2006/0192775 A1* | 8/2006 | Nicholson et al. | 345/211 |
| 2006/0209218 A1 | 9/2006 | Lee et al. | |
| 2006/0256083 A1 | 11/2006 | Rosenberg | |
| 2007/0020880 A1 | 1/2007 | Mukai et al. | |
| 2007/0078552 A1 | 4/2007 | Rosenberg | |
| 2007/0162922 A1 | 7/2007 | Park | |
| 2007/0182665 A1 | 8/2007 | Tanaka et al. | |
| 2007/0195105 A1 | 8/2007 | Koberg | |
| 2007/0216647 A1 | 9/2007 | Yuan et al. | |
| 2007/0220444 A1 | 9/2007 | Sunday et al. | |
| 2008/0026791 A1 | 1/2008 | Kim et al. | |
| 2008/0204418 A1 | 8/2008 | Cybart et al. | |
| 2008/0294019 A1 | 11/2008 | Tran | |
| 2009/0051649 A1 | 2/2009 | Rondel | |
| 2009/0088230 A1* | 4/2009 | Park | 455/575.6 |
| 2009/0239591 A1 | 9/2009 | Alameh et al. | |
| 2009/0259968 A1 | 10/2009 | Hsieh et al. | |
| 2009/0295731 A1 | 12/2009 | Kim et al. | |
| 2009/0318779 A1 | 12/2009 | Tran | |
| 2010/0029327 A1 | 2/2010 | Jee | |
| 2010/0029343 A1 | 2/2010 | Pei | |
| 2010/0053867 A1 | 3/2010 | Ellis et al. | |
| 2010/0066667 A1 | 3/2010 | MacDougall et al. | |
| 2010/0079508 A1* | 4/2010 | Hodge et al. | 345/697 |
| 2010/0156676 A1 | 6/2010 | Mooring et al. | |
| 2010/0171697 A1 | 7/2010 | Son et al. | |
| 2010/0222111 A1* | 9/2010 | Suetake | 455/566 |
| 2010/0250985 A1 | 9/2010 | Gupta | |
| 2011/0003665 A1 | 1/2011 | Burton et al. | |
| 2011/0043496 A1 | 2/2011 | Ray Avalani | |
| 2011/0086680 A1 | 4/2011 | Kim et al. | |
| 2011/0187681 A1 | 8/2011 | Kim et al. | |
| 2012/0177953 A1 | 7/2012 | Bhardwaj et al. | |
| 2012/0272179 A1* | 10/2012 | Stafford | 715/781 |
| 2012/0300061 A1 | 11/2012 | Osman et al. | |
| 2013/0059185 A1 | 3/2013 | Whitacre et al. | |
| 2013/0089218 A1 | 4/2013 | Kishinami et al. | |
| 2013/0120459 A1 | 5/2013 | Dickinson et al. | |
| 2013/0141518 A1* | 6/2013 | Chou | 348/14.08 |
| 2013/0222270 A1 | 8/2013 | Winkler et al. | |
| 2013/0222271 A1 | 8/2013 | Alberth et al. | |
| 2013/0281164 A1 | 10/2013 | Alameh et al. | |
| 2013/0321265 A1* | 12/2013 | Bychkov et al. | 345/156 |
| 2013/0321271 A1* | 12/2013 | Bychkov et al. | 345/158 |
| 2014/0028548 A1* | 1/2014 | Bychkov et al. | 345/156 |
| 2014/0043452 A1 | 2/2014 | Ehrlacher | |

FOREIGN PATENT DOCUMENTS

| | | |
|---|---|---|
| EP | 2150031 A1 | 2/2010 |
| EP | 2357548 A2 | 8/2011 |
| GB | 2318945 A | 5/1998 |
| GB | 2327012 A | 1/1999 |
| GB | 2390259 A | 12/2003 |
| JP | 4049943 A | 2/1992 |
| WO | 0025193 A2 | 5/2000 |
| WO | 2005003954 A2 | 1/2005 |
| WO | 2006120211 A1 | 11/2006 |
| WO | 2007005506 A1 | 1/2007 |
| WO | 2007069116 A2 | 6/2007 |
| WO | 2012011255 A1 | 1/2012 |

OTHER PUBLICATIONS

Akira Tomono, et al, "Attempt of Pupil Extraction and Gaze Detector Permitting Head Movements", Transaction of Institute of Electronics and Communication Engineers of Japan (D) vol. J76-D-II, No. 3, pp. 636-646 (1993).

Shumeet Baluja and Dean Pomerleau, "Non-Intrusive Gaze Tracking Using Artificial Neural Network", Advances in Neural Information Processing Systems 6 Cowan J.D. Tesauro, G. &Alspector, J.(eds) Morgan Kaufman Publishers, 1994.

Timothy Dickinson, et al, "Display Device, Corresponding Systems, and Methods for Orienting Output on a Display", U.S. Appl. No. 13/297,965, filed Nov. 16, 2011, pp. 113.

Timothy Dickinson and Rachd M. Alameh, "Mehods and Devices or Clothing Deection about a Wearable Electronic Device", U.S. Appl. No. 13/297,952, filed Nov. 16, 2011, 72 pages.

Robert A. Zurek, et al, "A Portable Electronic Device" U.S. Appl. No. 12/967,208, filed Dec. 14, 2010, 29 pages.

William P. Alberth, et al, "Methods and Apparatuses for Operating A Display in an Electronic Device", Feb. 28, 2012, 101 pages, U.S. Appl. No. 13/407,116.

Patent Cooperation Treaty, "PCT Search Report and Written Opinion of the International Searching Authority" for International Application No. PCT/US2013/023527 dated Oct. 7, 2013, 19 pages.

Makki, "Beam Steering Engine for a Two-Dimensional Microphone Array" University of Windsor, Local Seminar 1, Feb. 6, 2004, 19 pages.

Datev Interact, 2009, Microsoft, 4 pages.

Patent Cooperation Treaty, "PCT Search Report and Written Opinion of the International Searching Authority" for International Application No. PCT/US2013/023419 dated Oct. 9, 2013, 20 pages.

United States Patent and Trademark Office, "Non-Final Rejection" for U.S. Appl. No. 13/407,116 dated Nov. 7, 2013, 12 pages.

United States Patent and Trademark Office, "Non-Final Rejection" for U.S. Appl. No. 13/297,965 dated Oct. 30, 2013, 11 pages.

Maleki et al., "Segmented Energy Storage Assembly" U.S. Appl. No. 13/915,771, filed Jun. 12, 2013.

International Preliminary Report on Patentability for International Application No. PCT/US2013/023419, mailed Sep. 12, 2014, 15 pages.

* cited by examiner

WEARABLE DISPLAY DEVICE, CORRESPONDING SYSTEMS, AND METHOD FOR PRESENTING OUTPUT ON THE SAME

BACKGROUND

1. Technical Field

This invention relates generally to electronic devices, and more particularly to wearable electronic devices.

2. Background Art

Electronic devices, such as mobile telephones, smart phones, gaming devices, multimedia devices, portable computers, and the like, present information to users on a display. As these devices have become more sophisticated, so too have their displays. For example, not too long ago a mobile phone included only a rudimentary light emitting diode display capable of only presenting numbers and letters configured as seven-segment characters. Today, high-resolution liquid crystal and other types of displays, which are included with many portable electronic devices, have sufficient resolution to render high-definition video.

The display output is generally oriented so as to be aligned with geometric configuration of the overall device. Said differently, many electronic devices have an identifiable top and bottom. Display output is aligned in a complementary manner, with the top of the display output appearing towards the identifiable top of the device, and the bottom of the display output being aligned with the bottom of the device. Some devices even allow the display output to be rotated. For example, some devices have a gravity detector that is configured to rotate the output based on a detected gravitational field. Thus, as the device is rotated, the "top" of the output always stays above the bottom of the output.

While rotating display output based on gravity can be useful, it fails to provide suitable display output alignment in all situations. It would be advantageous to have an improved display device with improved display orientation capabilities

Figure 1:
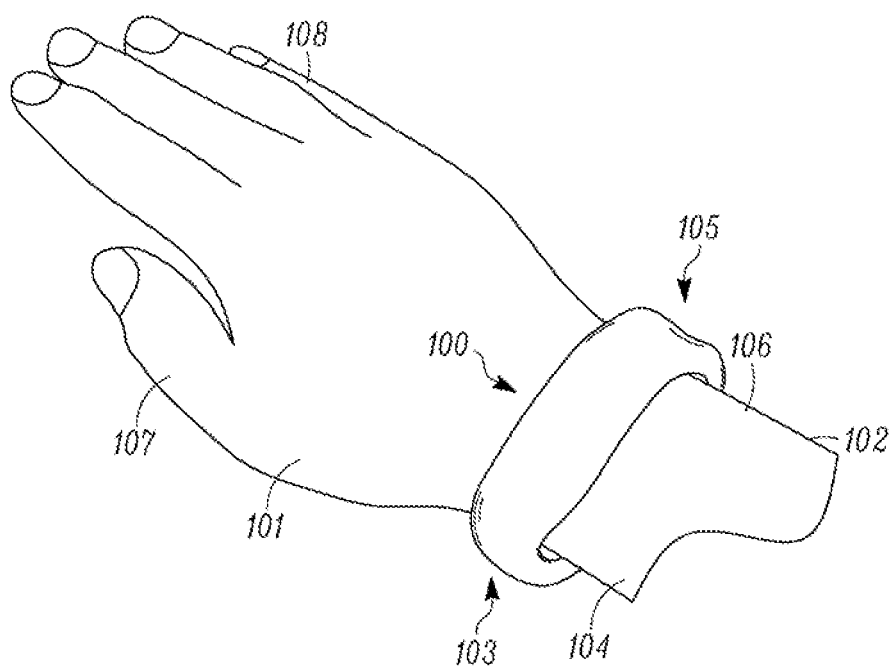
FIG. 1 illustrates one explanatory wearable electronic device configured in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to altering a presentation orientation of visual indicia on a display in response to user gaze, detection, and/or input. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of altering presentation orientations of data presented on a display as described herein. The non-processor circuits may include, but are not limited to, a radio receiver, a radio transmitter, signal drivers, clock circuits, power source circuits, gesture detectors, touch-sensitive devices, gaze detectors, and user input devices. As such, these functions may be interpreted as steps of a method to perform presentation orientation alteration and reversion. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

From an electrical perspective, embodiments described below provide an electronic device having a dynamic display system. The display system is suitable for integration into an electronic device, and is configured to alter a presentation orientation of visual output, prioritize display portions, render images, and so forth. For ease of discussion, one explanatory electronic device used in the figures is a wearable electronic device configured as a wristwatch, strap, or bracelet. However, it will be clear to those of ordinary skill in the art having the benefit of this disclosure that the display systems, control circuits, and associated modules used to alter the presentation orientation, prioritize displays, or otherwise reconfigured the electronic device could be integrated into any of a number of portable electronic devices, including mobile telephones, personal digital assistants, smart phones, palm-top computers, tablet devices, portable computers, and so forth.

The display is configured to present visual output having a presentation orientation. The presentation orientation refers to how the visual output is oriented on the display relative to the user, as well as where the visual output is located on the display. In some embodiments, the presentation orientation is configured in response to a detected user's gaze. In other embodiments, the presentation orientation is configured in response to a detected orientation of the electronic device relative to the user's head, body, or torso. A control circuit that is operable with the display is configured to alter the presentation orientation in response to user input, detected gaze direction, orientation of the device relative to the user, and so forth.

In some embodiments, the display is further responsive to touch. For example, if the display is a touch sensitive display, the user may swipe a finger or stylus across the display to further alter the presentation orientation on the display. For instance, a user may be holding a tablet-style computer horizontally, with the user's body located on a first side of the tablet-style computer. An orientation detector in the device may be configured to detect an orientation of the device relative to the user's torso, and may accordingly present data on the display so it is "right side up" for the user. However, a friend may be standing near the tablet-style computer, with the friend's body being positioned on a second side of the tablet-style computer opposite the first side. When the user wants to show a picture being presented as visual output from the display to the friend that has a "correct" presentation orientation for the friend, the user may make a rotating motion along the display to rotate the picture such that the top of the picture, initially disposed towards the friend, rotates 180 degrees to be nearer the user. In response to this user input, the control circuit alters the presentation orientation from the initial orientation to a second orientation, which is rotated 180 degrees from the initial orientation. As an alternative to the rotating motion, in another embodiment, the user may move a finger or stylus in a linear direction across the display, beginning from a position closer to the user and ending at a position nearer the friend to alter the presentation orientation from the initial orientation to the second orientation.

When the device is a wearable electronic device, it is contemplated that a user would benefit from an easy method to alter the presentation orientation without providing specific, intentional gesture or touch input. To with, suppose a user is wearing a wearable electronic device on a wrist like a bracelet. Now suppose that the user needs to show another person information presented on the display, such as a picture, message, phone number, or other data. Ordinarily, the user may have to either remove the wearable electronic device or to contort their arm and/or wrist in an awkward manner. To remedy this situation, embodiments of the invention include gaze detectors, orientation detectors, or combinations thereof that to prioritize one or more portions of the display in response to a detected orientation of the wearable electronic device relative to the user and/or alter a presentation of data on the display in response to a detected gaze direction. These components allow a user to quickly and easily see information, as well as show it to others, without the need of performing awkward contortions. Where multiple displays or multiple portions of a single display are present on the wearable electronic display, embodiments of the invention provide methods and systems for prioritizing those displays or portions so that more prioritized portions present data more relevant to a user. Other, less prioritized portions can present less prioritized information or can be turned OFF.

Several different features are described in the specification below. These features can be integrated into an electronic device alone or in combination. For example, in one embodiment, a wearable electronic device includes a flexible housing configured to enfold about an appendage of a user and a display disposed along a major face of the flexible housing. A gaze detector is then operable with a control circuit. The control circuit is then configured to alter a presentation of data on the display in response to a detected gaze direction. The control circuit can be configured to determine a gaze cone corresponding to the detected gaze direction and, in one embodiment, alter the presentation of the data by presenting the data on a portion of the display disposed within the gaze cone. The alteration of the presentation can occur by rotating the data based upon the detected gaze direction, moving the data on the display based upon the detected gaze direction, combinations thereof, or other factors. The rotation can be continuous, in which the data rotates smoothly like a needle on a compass in one embodiment. In other embodiments, the rotation can be discrete, with rotational regions or zones being in predefined increments, such as 5, 10, or 15 degrees, with the rotation between regions being when the user crosses a certain threshold, such as moving at least 5 degrees when the predefined increment is 10 degrees, and so forth. Where the display is touch-sensitive, the control circuit can be further configured to additionally alter the presentation of the data in response to touch input along the touch sensitive display. The additional alteration can be in conjunction with the detected gaze detection presentation in one embodiment, or in another embodiment can override alteration of the presentation of the data on the display in response to the detected gaze direction.

In another embodiment, a wearable electronic device comprises a flexible housing configured to enfold about an appendage of a user and a display disposed along a major face of the flexible housing. An orientation detector, which can be an imaging device, an infra-red sensor, an acoustic sensor, or other sensor, is configured to determine a location of the wearable electronic device relative to the user. Other orientation detectors can include accelerometers, thermal sensors, gyroscopes, or combinations thereof. The orientation detector can determine the relative location of the user by detecting the location of the user's torso, head, or by detecting gestures to determine upon what appendage the wearable electronic device is being worn. A control circuit, operable with the display and the orientation detector, is then configured to prioritize one or more portions of the display in response to a detected orientation of the wearable electronic device relative to the user.

Once prioritized, the control circuit can be configured to treat more prioritized portions and less prioritized portions differently. For example, in one embodiment the control circuit is operable to configure a more prioritized portion of the display with a first appearance and a less prioritized portion of the display with a second appearance. The first appearance and second appearance can be the same, or can be different. For instance, the first appearance can be the more prioritized portion of the display being ON, while the second appearance can be the less prioritized portion of the display being in a low power, sleep, or OFF mode. In another embodiment, the first appearance can correspond to a first operational mode of the wearable electronic device, such as an email presentation mode, while the second appearance corresponds to a second operational mode of the wearable electronic device, such as a music player mode. Where the device is worn on the wrist, radially disposed portions of the display can prioritized above ulnarly disposed portions of the display such that those disposed above the radius, i.e., towards the user, are prioritized above those disposed above the ulna.

If the wearable electronic device includes both a gaze detector and orientation detector, the control circuit can also be configured to determine a detected gaze direction of the user and optionally to determine a gaze cone corresponding to the detected gaze direction. The control circuit can then prioritize portions of the display disposed within the gaze cone as a more prioritized portions of the display and to prioritize other portions of the display disposed outside the gaze cone as less prioritized portions of the display.

The control circuit can present data only in the more prioritized portions of the display. If the display comprises a segmented display having a plurality of individual display devices, a more prioritized portion of the display can be a first display device of the segmented display, while a less prioritized portion of the display is at least a second display device.

In yet another embodiment, a wearable electronic device includes a wearable housing, a display disposed along a major face of the wearable housing, an orientation detector, and a control circuit, operable with the display and the orientation detector. In this embodiment, the control circuit is configured to activate one or more portions of the display in response to a detected orientation and deactivate other portions of the display in response to the detected orientation. Accordingly, those facing away from—or otherwise less visible to—the user can be turned OFF or placed into a low-power mode to conserve energy. Where represented as a method, the control circuit can be configured to execute code stored in a non-transitory computer readable medium to detect to which side of the wearable electronic device a user is disposed and actuate or activate portions of the display facing the user. Optionally, portions facing away from the user can be turned OFF or otherwise deactuated or deactivated.

Other embodiments of the invention provide other features. For example, a wearable electronic device can include a wearable housing, a display disposed along a major face of the wearable housing, a communication circuit, and a control circuit, operable with the display and the communication circuit. The control circuit can be configured to receive a display image via the communication circuit and then render the display image as a background image on the display. Accordingly, the user can configure the wearable electronic device to appear as having different colors, patterns, and so forth. These patterns and colors can be changed to match the person's wardrobe or state of mind In some embodiments, the control circuit can be configured to change the background image when a predetermined criterion is met. Examples of predetermined criteria causing the display presentation to change include the expiration of a timer, the detected mood of a wearer, and/or the detected health condition of a wearer. Where the display is touch sensitive, the control circuit can be configured to change presentation when an object touches the display.

In one mechanically changeable embodiment, the wearable electronic device includes a primary display disposed along a major face of the wearable housing that is configured to alter a physical geometry as the wearable housing bends or flexes. A secondary display can then be coupled to the wearable housing by a hinged connection so as to be rotatable relative to the wearable housing to an opened, angularly-displaced orientation. The hinged connection can be preloaded with a tensioning device configured to open the secondary display from the first orientation to the second, angularly displaced orientation. Optionally, the hinged connection can further include a retaining device configured to oppose preloading of the tensioning device to retain the secondary display in the first orientation.

In another embodiment, the hinged connection can include a motor configured to automatically open the secondary display from the first orientation to the second, angularly displaced orientation. The motor can be configured to open the secondary display from the first orientation to the second, angularly displaced orientation in response to a device event, such as an incoming telephone call or text message. The control circuit can be configured to display data with either continuity between the primary display and the secondary display, such as when the secondary display is in the first orientation, or alternatively to display data with discontinuity between the primary display and the secondary display when the secondary display is in the second, angularly displaced orientation.

Turning now to FIG. 1, illustrated therein is a user 101 wearing an illustrative wearable electronic device 100 configured in accordance with one or more embodiments of the invention. As shown in FIG. 1, the wearable electronic device 100 is configured as a bracelet, with a flexible housing that is configured to enfold about an appendage 102 of the user 101. The illustrative wearable electronic device 100 of FIG. 1 resembles a bracelet, as the appendage 102 about which the wearable electronic device 100 is wrapped is the wrist. The wearable electronic device 100 in this configuration has "radially" disposed portions 103 that are disposed atop the radius 104 of the wrist, and thus closer to the thumb 107, and "ulnarly" disposed portions 105 that are disposed atop the ulna 106, and thus closer to the little finger 108. When the user 101 holds his arm horizontally, the radially disposed portions 103 will be facing the user 101, while the ulnarly disposed portions 105 will be disposed away from the user 101.

As will be shown in subsequent figures, the wearable electronic device 100 in one embodiment includes a display. The display can be continuous or segmented. One example of a continuous display suitable for use with the wearable electronic device 100 is a continuous, flexible, organic light emitting diode display. Such a display can be disposed along a major face of the flexible housing, and is capable of altering its physical geometry as the wearable housing bends or flexes.

Figure 2:
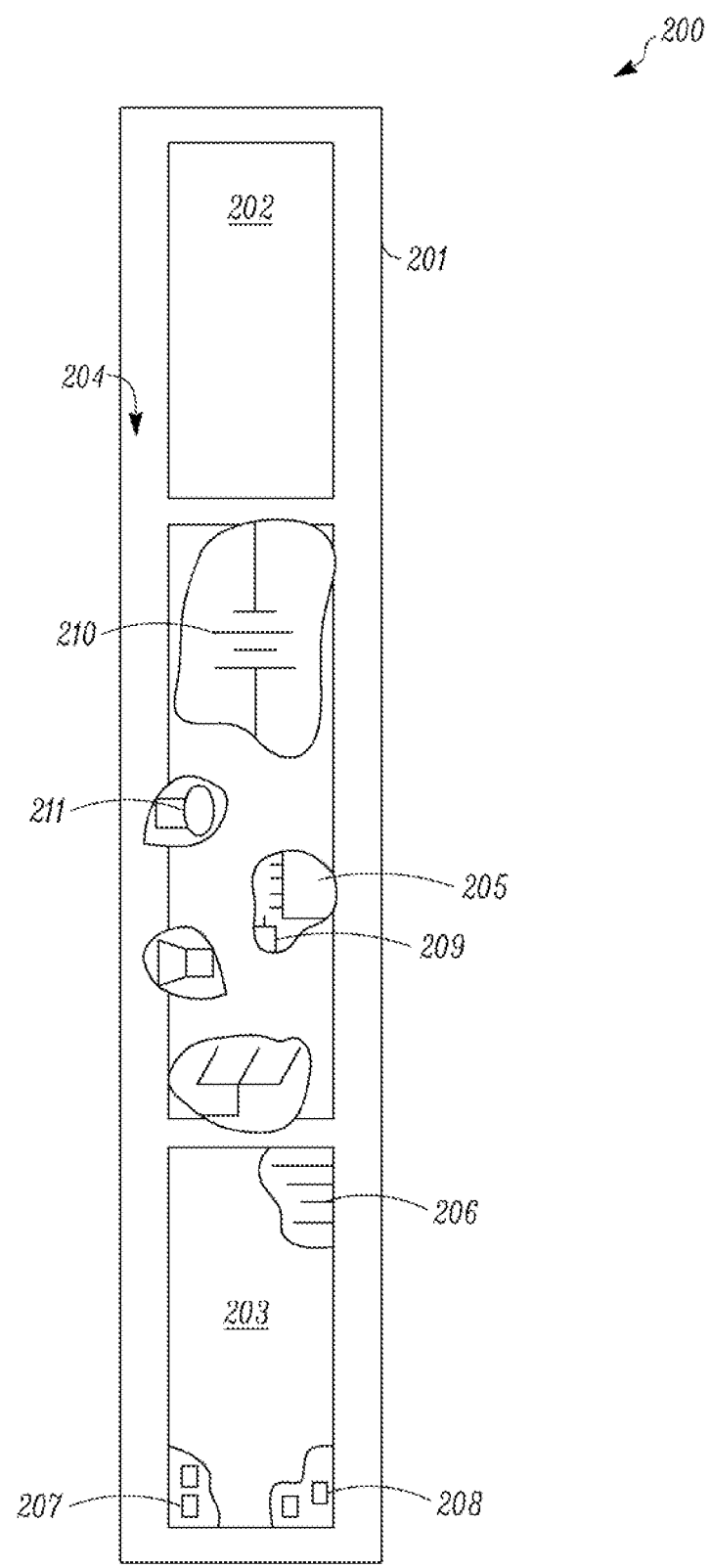
FIG. 2 illustrates a cut-away view of one explanatory wearable electronic device configured in accordance with one or more embodiments of the invention.

Turning now to FIG. 2, illustrated therein is a cut-away view of one illustrative wearable electronic device 200 configured in accordance with one or more embodiments of the invention. The wearable electronic device 200 is referred to as an "active strap" because it includes electronic circuitry and power sources for that circuitry. Moreover, it is configured to resemble a traditional watchstrap. As will be shown in subsequent figures, the wearable electronic device 200 can include other electronic devices that attach to the wearable electronic device 200. In the illustrative embodiment of FIG. 2, the wearable electronic device 200 is configured to resemble a strap or bracelet rather than a conventional wristwatch. As will be shown and described, the wearable electronic device 200 can be configured as a communication device, a personal digital assistant, a health monitoring device, an exercise-monitoring device, a gaming device, a media player, or any number of other devices. It will be clear to those of ordinary skill in the art having the benefit of this disclosure that the wearable electronic device 200 can be configured as other devices as well.

In the illustrative embodiment of FIG. 2, the wearable electronic device 200 includes a flexible housing 201 configured to enfold about an appendage of a user. The flexible housing 201 can be configured to enfold about a wrist, ankle, or other object. One or more displays can be disposed along a major face of the wearable electronic device 200. In FIG. 2, two displays 202,203 are disposed along the top major face 204 of the wearable electronic device 200. As will be shown in subsequent figures, the display of the wearable electronic device 200 can be a single display, segmented display, multiple displays, and so forth. The displays 202,203 are configured to provide visual output, data, information, images, or other visible indicia to a user.

In one embodiment, the displays 202,203 are flexible displays that are configured to alter their physical geometry as the flexible housing 201 bends or flexes. For example, in one embodiment the displays 202,203 comprise flexible, organic light emitting diode displays that can bend and flex with the flexible housing. Alternatively, where the display(s) are segmented displays, portions of the flexible housing 201 linking each segment of the display can bend. The segments of the display then change their geometry by altering their geometric relationship relative to each other much in the same way the links of a bracelet change their geometric relationship relative to each other when the bracelet is wrapped about a wrist.

The displays 202,203 of FIG. 2 will be disposed along different portions of the user's appendage when the flexible housing 201 enfolds about that image. For example, using the image shown in FIG. 2, presume that the wearable electronic device 200 is to be worn on a user's right wrist. The user would place the wrist beneath the plan view of FIG. 2 with the thumb closer to display 203 and the little finger closer to display 202. Accordingly, when the flexible housing 201 is enfolded about the wrist, display 202 will be disposed above the ulna bone while display 203 is disposed above the radius. Display 202 is thus "ulnarly disposed" about the appendage of the user, while display 203 is "radially disposed." As will be described below, the displays 202,203 can be prioritized or controlled independently in some embodiments. Embodiments described herein contemplate that it can be advantageous for the user in some embodiments with the radially disposed display is prioritized above ulnarly disposed displays. However, in other embodiments, such as when the user wishes to show data to a friend, it can be advantageous to make the ulnarly disposed displays take priority over the radially disposed displays.

Since the wearable electronic device 200 can be configured as a wristband or a wristwatch-type wearable device, flexible displays disposed on the wearable electronic device 200 can "wrap" around the wearer's wrist without compromising operational performance. While the display can include non-flexible displays as well, the inclusion of flexible display devices not only increases comfort for the wearer but also allows the display to be larger as well.

In one embodiment, each display 202,203 comprises a touch-sensitive display. Accordingly, the displays 202,203 can be configured to receive user input when an object, such as a stylus or finger, is touching a surface of the display 202,203. For example, if the displays 202,203 are touch sensitive displays, the user may swipe a finger or stylus across the display to deliver input to the wearable electronic device 200.

In one embodiment, the displays 202,203 each comprise a touch sensor 206 to provide touch-sensitive capabilities and to receive user input across the surface of each display 202, 203. The displays 202,203 can also be configured with a force sensor 207. Where configured with both a touch sensor 206 and force sensor 207, a control circuit 205, operable with each display 202,203 can determine not only where the user contacts the displays 202,203, but also how much force the user employs in contacting the displays 202,203. Where configured with a force sensor 207 but no touch sensitive capabilities, the displays 202,203 can effectively be used as large "push button" or input controls for the wearable electronic device 200. In one embodiment, outer lenses of the displays 202,203 can be configured with piezoelectric transducers 208 configured to slightly move the lenses to use the displays 202,203 as acoustic transducers. Actuation of the piezoelectric transducers can cause the lens of the displays 202,203 to vibrate, thereby emitting acoustic output. An example of a piezo-driven lens speaker is described in commonly assigned, pending U.S. Ser. No. 12/967,208, filed Dec. 14, 2010, entitled "PORTABLE ELECTRONIC DEVICE," which is incorporated herein by reference.

The touch sensor 206, where included, can comprise a capacitive touch sensor, an infrared touch sensor, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., control circuit 205 or another display specific control circuit, to detect an object in close proximity with—or touching—the surface of the displays 202,203 or, alternatively, the flexible housing 201, by establishing electric field lines between pairs of capacitive sensors and then detecting perturbations of those field lines. The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques. For example, commonly assigned U.S. patent application Ser. No. 11/679,228, entitled "Adaptable User Interface and Mechanism for a Portable Electronic Device," filed Feb. 27, 2007, which is incorporated herein by reference, describes a touch sensitive display employing a capacitive sensor.

Like the touch sensor 206, the force sensor 207 can take various forms. For example, in one embodiment, the force sensor 207 comprises resistive switches or a force switch array configured to detect contact with either the displays 202,203 or the flexible housing 201 of the wearable electronic device. An "array" as used herein refers to a set of at least one switch. The array of resistive switches can function as a force-sensing layer, in that when contact is made with either the surface of the displays 202,203 or the flexible housing 201 of the wearable electronic device 200, changes in impedance of any of the switches may be detected. The array of switches may be any of resistance sensing switches, membrane switches, force-sensing switches such as piezoelectric switches, or other equivalent types of technology. In another embodiment, the force sensor 207 can be capacitive. One example of a capacitive force sensor is described in commonly assigned, U.S. patent application Ser. No. 12/181,923, filed Jul. 29, 2008, published as US Published Patent Application No. US-2010-0024573-A1, which is incorporated herein by reference. In yet another embodiment, piezoelectric transducers 208 can be configured to sense force as well. For example, where coupled with the lens of the displays 202, 203, the piezoelectric transducers 208 can be configured to detect an amount of displacement of the lens to determine force. The piezoelectric transducers 208 can also be configured to determine force of contact against the flexible housing 201 of the wearable electronic device 200 rather than the displays 202,203.

In one embodiment, the wearable electronic device 200 includes a control circuit 205 operable with one or more of the displays 202,203. The control circuit 205 can be operable with a memory 209. The control circuit 205, which may be any of one or more microprocessors, programmable logic, application specific integrated circuit device, or other similar device, is capable of executing program instructions associated with the functions of the wearable electronic device 200, including driving the displays 202,203 and detecting input from a user. The program instructions and methods may be stored either on-board in the control circuit 205, or in the memory 209, or in other computer readable media coupled to the control circuit 205, e.g., a memory card. One suitable example for control circuit 205 is the MSM7630 processor manufactured by Qualcomm, Inc. The control circuit 205 may operate one or more operating systems, such as the Android™ mobile operating system offered by Google, Inc. In one embodiment, the memory 209 comprises an 8-gigabyte embedded multi-media card (eMMC). The control circuit 205 can be configured to operate the various functions of the wearable electronic device 200, and also to execute software or firmware applications and modules that can be stored in a computer readable medium, such as memory 209. The control circuit 205 executes this software or firmware, in part, to provide device functionality. The memory 209 may include either or both static and dynamic memory components, may be used for storing both embedded code and user data.

A battery 210 or other energy source can be included to provide power for the various components of the wearable electronic device 200. In one or more embodiments, the battery 210 is selectively detachable from the wearable electronic device 200. In the illustrative embodiment of FIG. 2, the battery 210 is integrated into the flexible housing 201 of the wearable electronic device 200. Charging circuitry (not shown) can be included in the wearable electronic device 200 as well. The charging circuitry can include over voltage and over current protection. In one embodiment, the battery 210 is configured as a flexible lithium polymer cell such that it can enfold about the appendage of the wearer when the flexible housing 201 enfolds about the appendage.

One or more microphones 211 can be included to receive voice input, voice commands, and other audio input. A single microphone can be included. Optionally, two or more microphones can be included. Piezoelectric devices can be configured to both receive input from the user and deliver haptic feedback to the user.

Figure 3:
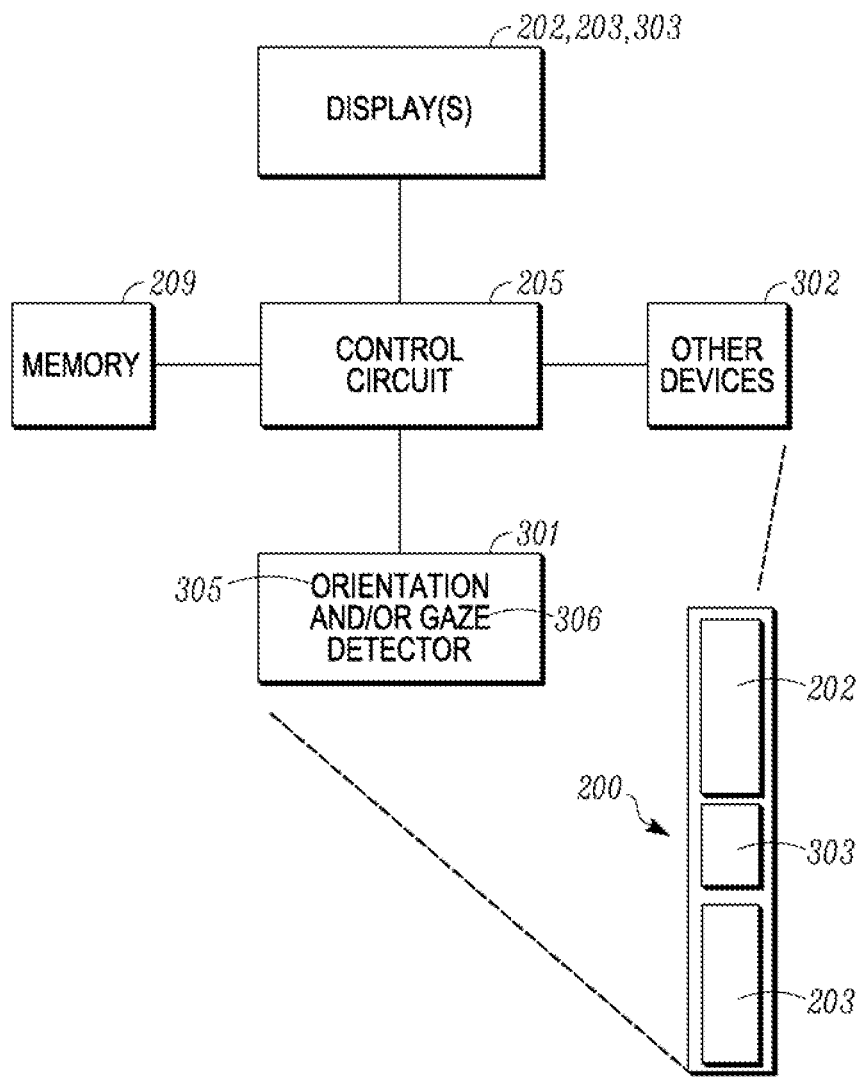
FIG. 3 illustrates one explanatory schematic block diagram of a wearable electronic device configured in accordance with one or more embodiments of the invention.

Turning now to FIG. 3, the principal components of the wearable electronic device 200 are shown. The control circuit 205 is shown being operable with the displays 202,203 and memory 209 as noted above. Other devices from FIG. 2, such as microphone (211), touch sensor (206), etc., are collectively shown as block 302.

As shown in FIG. 3, in one embodiment the wearable electronic device includes a detector 301 configured to detect relationships between the user and the wearable electronic device 200. The detected relationship information can be used by the control circuit 205 to do many things: prioritize displays, control the presentation of data on the displays, alter the presentation of data on the displays, and other functions. In one embodiment, the detector 301 comprises a gaze detector 306. In another embodiment, the detector 301 comprises an orientation detector 305. In another embodiment, the detector 301 comprises a combination orientation and gaze detector.

Where the detector 301 comprises an orientation detector, the orientation detector is configured to detect a physical and/or spatial orientation of the wearable electronic device 200 relative to the user. The orientation detector can take a number of forms.

In one embodiment, the orientation detector comprises a light sensor configured to detect changes in optical intensity, color, light, or shadow in the near vicinity of the wearable electronic device 200. For example, the light sensor can be configured as an imaging device that captures successive images about the device and compares luminous intensity, color, or other spatial variations between images to detect motion or the presence of an object, such as the user, near the wearable electronic device 200. Such sensors can be useful in determining at which side of the wearable electronic device 200 a user is standing.

In another embodiment, the orientation detector can comprise an infrared sensor. The infrared sensor can be used in conjunction with, or in place of, the light sensor. The infrared sensor can be configured to operate in a similar manner, but on the basis of infrared radiation rather than visible light. The light sensor and/or infrared sensor can also be used to detect gesture commands, which can be used to determine the orientation of the user relative to the wearable electronic device. The orientation of the wearable electronic device 200 relative to the user can be detected from a light-sensed user action or an infrared-sensed user action, such as movement of the user's body, hands, or limbs away from the wearable electronic device 200.

In another embodiment, the orientation detector can comprise an accelerometer. The accelerometer can be configured to determine the orientation of the wearable electronic device 200 relative to the user by detecting motion of the wearable electronic device 200. For example, a user wearing the wearable electronic device 200 on the right hand can only make certain types of gestures due to the way that the right arm is linked to the torso. These motions are distinct from those made by the left arm due to the complementary connection of the left arm to the torso as compared to the right. The accelerometer can be used to determine the location of the user relative to the wearable electronic device 200 by detecting a series of gestures and deducing upon which appendage the wearable electronic device 200 is being worn. The accelerometer can also be used to determine the spatial orientation of the wearable electronic device 200 in three-dimensional space by detecting a gravitational direction. In addition to, or instead of, the accelerometer, an electronic compass can be included to detect the spatial orientation of the wearable electronic device 200 relative to the earth's magnetic field. Similarly, one or more gyroscopes can be included to detect rotational motion of the wearable electronic device 200. The gyroscope can be used to determine the spatial rotation of the wearable electronic device 200 in three-dimensional space. User input can be received by these devices by detecting gestures, such as movement of a body part to which the wearable electronic device 200 is connected.

In another embodiment, the detector 301 comprises one or more microphones. The microphones can be included to receive voice input, voice commands, and other audio input. A single microphone can be included. Optionally, two or more microphones can be included. Sounds received by the microphones can be used to determine the location of the user relative to the wearable electronic device 200. The orientation detector can also comprise any of an audio sensor, an infrared sensor, a thermal sensor, a an imager, or combinations thereof.

In one or more embodiments, rather than simply detecting the orientation of the wearable electronic device 200 relative to the user, the detector 301 is capable of determining more specific information about the user. For example, in one embodiment the detector 301 comprises a gaze detector configured to detect a gaze direction from the user.

Gaze detectors are known in the art. Examples are provided, e.g., in U.S. Pat. No. 5,912,721 to Yamaguchi et al., U.S. Pat. No. 7,331,929 to Morita et al., U.S. Pat. No. 7,460,150 to Coughlan et al., US Published Patent Application No. 2007/0162922 to Park, and US Published Patent Application No. 2010/0079508 to Hodge et al., Akira Tomono, Fumio Kishino, Sachio Kobayashi, "Attempt of Pupil Extraction and Gaze Detector Permitting Head Movements," Transaction of Institute of Electronics and Communication Engineers of Japan (D) Vol. J76-D-II, No. 3, pp. 636-646 (1993), Published Unexamined Japanese Patent Application (JPA) No. 4-49943 (04049943), "Non-Intrusive Gaze Tracking Using Artificial Neural Network", Shumeet Baluja, Dean Pomerleau, Advances in Neural Information Processing systems 6 Cowan J. D, Tesauro, G. & Alspector, J. (eds) Morgan Kaufman Publishers, 1994, each of which is incorporated herein by reference. The cited references are illustrative of the state of the art only, as numerous other references describing gaze detectors are known in the art.

Generally speaking, gaze detectors comprise sensors for detecting the user's gaze point. They can optionally include sensors for detecting the alignment of a user's head in three-dimensional space. Electronic signals can then be delivered from the sensors to the control circuit 205 for computing the direction of user's gaze in three-dimensional space. The gaze detector can further be configured to detect a gaze cone corresponding to the detected gaze direction, which is a field of view within which the user may easily see without diverting their eyes or head from the detected gaze direction. The gaze detectors can be configured to alternately estimate gaze direction by inputting to the control circuit 205 images representing a photograph of a selected area near or around the eyes. It will be clear to those of ordinary skill in the art having the benefit of this disclosure that these techniques are explanatory only, as other modes of detecting gaze direction can be substituted in the detector 301 of FIG. 3.

As will be described below in further detail, the control circuit 205 can use the detector to alter the presentation of data on the displays 202,203,303. Where the detector 301 comprises a gaze detector, the control circuit 205 can be configured to alter a presentation of data on the displays 202,203,303 in response to a detected gaze direction. Where the detector 301 comprises an orientation detector, the control circuit 205 can be configured to prioritize one or more portions of the displays 202,203,303 in response to a detected orientation of the wearable electronic device 200 relative to the user.

Figure 4:
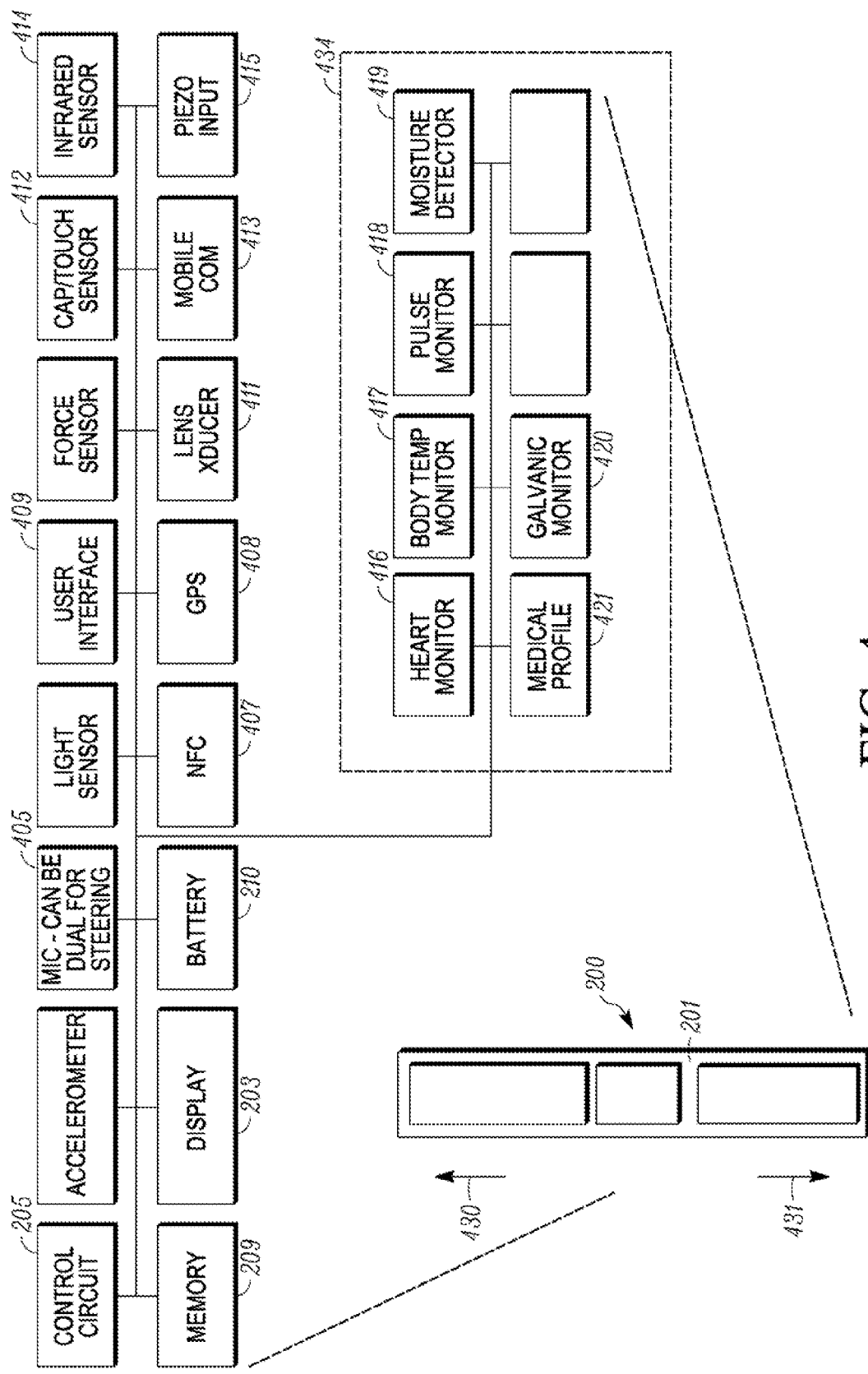
FIG. 4 illustrates a schematic block diagram of one explanatory wearable electronic device configured in accordance with one or more embodiments of the invention.

Turning now to FIG. 4, illustrated therein are additional components, modules, and circuit elements that can be included in embodiments of the wearable electronic device 200. Some of the components shown in FIG. 4 have been described above with reference to FIGS. 2 and 3, and thus do not require additional discussion with reference to FIG. 4. It will be clear to those of ordinary skill in the art having the benefit of this disclosure that the components and modules can be used in different combinations, with some components and modules included and others omitted. For altering the presentation orientation of visual output presented on the display 203, the components of the display system can include a control circuit 205 and the display 203. The other components or modules can be included or excluded based upon need or application.

A touch sensor 412, which as noted above can be operable with the display 203, can include a capacitive touch sensor, an infrared touch sensor, piezoelectric touch sensor, resistive touch sensor, or another touch-sensitive technology. As also noted above, capacitive touch-sensitive devices include a plurality of capacitive sensors, e.g., electrodes, which are disposed along a substrate. Each capacitive sensor is configured, in conjunction with associated control circuitry to detect an object in close proximity with—or touching—the surface of the display 203 or the flexible housing 201 of the wearable electronic device 200 by establishing electric field lines between pairs of capacitive sensors and then detecting perturbations of those field lines. The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive.

The wearable electronic device 200 can include a mobile communication circuit 413 to provide wide area communication capabilities. Where included, the mobile communication circuit 413 is operable with the control circuit 205, and is used to facilitate electronic communication with various networks, such as cellular networks, data networks, or the Internet. Note that it is possible to combine the control circuit 205, the memory 209, and the mobile communication circuit 413 into a single device or into devices having fewer parts while retaining the functionality of the constituent parts.

The mobile communication circuit 413, which may be one of a receiver or transmitter, and may alternatively be a transceiver, operates in conjunction with the control circuit 205 to electronically communicate through a communication network. For example, in one embodiment, the mobile communication circuit 413 can configured to communicate through a traditional cellular network, such as a Code Division Multiple Access (CDMA) network or Global System for Mobile communication (GSM) network. Other examples of networks with which the communication circuit may communicate include Push-to-Talk (PTT) networks, proprietary networks, dual band CDMA networks, or Dual Band Universal Mobile Telecommunications System (UMTS) networks, and direct communication networks. The mobile communication circuit 413 can be configured to provide messaging functionality to the wearable electronic device 200. In one or more embodiments, the wearable electronic device 200 can communicate with one or more social networking applications through the mobile communication circuit 413 as well. News feeds and other data can be received through the mobile communication circuit 413. Moreover, context and location sensitive notifications can be sent and received via the mobile communication circuit 413.

The battery 210 or other energy source can be included to provide power for the various components of the wearable electronic device 200. While a battery 210 is shown in FIG. 4, it will be obvious to those of ordinary skill in the art having the benefit of this disclosure that other energy storage deices can be used instead of the battery 210, including a fuel container or an electrochemical capacitor. The battery 210 can be a lithium ion technology or a nickel metal hydride technology, such cells having reasonably large energy capacity, wide operating temperature range, large number of charging cycles, and long useful life. Other energy sources that can be used in place of battery 210 are fuel cells, Stirling engines, and microturbines. The battery 210 may also include over voltage and over current protection and charging circuitry. In one embodiment, the wearable electronic device 200 includes two batteries. In one embodiment, the battery 210 is configured as an 800 mAh lithium polymer cell. The battery 210 can be configured to deliver energy to electronic components, e.g., the control circuit 205, memory 209, display 203, etc., each of which is disposed only within the central housing of the wearable electronic device 200.

As noted above, one or more microphones 405 can be included to receive voice input, voice commands, and other audio input. A single microphone can be included. Optionally, two or more microphones can be included for selective beam steering. For example a first microphone can be located on a first side 430 of the wearable electronic device 200 for receiving audio input from a first direction. Similarly, a second microphone can be placed on a second side 431 of the wearable electronic device 200 for receiving audio input from a second direction. In response to the detector (301) the control circuit 205 can then select between the first microphone and the second microphone to beam steer audio reception toward the user. Alternatively, the control circuit 205 processes and combines the signals from two or more microphones to perform beam steering. The one or more microphones 405 can be used for voice commands. When altering the presentation orientation of information presented on the display, the one or more microphones 405 can be configured to be responsive to the control circuit 205. Accordingly, the control circuit 205 can switch between microphones upon altering the presentation orientation in response to the user input.

A near field communication circuit 407 can be included for communication with local area networks. Examples of suitable near field communication circuits include Bluetooth communication circuits, IEEE 801.11 communication circuits, infrared communication circuits, magnetic field modulation circuits, and Wi-Fi circuits.

A global positioning system device 408 can be included for determining where the wearable electronic device 200 is located. (Note that the global positioning system device 408 can also be used as the detector (301) to determine the spatial orientation of the wearable electronic device 200 in three-dimensional space by determining the change in position of the device relative to the earth.) The global positioning system device 408 is configured, in one embodiment, for communicating with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the global positioning system device 408 autonomously or with assistance from terrestrial base stations, for example with assistance from a cellular communication network or other ground based network, or as part of a Differential Global Positioning System (DGPS), as is well known by those having ordinary skill in the art. While a global positioning system device 408 is one example of a location determination module, it will be clear to those of ordinary skill in the art having the benefit of this disclosure that other location determination devices, such as electronic compasses or gyroscopes, could be used as well.

A user interface 409 can be included. As noted above, in one embodiment, the display 203 is configured as a touch-sensitive display, and accordingly functions as a user interface in and of itself. However, some applications will be better served with additional user interface components as well. The user interface 409, where included, can be operable with the control circuit 205 to deliver information to, and receive information from, a user. The user interface 409 can include a keypad, navigation devices, joysticks, rocker switches, slider pads, buttons, or other controls, and optionally a voice or touch command interface. These various components can be integrated together.

In one or more embodiments, the wearable electronic device can include one or more wellness sensors 434. Where the wearable electronic device 200 is configured as a wellness device, or is capable of operating in a health monitoring mode or physical safety device, one or more wellness sensors 434 can be included as well. Examples of wellness sensors are described in commonly assigned U.S. patent application Ser. No. 10/396,621, filed Mar. 24, 2003, published as US Published Patent Application No. 2004/0015058, which is incorporated herein by reference.

For example, a heart monitor 416 can be configured to employ EKG sensors, optical light emitting diodes when the wearable electronic device 200 is worn on the wrist, or other sensors to monitor a user's heart rate. The heart monitor 416 can include electrodes configured to determine action potentials from the skin of a user. A temperature monitor 417 can be configured to monitor the temperature of a user. A pulse monitor 418 can be configured to monitor the user's pulse. The pulse monitor 418 lends itself to the wristwatch configuration of the electronic device (100) of FIG. 1 because the wrist serves as an advantageous location from which to measure a person's pulse.

A moisture detector 419 can be configured to detect the amount of moisture present on a person's skin. The moisture detector 419 can be realized in the form of an impedance sensor that measures impedance between electrodes. As moisture can be due to external conditions, e.g., rain, or user conditions, perspiration, the moisture detector 419 can function in tandem with ISFETS configured to measure pH or amounts of NaOH in the moisture or a galvanic sensor 420 to determine not only the amount of moisture, but whether the moisture is due to external factors, perspiration, or combinations thereof.

The medical history of a user, as well as the determinations made by the various wellness sensors 434, can be stored in a medical profile 421. Periodic updates can be made to the medical profile 421 as well. The medical profile 421 can be a module operable with the control circuit 205. Such modules can be configured as sets of instructions stored in the memory 209 that are usable by the control circuit 205 to execute the various wellness-monitoring functions of the wearable electronic device 200. Alternatively, the modules could be configured in hardware, such as through programmable logic. The wellness sensors 434 shown in FIG. 4 are illustrative only. Embodiments of the present invention may use various combinations of wellness sensors 434, including subsets of the wellness sensors 434 shown in FIG. 4. Further, other modules may be added to further increase device functionality. The wellness sensors 434 can be used to provide the user with a sensor-based health and wellness data assessment. The wellness sensors 434 can be used in conjunction with the medical profile 421 to provide context sensitive recommendations on the display 203.

Figure 5:
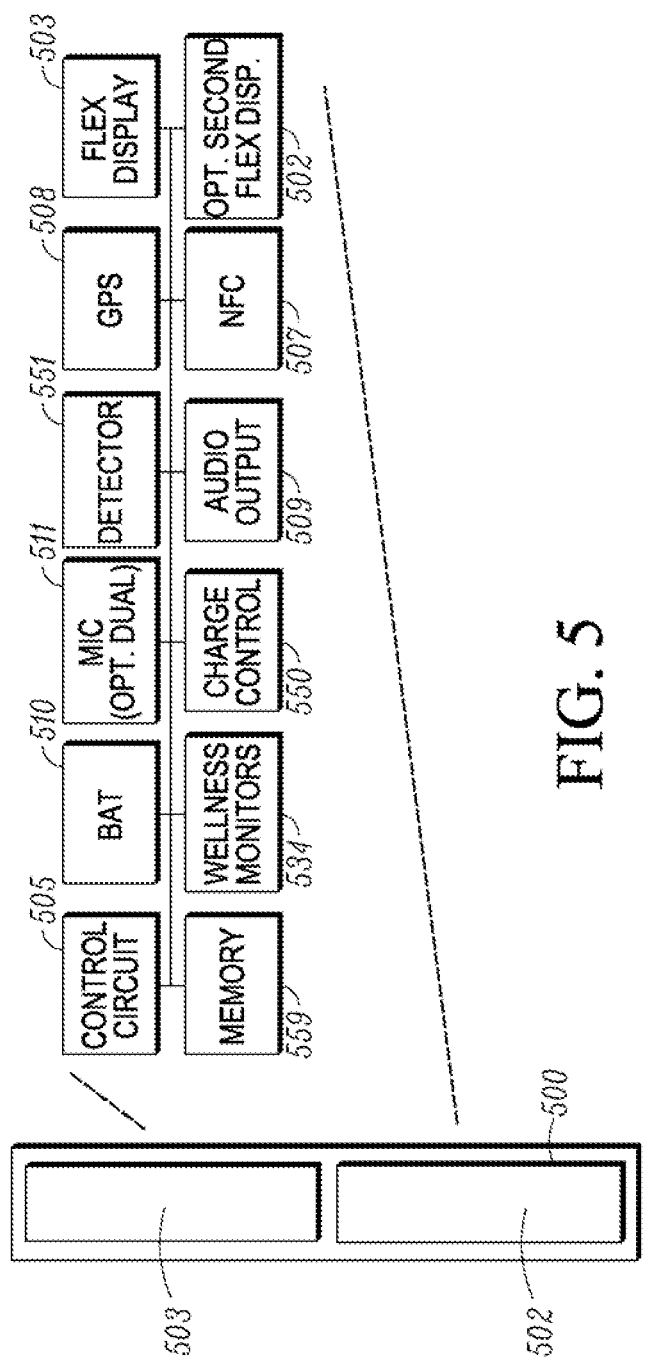
FIG. 5 illustrates another schematic block diagram of one explanatory wearable electronic device configured in accordance with one or more embodiments of the invention.
Figure 6:
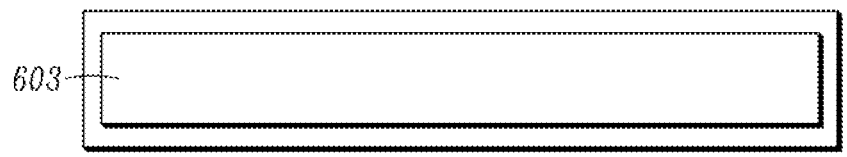
FIGS. 6-10 illustrate various examples of display configurations suitable for use in a wearable electronic device configured in accordance with one or more embodiments of the invention.

Turning to FIG. 5, to demonstrate that the various modules and components can be used in different combinations, another wearable electronic device 500 is shown. The wearable electronic device 500 of FIG. 5 has two displays 502,503, while the wearable electronic device (200) of FIGS. 2-4 included three. The wearable electronic device 500 of FIG. 5 also includes a subset of components when compared to the wearable electronic device (200) of FIG. 4.

As shown in FIG. 5, the wearable electronic device 500 includes a control circuit 505. The control circuit 505 can be operable with a memory 559. The control circuit 505, which may be any of one or more microprocessors, programmable logic, application specific integrated circuit device, or other similar device, is capable of executing program instructions associated with the functions of the wearable electronic device 500.

The wearable electronic device 500 of FIG. 5 includes two displays 502,503. The display 502,503 of this embodiment comprises flexible display devices. Since the wearable electronic device 500 can be configured as a wristband for a wristwatch-type wearable device, flexible displays 502,503 disposed on the wearable electronic device 500 can "wrap" around the wearer's wrist without compromising operational performance. While the displays 502,503 can include non-flexible displays as well, the inclusion of flexible display devices not only increases comfort for the wearer but also allows the displays 502,503 to be larger as well. The displays 502,503 can be configured to be touch sensitive also, thereby allowing the displays 502,503 to be used as a control input. The display is configured to provide visual output, images, or other visible indicia to a user.

A battery 510 or other energy source can be included to provide power for the various components of the wearable electronic device 500. In one or more embodiments, the battery 510 is selectively detachable from the wearable electronic device 500. Charging circuitry 550 can be included in the wearable electronic device 500 as well. The charging circuitry 550 can include over voltage and over current protection. In one embodiment, the battery 510 is configured as a flexible lithium polymer cell.

One or more microphones 511 can be included to receive voice input, voice commands, and other audio input. A single microphone can be included. Optionally, two or more microphones can be included for selective beam steering. A first microphone can be located on a first side of the wearable electronic device 500 for receiving audio input from a first direction, while a second microphone can be placed on a second side of the wearable electronic device 500 for receiving audio input from a second direction. In response to a sensor, perhaps part of a detector 551, a user location direction can be determined. The control circuit 505 can then select between the first microphone and the second microphone to beam steer audio reception toward the user. Alternatively, the control circuit 505 can employ a weighted combination of the microphones to beam steer audio reception toward the user.

A near field communication circuit 507 can be included for communication with local area networks. A global positioning system device 508 can be included for determining location information. One or more audio output devices 509 can be included to deliver audio output to a user. Where desired, one or more wellness sensors 534 can be included as well. As described above, the wellness sensors 534 can include a heart monitor, moisture detector, temperature monitor, pulse monitor, galvanic devices, and so forth.

Figure 7:
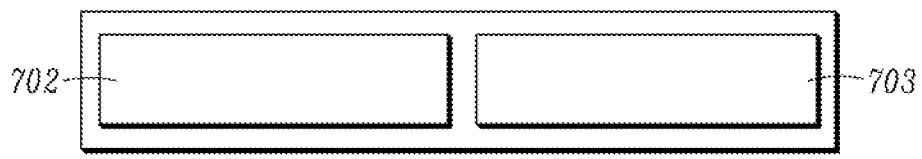

The display devices used with wearable electronics can take a variety of forms. Turning now to FIGS. 6-10, illustrated therein are explanatory embodiments of displays that can be used in accordance with embodiments of the invention. For example, in FIG. 6, the display 603 comprises a single, unitary, flexible, organic light emitting diode display. In FIG. 7, the display comprises two unitary, flexible, organic light emitting diode displays 702,703.

Figure 8:
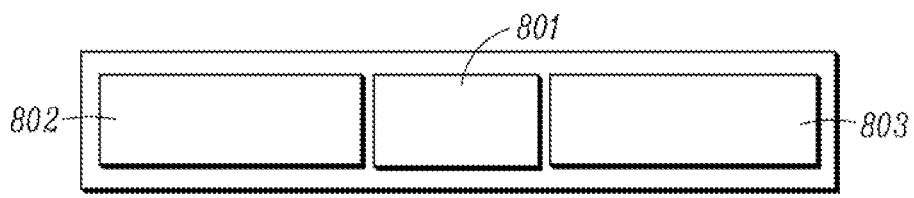

In FIG. 8, two unitary, flexible, organic light emitting diode displays 802,803 are used with a third, rigid display 801. This configuration resembles a wristwatch with the rigid display 801 serving as the watch face, while displays 802,803 provide flexible displays that wrap about the wrist.

Figure 9:
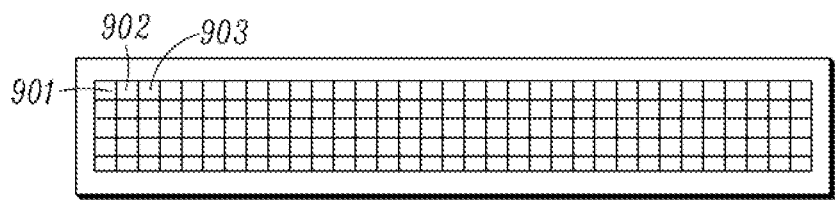
Figure 10:
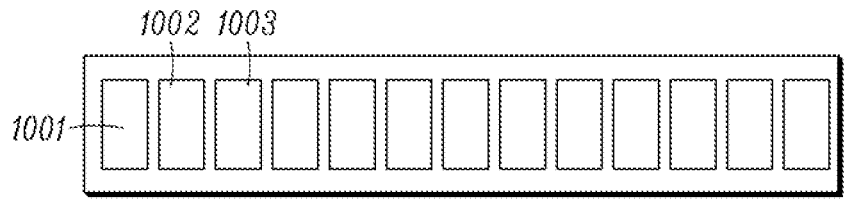

In FIG. 9, the display device comprises a segmented display comprising a plurality of individual display devices, e.g., display devices 901,902,903. Each display device 901,902,903 is individual and can be separately controlled from the others. In one embodiment, each display device 901,902,903 has an associated buffer of presentation information that can be updated as necessary by the control circuit. In one or more embodiments, the control circuit is capable of selectively turning the display devices 901,902,903 OFF and ON. In other embodiments, the control circuit can turn some display devices 901,903 ON, while placing other display devices 902 in a low power or sleep mode. FIG. 10 illustrates another segmented display with individual display devices 1001,1002,1003 resembling links of a bracelet.

Figure 11:
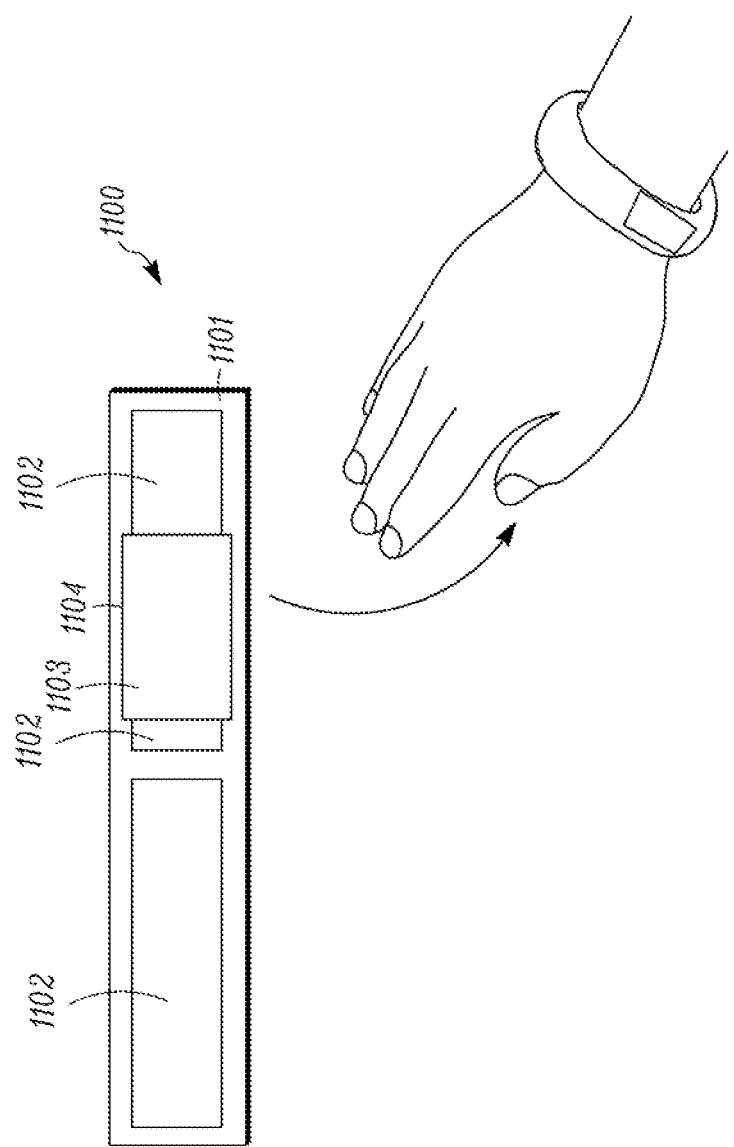
FIG. 11 illustrates one explanatory embodiment of a wearable electronic device having a physically rotatable display configured in accordance with one or more embodiments of the invention when the physically rotatable display is in a first orientation.
Figure 12:
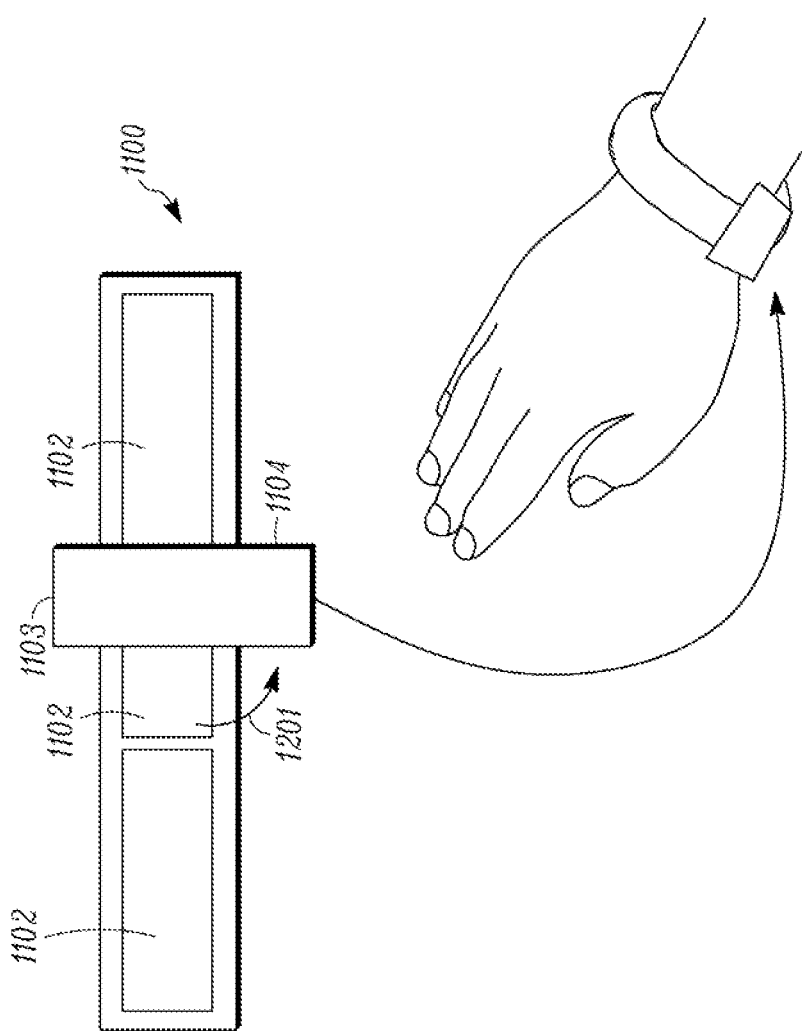
FIG. 12 illustrates one explanatory embodiment of a wearable electronic device having a physically rotatable display configured in accordance with one or more embodiments of the invention when the physically rotatable display is in a second orientation.

Turning now to FIGS. 11 and 12, illustrated therein is a wearable electronic device 1100 having a physically moveable display. As shown in FIGS. 11 and 12, the wearable electronic device 1100 includes a primary display 1102 disposed along a major face of the wearable housing 1101. In this embodiment, the primary display 1102 is flexible and is thus configured to alter its physical geometry as the wearable housing 1101 bends or flexes. In alternate embodiments, the primary display 1102 can be configured as a segmented display where the individual segments or devices change physical orientation with reference to each other when the wearable housing 1101 flexes or bends, even if the individual segments or devices are themselves not flexible.

The wearable electronic device 1100 also includes a secondary display 1103 that is coupled to the wearable housing 1101 by a hinged connection (not shown because it is disposed beneath the secondary display 1103). The hinged connection allows the secondary display 1103 to be mechanically rotatable relative to the wearable housing 1101.

The hinged connection allows the secondary display 1103 to rotate between at least a first orientation relative to the wearable housing 1101, shown in FIG. 11, and a second, angularly displaced orientation 1201 relative to the wearable housing 1101, shown in FIG. 12. In this illustrative embodiment, the first orientation occurs where the longer side 1104 of the secondary display 1103 is substantially parallel with the wearable housing 1101, while the second, angularly displaced orientation 1201 occurs where the longer side 1104 is substantially orthogonal with the wearable housing 1101. In one or more embodiments, mechanical detents can be included in the hinged connection so that the secondary display 1103 can be rotated to selective angular relationships relative to the wearable housing 1101. Additionally, frictional elements can be incorporated into the hinged connection to allow the user to select the angle between the secondary display 1103 and the wearable housing 1101.

The hinged connection can be preloaded with a tensioning device, such as a spring, and configured to open the secondary display 1103 from the first orientation to the second, angularly displaced orientation 1201 with assistance from the tensioning device. In one embodiment, the user may initiate rotation of the secondary display 1103, with the tensioning device carrying out the remainder of the rotation. A retaining device, such as a magnet or mechanical coupling, can be configured to oppose preloading of the tensioning device to retain the secondary display 1103 in the first orientation.

In one embodiment, the hinged connection includes a motor configured to automatically open the secondary display 1103 from the first orientation to the second, angularly displaced orientation 1201. The motor can be configured to open the secondary display 1103 from the first orientation to the second, angularly displaced orientation 1201 in response to a device event, such as an incoming telephone call, text message, multimedia message, or alert.

In one or more embodiments, the wearable electronic device 1100 can include a control circuit operable with the primary display 1102 and the secondary display 1103. The control circuit can be configured to display data with continuity between the primary display 1102 and the secondary display 1103 when the secondary display 1103 is in the first orientation. For instance, if the sentence "the quick red fox jumped over the lazy brown dog" is presented on the displays 1102,1103, a portion of the sentence can appear on the primary display 1102, while another portion of the sentence appears on the secondary display 1103. The two portions can align so the sentence appears as if presented on a single, unitary display. The control circuit can be configured to display data with discontinuity between the primary display 1102 and the secondary display 1103 when the secondary display 1103 is in the second, angularly displaced orientation 1201. For example, the sentence "the quick red fox jumped over the lazy brown dog" is presented on the primary display 1102, while a photograph of a dog and fox appears on the secondary display 1103.

Figure 13:
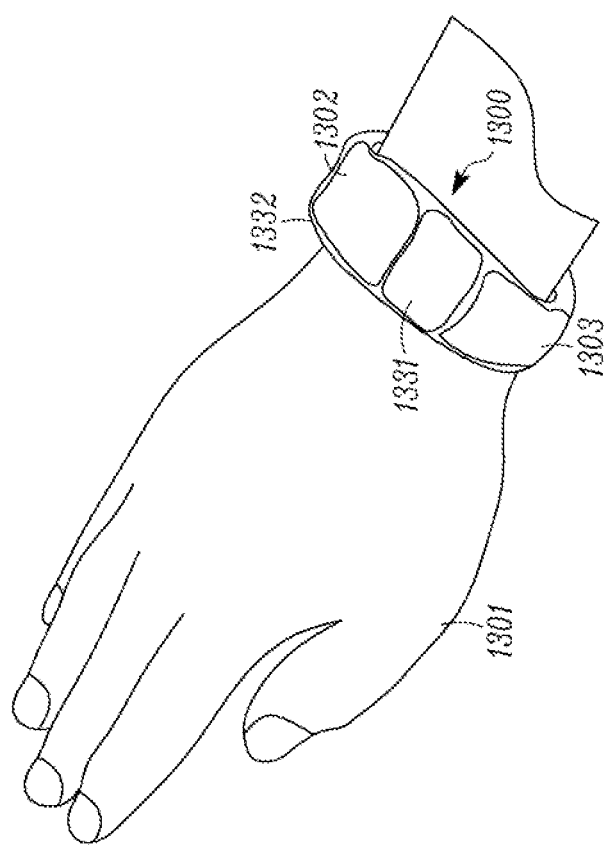
FIG. 13 illustrates one explanatory wearable electronic device with active display portions configured in accordance with one or more embodiments of the invention.

Now that the various components of various systems have been described, a few use cases will assist in making operational features of various embodiments more clear. Beginning with FIG. 13, a user 1301 is shown wearing one explanatory wearable electronic device 1300 configured in accordance with one or more embodiments of the invention. In this illustrative embodiment, the wearable electronic device includes three displays 1302,1303,1331. Two displays 1302,1303 are flexible displays and are disposed along a major face of a wearable housing 1332, while the third display 1331, also disposed on the major face of the wearable housing 1332, is rigid. As shown in FIG. 13, all three displays 1302,1303,1331 are ON.

The wearable electronic device 1300 is also equipped with a gaze detector configured to detect a gaze direction from the user 1301. A control circuit, operable with the gaze detector, is configured to alter a presentation of data on one or more of the displays 1302,1303,1331 in response to a detected gaze direction.

Figure 14:
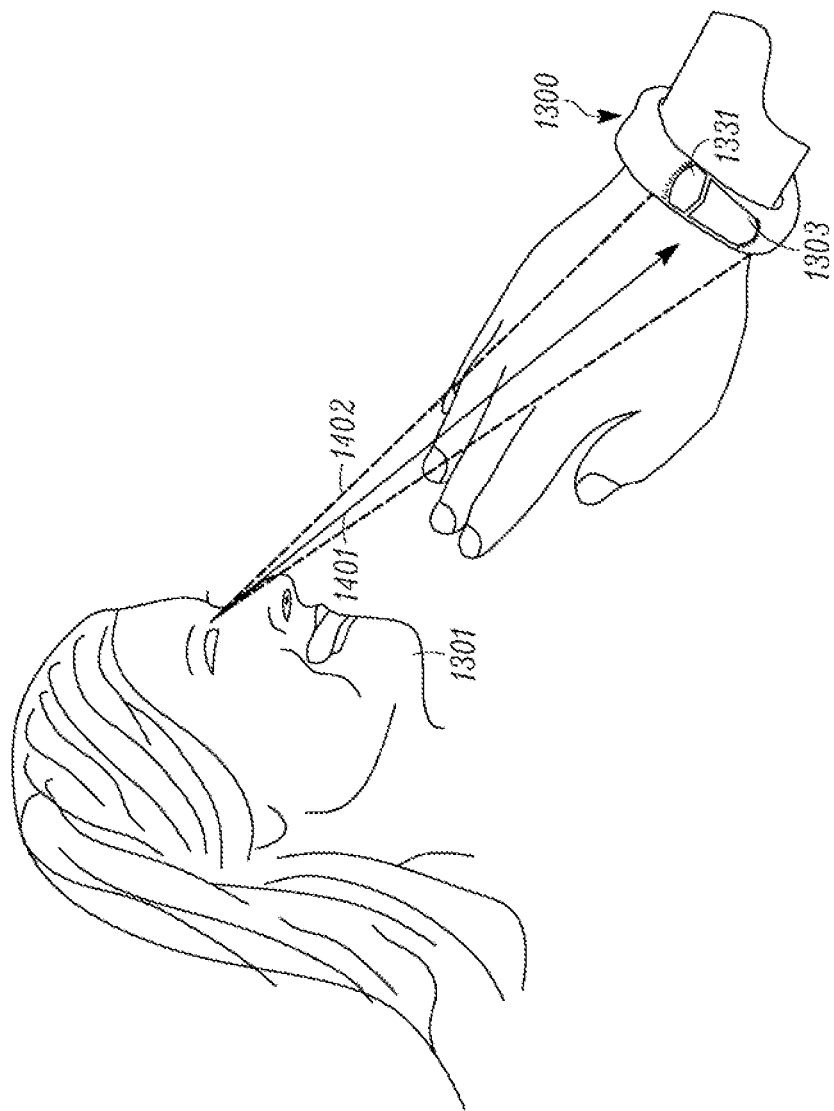
FIG. 14 illustrates a user gazing at one explanatory wearable electronic device configured in accordance with one or more embodiments of the invention.

Turning to FIG. 14, the user 1301 is gazing at the wearable electronic device 1300. The gaze detector of the wearable electronic device is operable to detect a gaze direction 1401 associated with the user's gaze. When this occurs, the control circuit of the wearable electronic device 1300 is configured to alter the presentation of data on the displays of the wearable electronic device 1300. In this illustrative embodiment, display (1302) has been turned OFF, as has a portion of display 1331. Display 1303 is ON, and is presenting information to the user. Note that display 1303 is the display oriented closest to the user 1301, and is therefore the most easily seen. Advantageously, embodiments of the invention are able to present information to the user in response to detected gaze direction 1401, which means that the user 1301 can easily view the information without twisting or turning the wrist.

In this illustrative embodiment, the gaze detector of the wearable electronic device is also operable to determine a gaze cone 1402 that corresponds to the gaze direction 1401. The gaze detector can do this in a variety of ways. In one embodiment, the gaze detector estimates the gaze cone from average gaze cone data stored in the memory. In another embodiment, the gaze cone size is user definable. In yet another embodiment, the gaze detector captures image data of the user 1301 and calculates a gaze cone based upon distance from the wearable electronic device, user eyelid and pupil information, and other information.

Regardless of determination method, when the gaze detector is operable to determine the gaze cone 1402, the control circuit can be configured to alter the presentation of data on the display by presenting data on portions of the display disposed only within the gaze cone 1402. This has been done in FIG. 14. All of display 1303 and a portion of display 1331 are disposed within the gaze cone 1402. Accordingly, these portions are presenting data while other portions of the displays of the wearable electronic device 1300 are turned OFF. There are, of course, other ways in which the presentation of information can be altered in response to detected gaze direction or detected gaze cone. For example, the control circuit can be operable to alter the presentation of the data by one of rotating the data based upon the detected gaze direction, moving the data on the display based upon the detected gaze direction, or combinations thereof. Other presentation alteration techniques will be obvious to those of ordinary skill in the art having the benefit of this disclosure.

Figure 15:
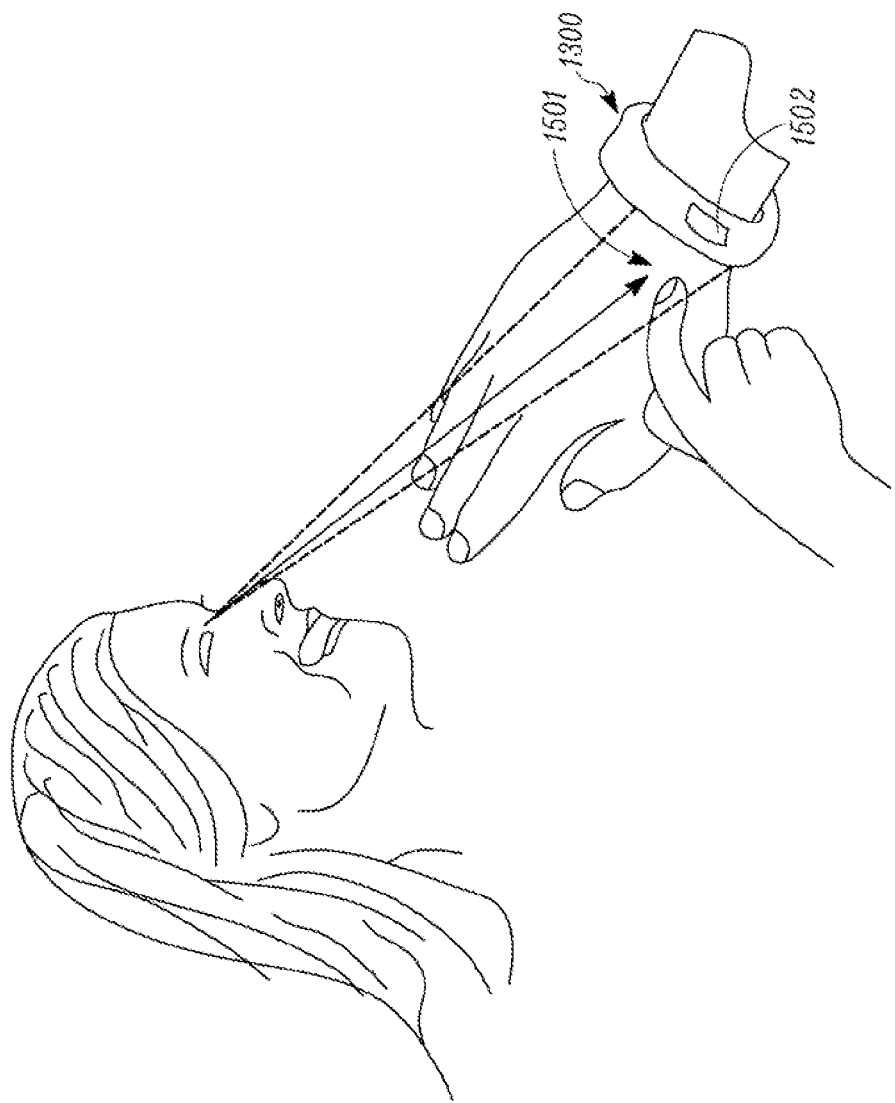
FIG. 15 illustrates a user gazing at, and gesturing to, one explanatory wearable electronic device configured in accordance with one or more embodiments of the invention.

Turning to FIG. 15, in one or more embodiments, the displays (1302,1303,1332) of the wearable electronic device 1300 are touch sensitive. In such embodiments, when the user touches the displays (1302,1303,1332), the touch input can be used in conjunction with detected gaze information to further alter the presentation of information on the display. In one embodiment, the control circuit is further configured to additionally alter the presentation of the data in response to touch input along the touch sensitive display. This is what is occurring in illustrative FIG. 15—the control circuit has reduced the size of the presented data to only a portion 1502 of display (1303) in response to the touch input 1501. In other embodiments, when touch input 1501 is received, the control circuit can be configured to override any alteration of the presentation of the data on the display (1303) that has occurred in response to the detected gaze direction.

Figure 16:
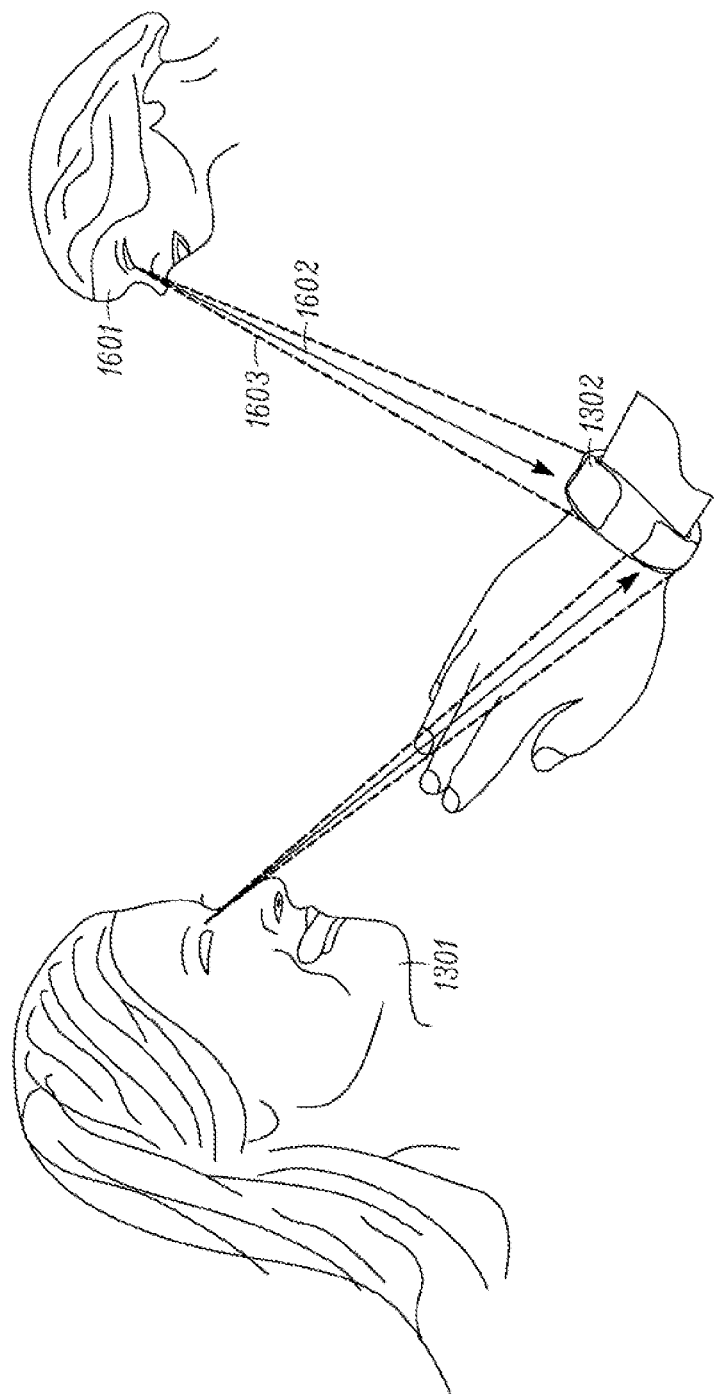
FIG. 16 illustrates two users gazing at one explanatory wearable electronic device configured in accordance with one or more embodiments of the invention.

Turning now to FIG. 16, a second user 1601 has entered the scene. The second user 1601 may be a friend or co-worker of user 1301. In one embodiment, the user 1301 can program the control circuit to be responsive to others, or alternatively, non-responsive to others. For instance, the user 1301 may configure the device to be responsive to third parties when touch input is received. This feature allows the user 1301 to turn third party responsiveness ON and OFF. When, for example, reading private information, the user 1301 may want third party responsiveness to be OFF. However, when showing pictures, the user 1301 may want third party responsiveness to be ON.

In this illustrative embodiment, the user 1301 has programmed the control circuit to be responsive to third parties. Accordingly, when the second user 1601 approaches, the control circuit is operable to detect the gaze direction 1602, and optionally a gaze cone 1603 corresponding to the gaze direction 1602, from the second user 1601. The control circuit can then alter the presentation of data on the displays. In this example, the control circuit does this by turning on display 1302.

Figure 17:
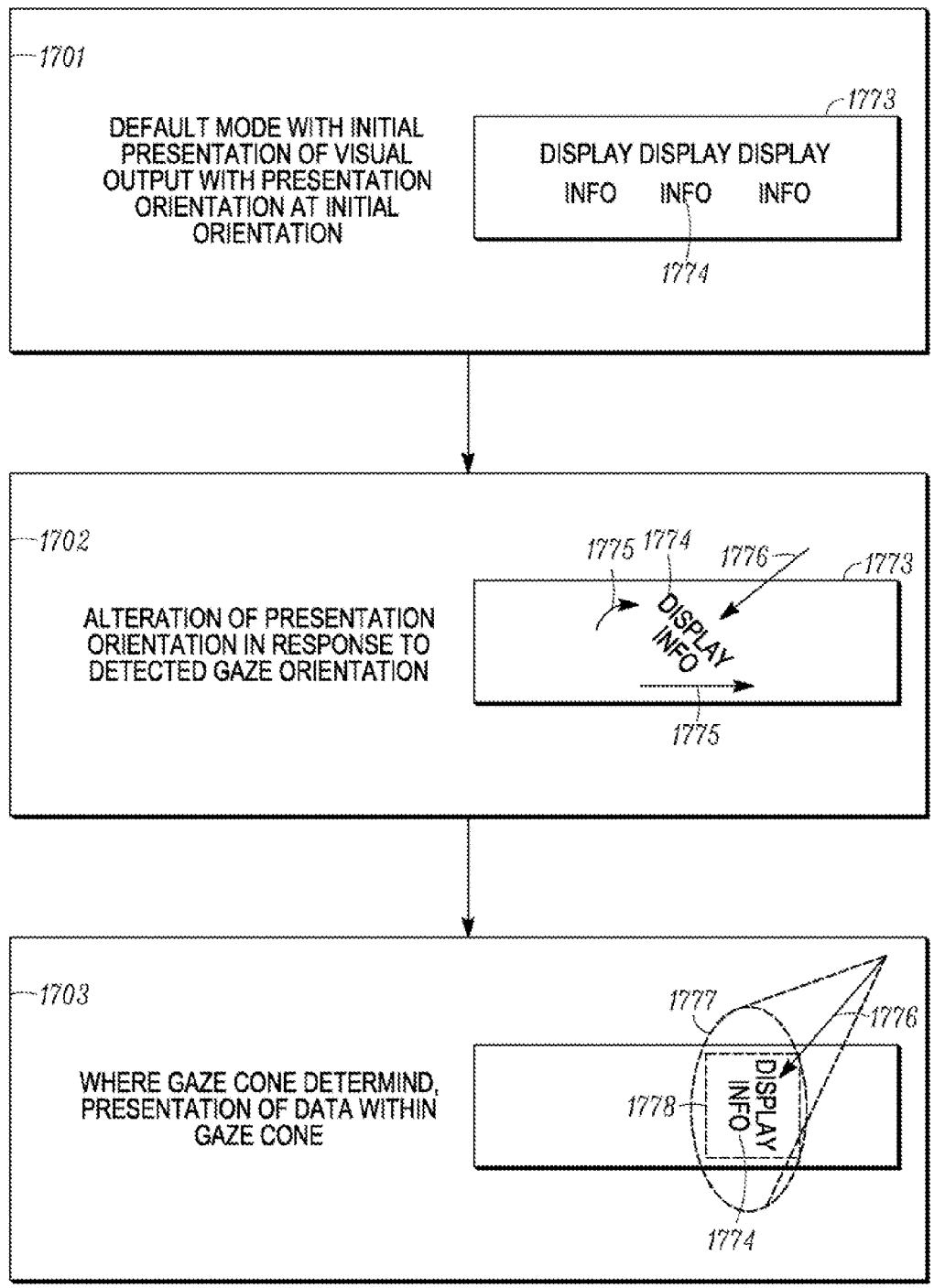
FIG. 17 illustrates a method and apparatus for altering the presentation of data on a display of a wearable electronic device in response to a detected gaze direction in accordance with one or more embodiments of the invention.

Turning now to FIG. 17, illustrated therein is a method, suitable for an electronic device, for altering the presentation of data, content, information, images, or other objects on a display in accordance with one or more embodiments of the invention. As shown at step 1701, a display 1773 of an electronic device is configured to provide data 1774 as visual output having a presentation orientation associated therewith. The presentation orientation of step 1701 is initially that of displaying continuous information horizontally across the display 1773.

At step 1702, the control circuit of the electronic device is configured to alter 1775 the presentation of the data 1774 on the display 1773 in response to a detected gaze direction 1776. As noted above, the alteration can take a variety of forms. It can include rotating the data 1774 based upon the detected gaze direction 1776, moving the data 1774 on the display based upon the detected gaze direction, or combinations thereof. In this embodiment, the alteration includes both rotation and translation.

At optional step 1703, the control circuit of the electronic device is configured to determine a gaze cone 1777 corresponding to the detected gaze direction 1776. When this occurs, the control circuit can alter the presentation of the data 1774 by presenting the data 1774 on a portion 1778 of the display 1773 disposed within the gaze cone 1777.

Figure 18:
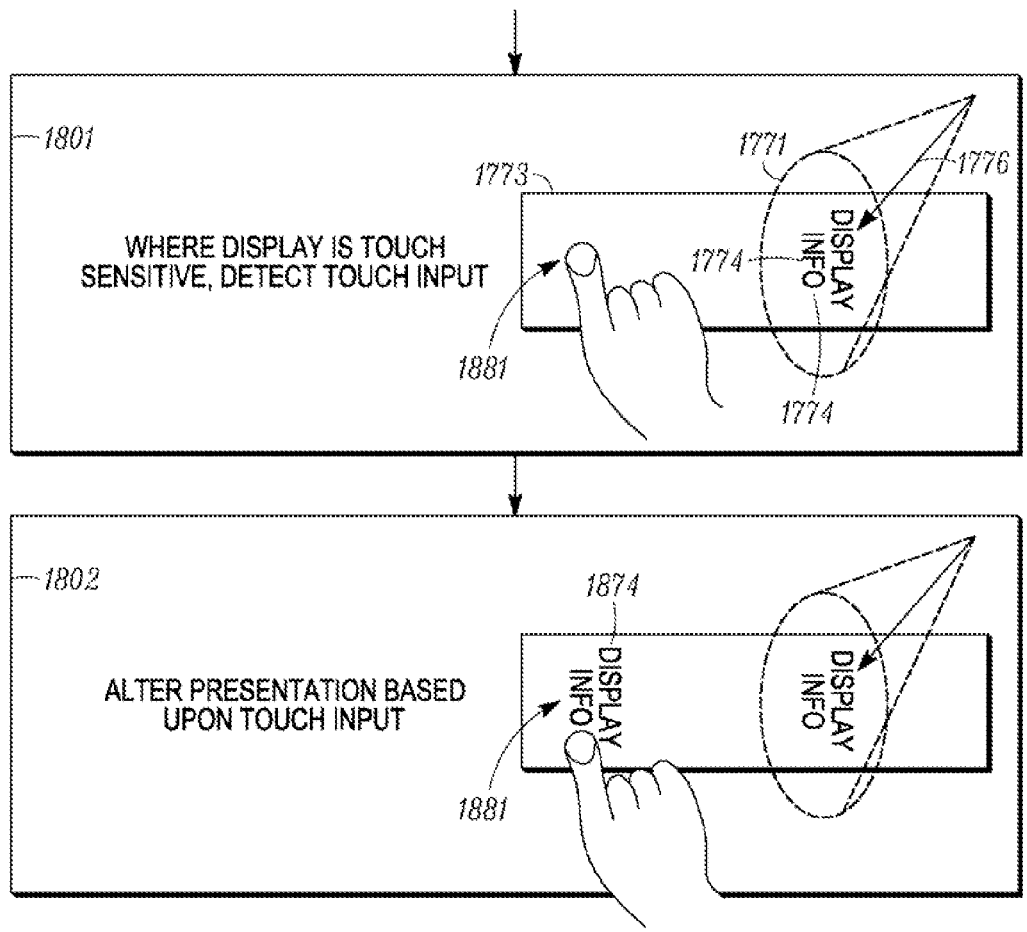
FIG. 18 illustrates a method and apparatus for responding to user gestures in accordance with one or more embodiments of the invention.

Turning to FIG. 18, step 1801 can occur where the display 1773 is a touch-sensitive display. The display 1773 can receive touch input 1881 along a portion of the display 1773 at step 1801. At step 1802, the control circuit can additionally alter the presentation of the data 1874 in response to touch input 1881 along the touch sensitive display 1773. As shown in this illustrative embodiment, the control circuit has presented additional data 1874 at a location corresponding to the touch input 1881, which is beneath the touch input 1881 in this example.

In FIG. 18, the alteration of the presentation of the data 1774 is a function of three elements: detected gaze direction 1776, detected gaze cone 1771, and touch input 1881. While this is one viable embodiment, in other embodiments these elements can take priority over each other. Detected gaze direction 1776 can take priority over touch input 1881, or vice versa. Detected gaze cone 1771 can take priority over touch input 1881, or vice versa.

Figure 19:
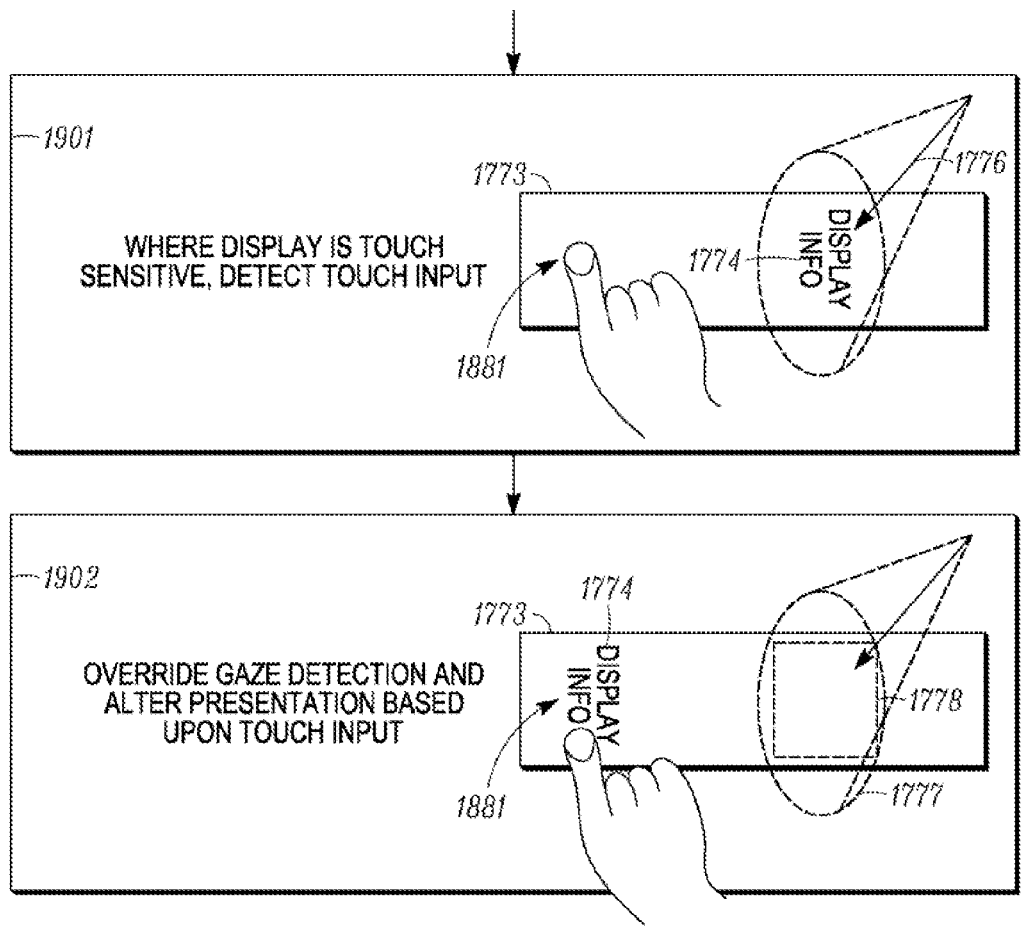
FIG. 19 illustrates another method and apparatus for responding to user gestures in accordance with one or more embodiments of the invention.

One example of this is shown in FIG. 19. Turning to FIG. 19, in this example, the control circuit is configured to override an alteration of the presentation of the data 1774 that has occurred in response to the detected gaze direction 1776 on the display 1773. This occurs as follows: at step 1901, the control circuit detects touch input 1881 on the display 1773. At step 1902, the control circuit overrides prior data presentation alteration by moving the data 1774 from the portion 1778 of the display 1773 corresponding to the gaze cone 1777 to a location corresponding to the touch input 1881.

Figure 20:
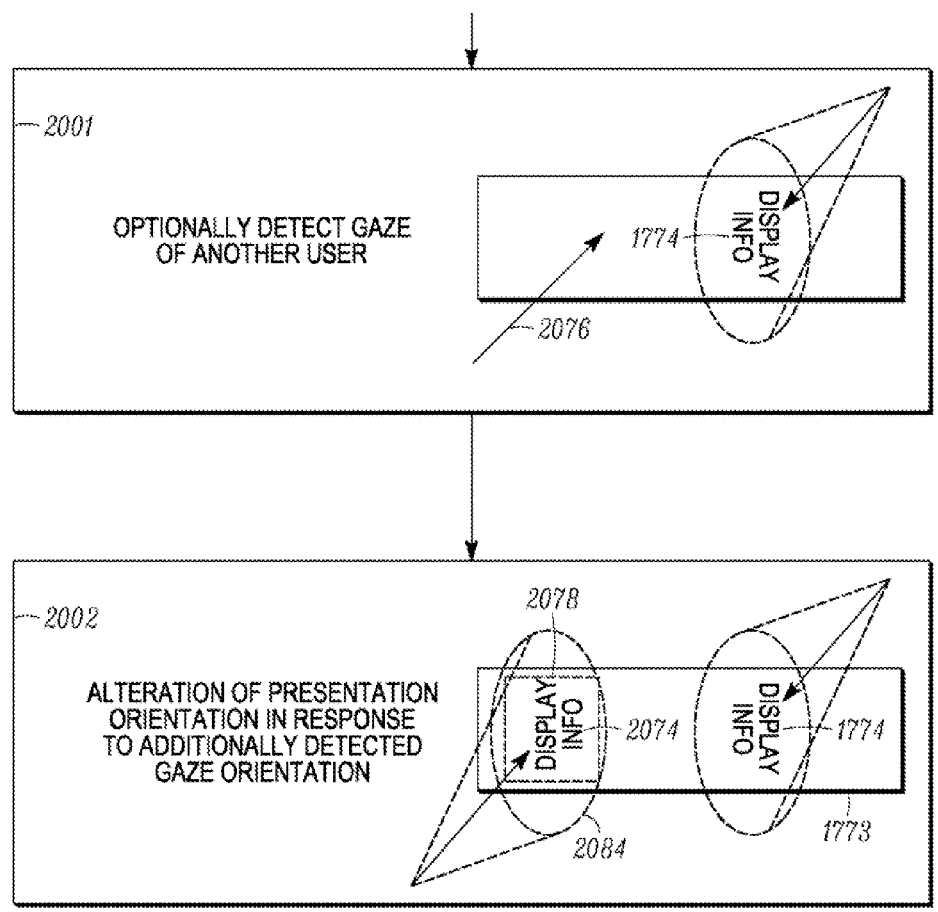
FIG. 20 illustrates another method and apparatus for altering the presentation of data on a display of a wearable electronic device in response to a detected gaze direction in accordance with one or more embodiments of the invention.

Turning now to FIG. 20, illustrated therein are method steps corresponding to the use case described above with reference to FIG. 16. At step 2001, the control circuit is configured to optionally detect the gaze direction 2076 from another user. At step 2002, the control circuit is configured to alter the presentation of the data 1774 in response to the additionally detected gaze direction 2076. The control circuit can also be configured to detect a gaze cone 2084 that corresponds to the additionally detected gaze direction 2076. In this illustrative embodiment, the control circuit is configured to present additional data 2074 in a portion 2078 of the display 1773 that corresponds to the additionally detected gaze direction 2076. Other alterations of the presentation of the data 1774 will be obvious to those of ordinary skill in the art having the benefit of this disclosure.

As noted above, detected gaze direction or gaze cone is but one way to alter the presentation of data on a display. Not all electronic devices will lend themselves to the use of gaze detectors. Economic factors, manufacturing factors, and other external factors may result in the use of a gaze detector being impractical in some embodiments. For instance, a particular electronic device manufacturer may want to include gaze detectors in luxury products, while offering more basic options in non-luxury products.

Embodiments of the present invention contemplate that devices other than gaze detectors can be used as inputs for altering the presentation of data on a display. For example, in some embodiments, rather than using a gaze detector, the electronic device will use an orientation detector to detect the physical and geometric orientation of the electronic device relative to the user. As noted above, the orientation detector can be of an accelerometer, an audio sensor, an infrared sensor, a thermal sensor, a gyroscope, an imager, or combinations thereof. For example, where the orientation detector is an imaging device or camera, the orientation detector can not only detect an orientation of the electronic device relative to the user, but also relative to the ground by capturing images and detecting image data corresponding to the user, the horizon, or both. Other orientation detectors will be obvious to those of ordinary skill in the art having the benefit of this disclosure.

Figure 21:
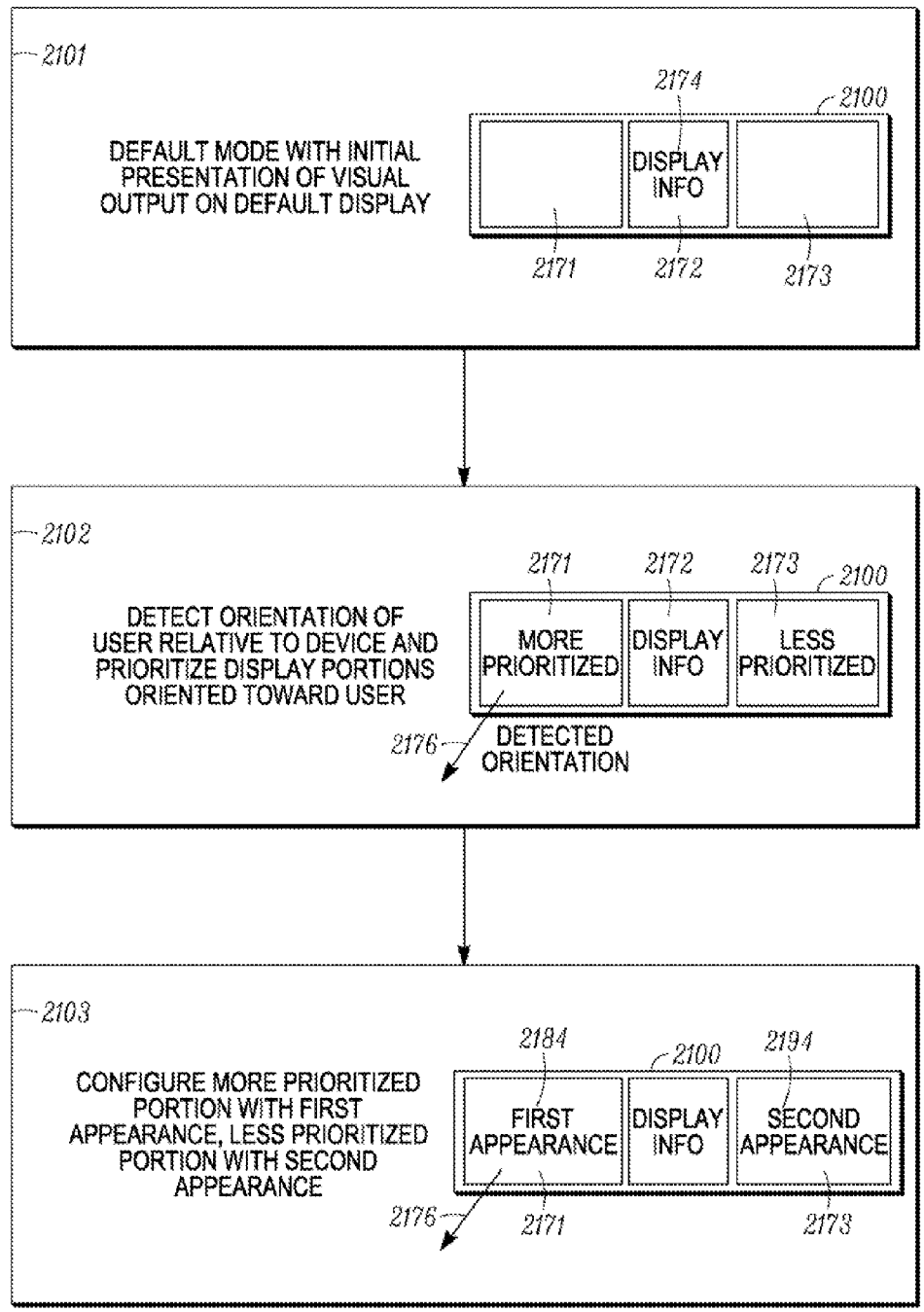
FIG. 21 illustrates a method and apparatus for prioritizing portions of a display in a wearable electronic device configured in accordance with one or more embodiments of the invention.

Turning now to FIG. 21, illustrated therein are the steps of a method for using an orientation detector in accordance with one or more embodiments of the invention. At step 2101, an electronic device 2100 has three displays 2171,2172,2173. The electronic device 2100 is in a default mode, with data 2174 being presented only on display 2172. Optionally, displays 2171,2173 can be turned OFF or placed in a low-power or sleep mode. In one embodiment, displays 2171,2173 are configured to present soothing background images or wallpaper when not presenting data. These soothing background images or wallpaper can be user definable in one embodiment. In another embodiment, the soothing background images or wallpaper can be automatically selected based upon detected environmental conditions. For example, an imaging device of the electronic device 2100 may take pictures of the user's clothing. The control circuit of the electronic device 2100 may then choose wallpaper images that complement the user's clothing. This is but one example of how soothing background images or wallpaper can be selected. Others will be obvious to those of ordinary skill in the art having the benefit of this disclosure.

At step 2102, an orientation detector of the electronic device 2100 detects an orientation of the electronic device 2100 relative to the user. In one embodiment, the control circuit of the electronic device 2100 is then configured to prioritize one or more portions of the display in response to a detected orientation 2176 of the electronic device 2100 relative to the user. Said differently, the orientation detector detects to which side of the wearable electronic device a user is disposed.

Prioritization can occur in a variety of ways. As noted above, where the electronic device 2100 is a wearable electronic device configured to enfold about the wrist of the user, radially disposed portions of the display are prioritized above ulnarly disposed portions of the display. In a more basic embodiment, portions of the display disposed closer to the detected orientation 2176 can be prioritized over portions of the display disposed farther from the detected orientation 2176. In the illustrative embodiment of FIG. 21, at step 2102 the control circuit prioritizes display 2171 with the highest priority because it is closest to the detected orientation 2176. Display 2172 is the next highest prioritized display because it is next closest to the detected orientation 2176. Display 2173 is the least prioritized display because it is farthest from the detected orientation 2176.

When the display comprises a segmented display comprising a plurality of individual display devices as shown above in FIG. 9, a more prioritized portion of the display can comprise a first display device of the segmented display, while a less prioritized portion of the display can comprises at least a second display device. Where the display is a single, flexible display, more on the other hand, more prioritized portions of the display can comprise partial sections or portions of the single, flexible display, while less prioritized portions can comprise other partial sections, portions, or areas of the display. Where, as in FIG. 21, the display comprises three displays 2171,2172,2713, more prioritized portions can be a first display, e.g., display 2171, or a portion of a first display, while less prioritized portions can be a second display, e.g., display 2173, or portions of the second display, where the first display and second display are separate and distinct from each other. Combinations of the above can also be used in the prioritization architecture.

At step 2103, the control circuit of the electronic device 2100 is operable to configure a more prioritized portion of the display with a first appearance and a less prioritized portion of the display with a second appearance. As shown at step 2103, display 2171 has been configured with a first appearance 2184, while display 2173 has been configured with a second appearance 2194. In this illustrative embodiment, the first appearance 2184 and the second appearance 2194 are different, although in other embodiments they can be the same.

Figure 22:
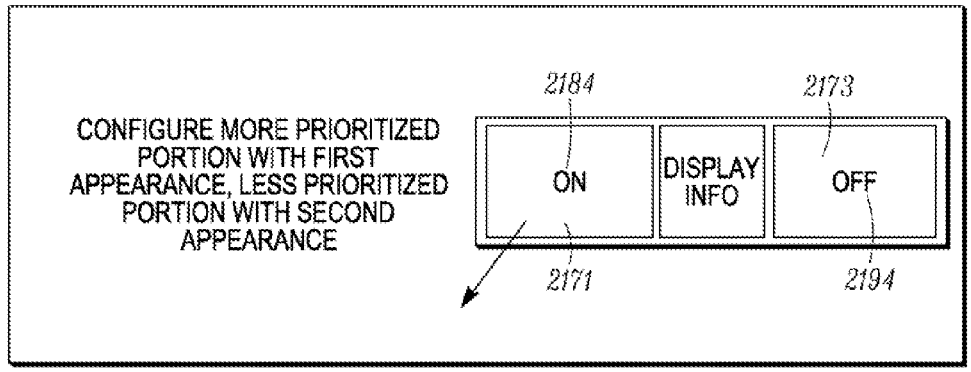
FIGS. 22-25 illustrate methods and apparatuses for configuring prioritized portions of a display in a wearable electronic device configured in accordance with one or more embodiments of the invention.

The first appearance 2184 and the second appearance 2194 can take a variety of forms. Turning briefly to FIG. 22, in one embodiment, the difference in appearance is the difference between a display being ON and OFF (or in a low-power or sleep mode). For example, in one embodiment the first appearance 2184 comprises the more prioritized portion of the display being ON, while the second appearance 2194 comprises the less prioritized portion of the display being OFF or in a low-power or sleep mode. Accordingly, display 2171 can be turned ON, while display 2173 is turned OFF. Said differently, in one embodiment the control circuit can be configured to actuate or activate portions of the display facing the user and deactuate or deactivate portions of the display facing away from the user.

Figure 24:
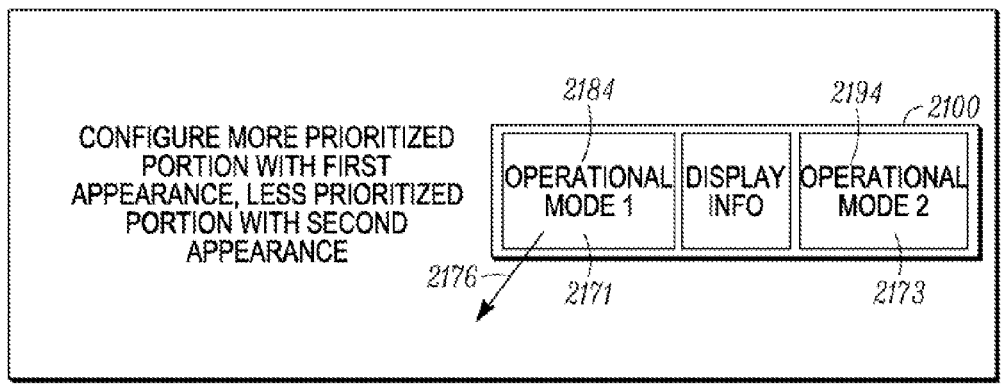

In other embodiments, the first appearance 2184 and second appearance 2194 can be different. Turning briefly to FIG. 24, the first appearance 2184 can correspond to a first operational mode of the electronic device 2100, while the second appearance 2194 can correspond to a second operational mode of the electronic device 2100. For example, the first appearance 2184 presented on display 2171 can be an email application, while the second appearance 2194 presented on display 2173 is a multimedia player. The operational modes can be user definable, such that a particular portion of the display or display device can be configured to enter a predetermined operational mode upon the orientation detector detecting a detected orientation 2176.

Figure 23:
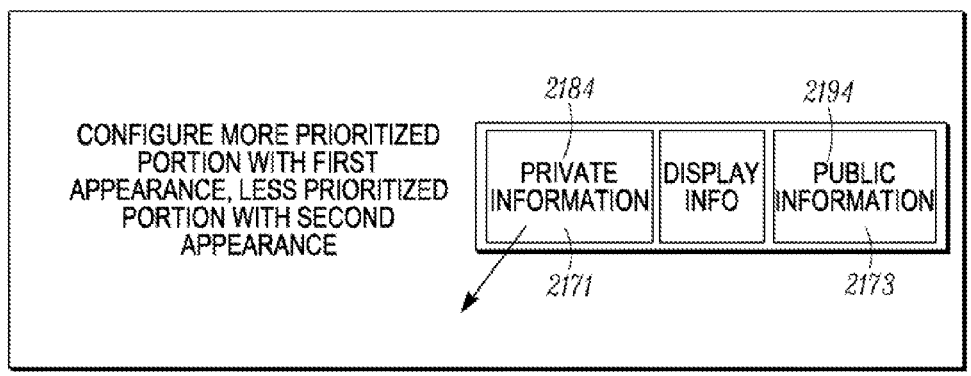

Turning briefly to FIG. 23, in another embodiment, the first appearance 2184 can be the presentation of private information, while the second appearance 2194 is the presentation of public information. For example, the first appearance 2184 presented on display 2171 can be a text message sent from a friend, while the second appearance 2194 presented on display 2173 is a publicly available stock quote.

Figure 25:
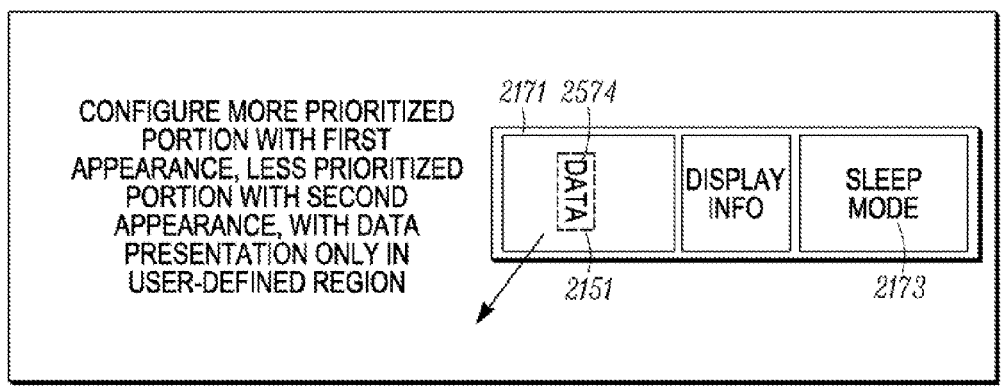

In yet another embodiment, the control circuit can be operable to present data only in the more prioritized portions of the display. Illustrating by example, and turning briefly to FIG. 25, the control circuit may present data 2574 only on display 2171, while leaving display 2173 blank. The portion 2151 of display 2171 upon which the data 2574 is presented can be user definable, or can be in response to touch input. Such an embodiment is useful for privacy modes of operation when the user wants information to be present only on portions of the electronic device 2100 oriented towards or facing them.

While the above figures provide a few examples of how the first appearance 2184 can be different from the second appearance 2194, it will be clear to those of ordinary skill in the art having the benefit of this disclosure that other ways of configuring the first appearance 2184 and the second appearance 2194 can be used as well. For example, in one embodiment the first appearance 2184 can be presenting information with a first magnification, while the second appearance 2194 can be presenting information with a second magnification. The various magnification levels can, in one embodiment, be based upon a detected distance of users from the electronic device 2100. For example, when a user is a first distance from the electronic device 2100, and a friend is a second distance from the electronic device 2100, the control circuit can present information on the displays with different magnifications for easier readability.

In another embodiment, the first appearance 2184 comprises presenting information with a first luminous intensity while the second appearance 2194 comprises presenting information with a second luminous intensity. In another embodiment, the first appearance 2184 comprises presenting information with a first backlighting intensity and the second appearance 2194 comprises presenting information with a second backlighting intensity. In another embodiment, the first appearance 2184 comprises presenting information with a first font, while the second appearance 2194 comprises presenting information with a second font.

In other embodiments, the first appearance 2184 and second appearance 2194 differ by non-visible output. The first appearance 2184 may be a presentation of images with sound, while the second appearance 2194 comprises presenting images with no sound or images with closed captioning. These examples are illustrative only, as others will be readily apparent to those of ordinary skill in the art having the benefit of this disclosure.

Figure 26:
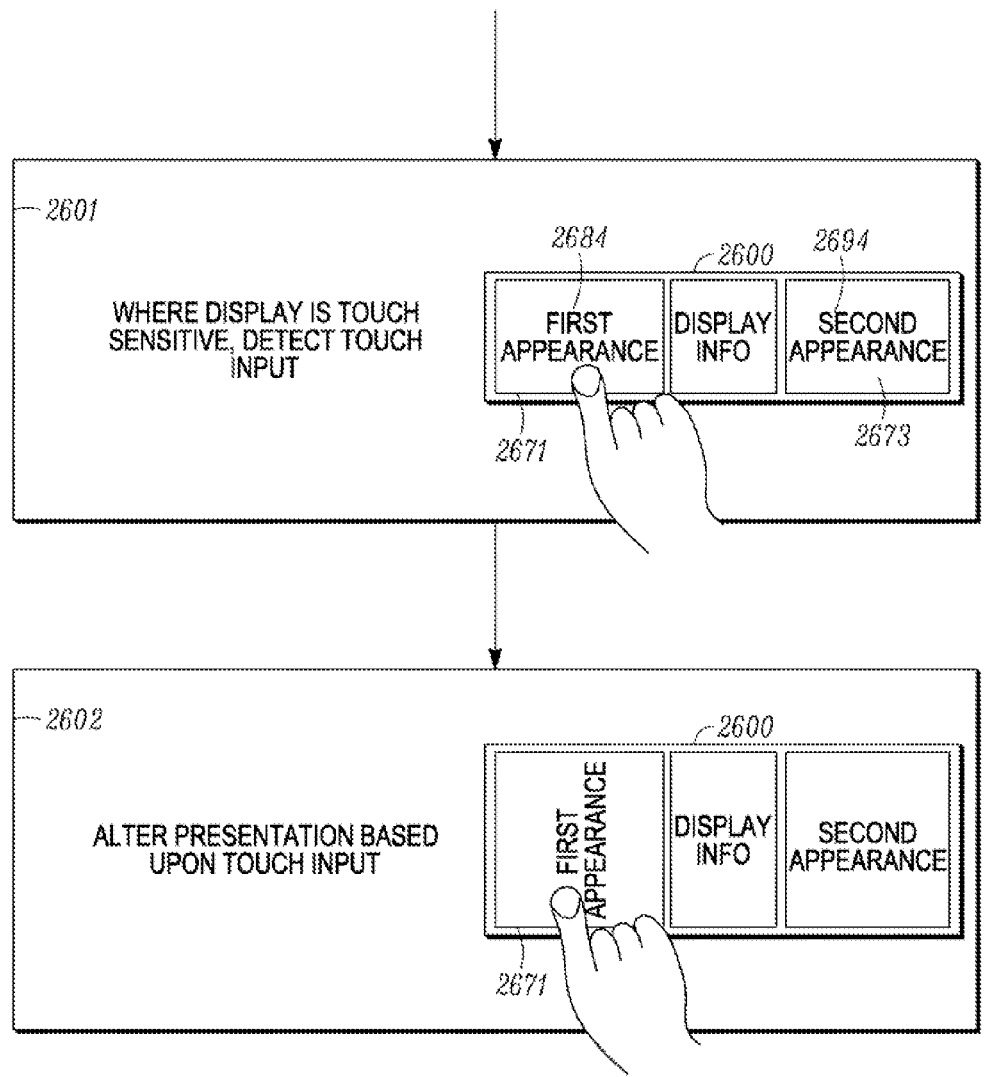
FIG. 26 illustrates a method and apparatus for responding to user gestures in accordance with one or more embodiments of the invention.

On the subject of touch-sensitive displays turning now to FIG. 26, illustrated therein are steps of a method for altering the presentation of an electronic device 2600 having both an orientation detector and a touch-sensitive display. As shown at step 2601, a control circuit of the electronic device has prioritized display 2671 over display 2673 in response to a detected orientation of the electronic device 2600 relative to the user. Accordingly, display 2671 has been configured with a first appearance 2684 that is different from a second appearance 2694 present on display 2673.

As also shown at step 2601, a user is providing touch input to display 2671. At step 2602, the control circuit of the electronic device 2600 alters the presentation of data on display 2671 in response to the touch input 2681. In this illustrative embodiment, data present on display 2671 has been rotated about the location at which the touch input 2681 was received. Other options are available. For example, the control circuit in another embodiment is configured to present data within a predefined region of the display about the touch input, thereby reducing the available area of the display suitable for presenting data as was shown in FIG. 15 above. In another embodiment, the control circuit can be configured to actuate or activate the other portions of the display when the other portions of the display receive touch input. Other functions that can occur in response to the touch input will be readily apparent to those of ordinary skill in the art having the benefit of this disclosure.

In one embodiment, a user is able to employ touch input to change the prioritization of the various displays. Such a feature can be useful when the user wants to show something to a friend or co-worker that is facing them. The orientation detector may, for example, turn OFF a display facing away from the user. The user may then want to turn that display back ON to show pictures or other information to the friend. Steps for such a method are shown in FIG. 26.

Figure 27:
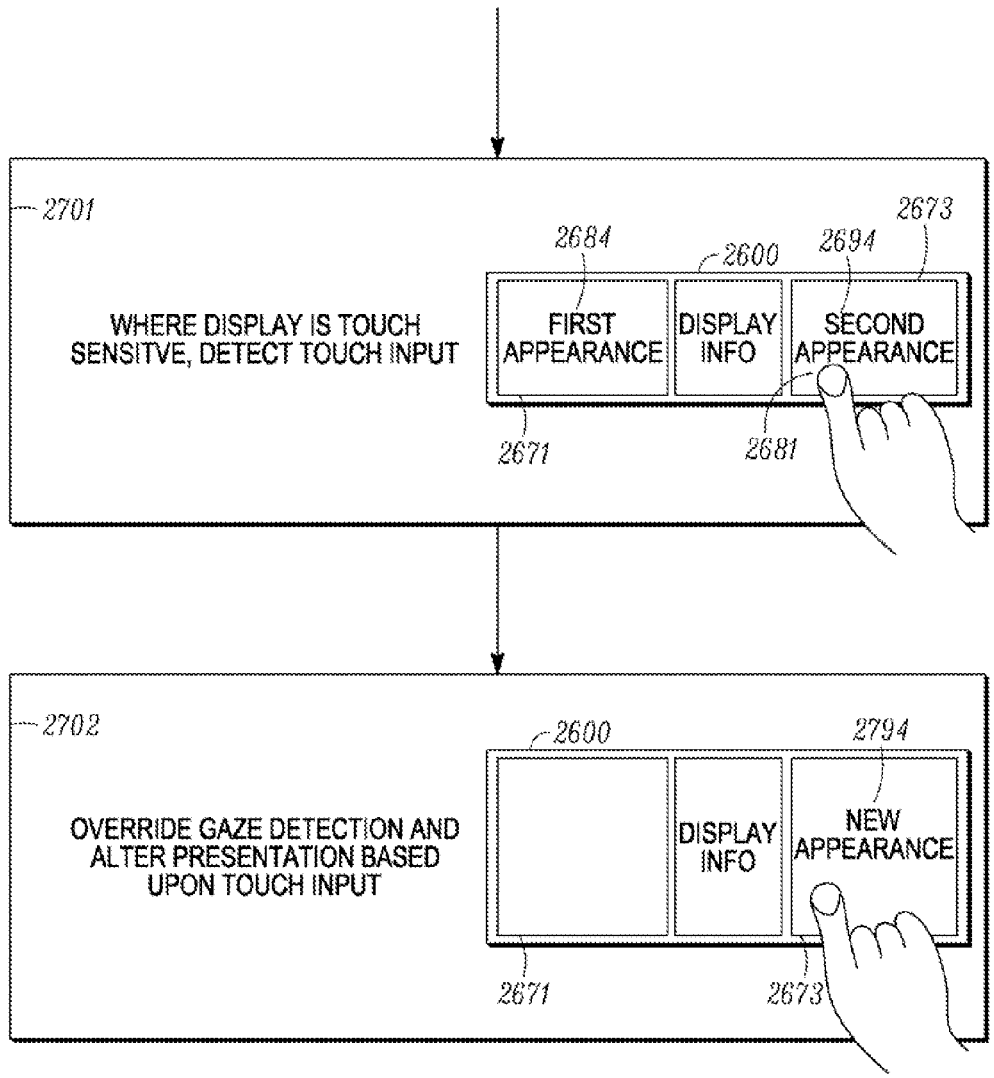
FIG. 27 illustrates another method and apparatus for responding to user gestures in accordance with one or more embodiments of the invention.

Turning now to FIG. 27, illustrated therein are steps of another method for altering the presentation of an electronic device 2600 having both an orientation detector and a touch-sensitive display. As shown at step 2701, a control circuit of the electronic device has prioritized display 2671 over display 2673 in response to a detected orientation of the electronic device 2600 relative to the user. Accordingly, display 2671 has been configured with a first appearance 2684 that is different from a second appearance 2694 present on display 2673.

As also shown at step 2701, a user is providing touch input 2681 to display 2673. In this embodiment, the control circuit of the electronic device is configured to change the prioritization of the displays in response to the touch input 2781. The change can be making display 2673 have an equal priority with display 2673. Accordingly, the control circuit may leave the first appearance 2684 on display 2671 and then change the presentation appearing on display 2673. In this illustrative embodiment, the control circuit is configured to reverse the prioritization such that display 2673 is prioritized above display 2671. Thus, as shown at step 2702, the control circuit has configured display 2673 with a new appearance 2794. Display 2671 has been placed into an idle mode.

Figure 28:
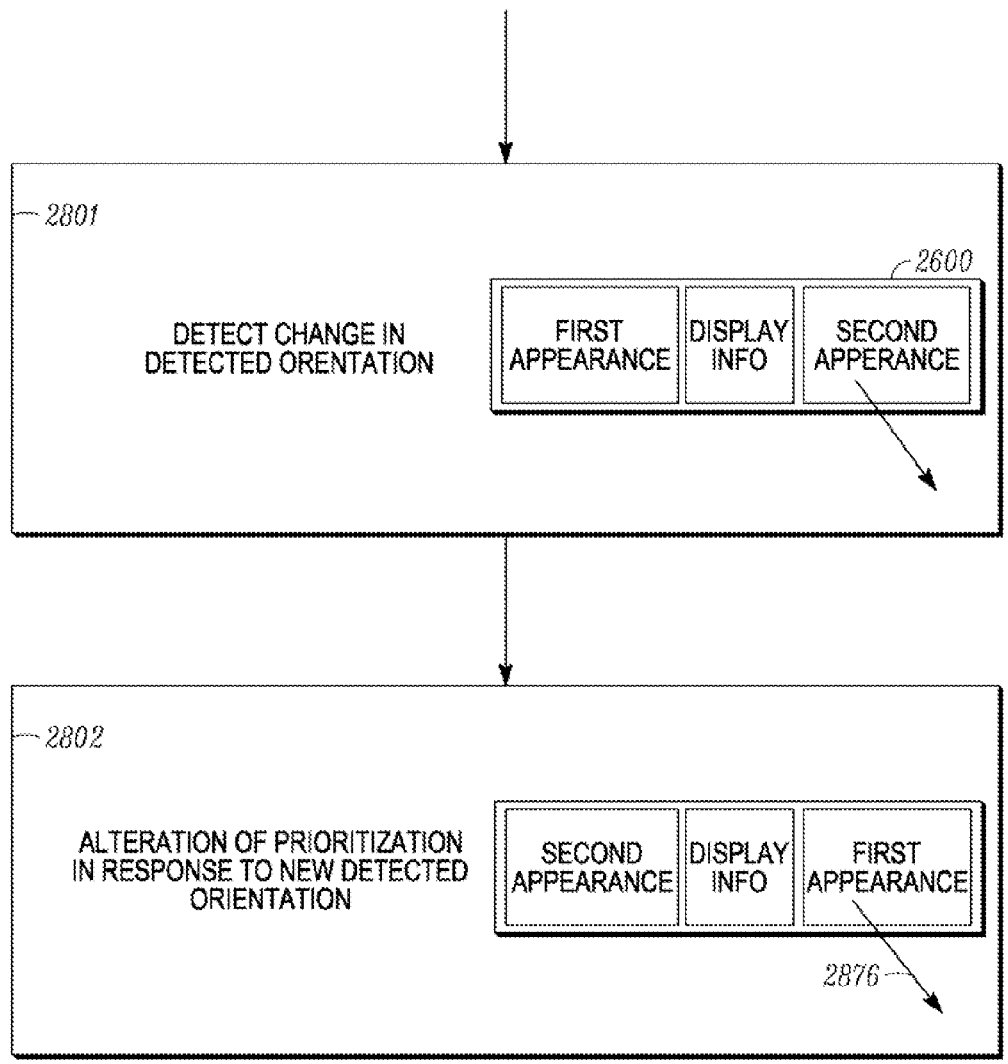
FIG. 28 illustrates a method and apparatus for configuring prioritized portions of a display in a wearable electronic device configured in accordance with one or more embodiments of the invention.

The change in prioritization need not be in response to touch input. Turning to FIG. 28, the change in prioritization can be in response to a newly detected orientation of the electronic device 2600 relative to the user. The user may move their hand, move the electronic device 2600 from one arm to the other, or swing an appendage toward another user such that the dominant orientation direction changes. At step 2801, the control circuit detects a change in detected orientation. At step 2802, the control circuit accordingly changes the prioritization of the displays based upon the newly detected orientation 2876.

While FIGS. 17-20 illustrated method steps for use with a gaze detector, and FIGS. 21-28 illustrated method steps for use with an orientation detector, it will be clear to those of ordinary skill in the art having the benefit of this disclosure that the devices can be combined. Said differently, the orientation detector can be combined with a gaze detector. For example, in one embodiment the orientation detector comprises a gaze detector operable to determine a detected gaze direction of the user. Where this is the case, the control circuit can be operable to determine a gaze cone corresponding to the detected gaze direction as described above. The control circuit can further be configured to prioritize portions of the display disposed within the gaze cone as a more prioritized portions of the display and to prioritize other portions of the display disposed outside the gaze cone as less prioritized portions of the display.

As will be understood at this point, electronic devices configured in accordance with embodiments of the invention are highly versatile in function and appearance. Yet another feature possible with such an electronic device is shown in FIG. 29.

Figure 29:
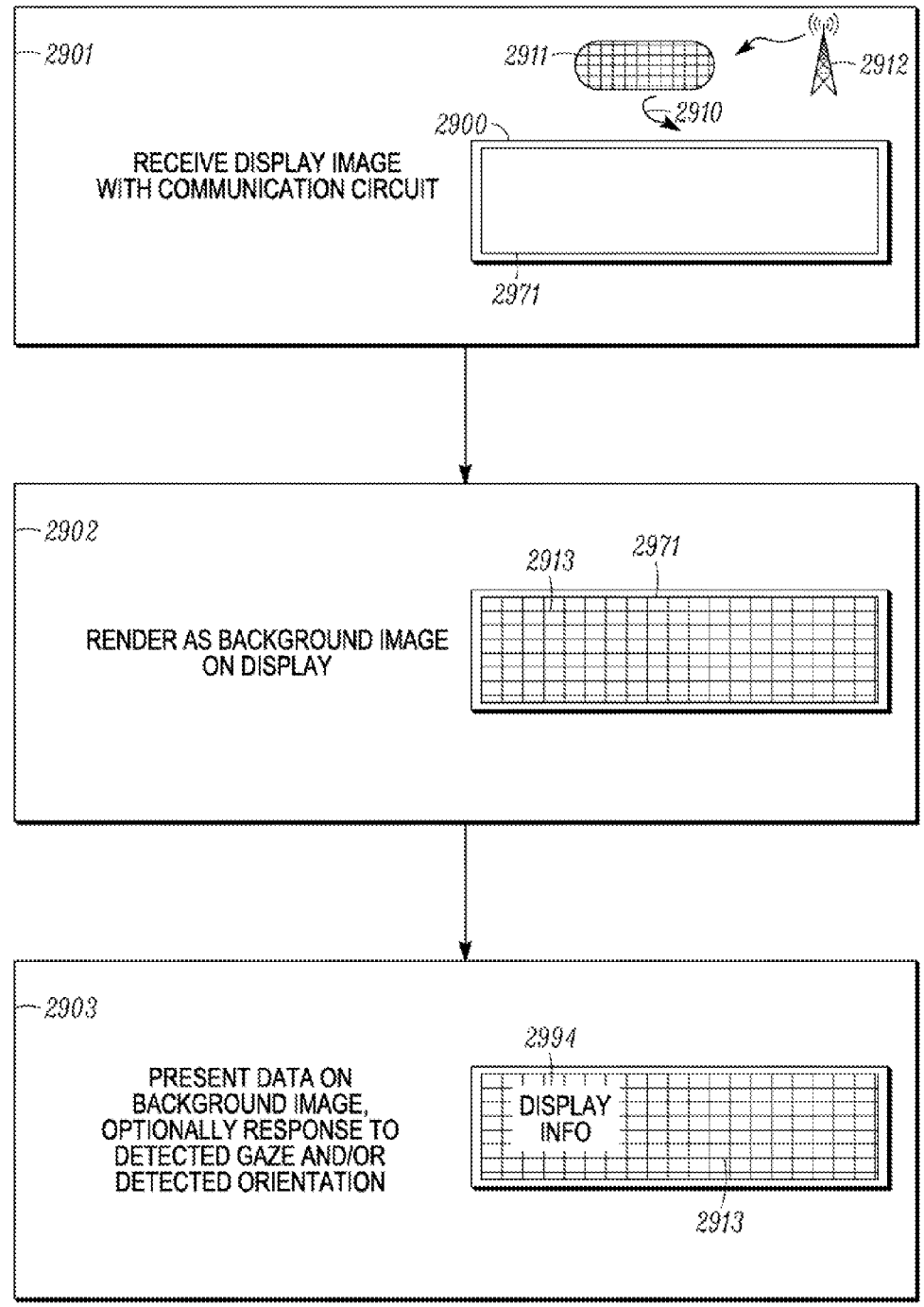
FIG. 29 illustrates a method and apparatus for rendering a background image on a display configured in accordance with one or more embodiments of the invention.

Turning to FIG. 29, illustrated therein are steps of a method for yet another way of altering the presentation of data on a display in accordance with one or more embodiments of the invention. Beginning at step 2901, a wearable electronic device 2900 includes a display 2971 disposed along a major face of the wearable housing of the wearable electronic device 2900. The wearable electronic device 2900 also includes a communication circuit and a control circuit as described above.

In one embodiment, the communication circuit and control circuit are operable to receive 2910 a display image 2911 from a remote source 2912. The display image 2911, in one embodiment, is a wallpaper or background image. The remote source 2912 can be a data network service provider, a vendor of images, or another source. Once received, as shown at step 2902, the control circuit can be configured to render the display image 2911 as a background image 2913 on the display 2971. As shown at step 2903, the control circuit can then be configured to present data 2974 atop the background image 2913. The presentation of that data 2974 can be in accordance with any of the method set forth above: touch input, detected gaze direction, a detected gaze cone, detected orientation, or combinations thereof.

Figure 30:
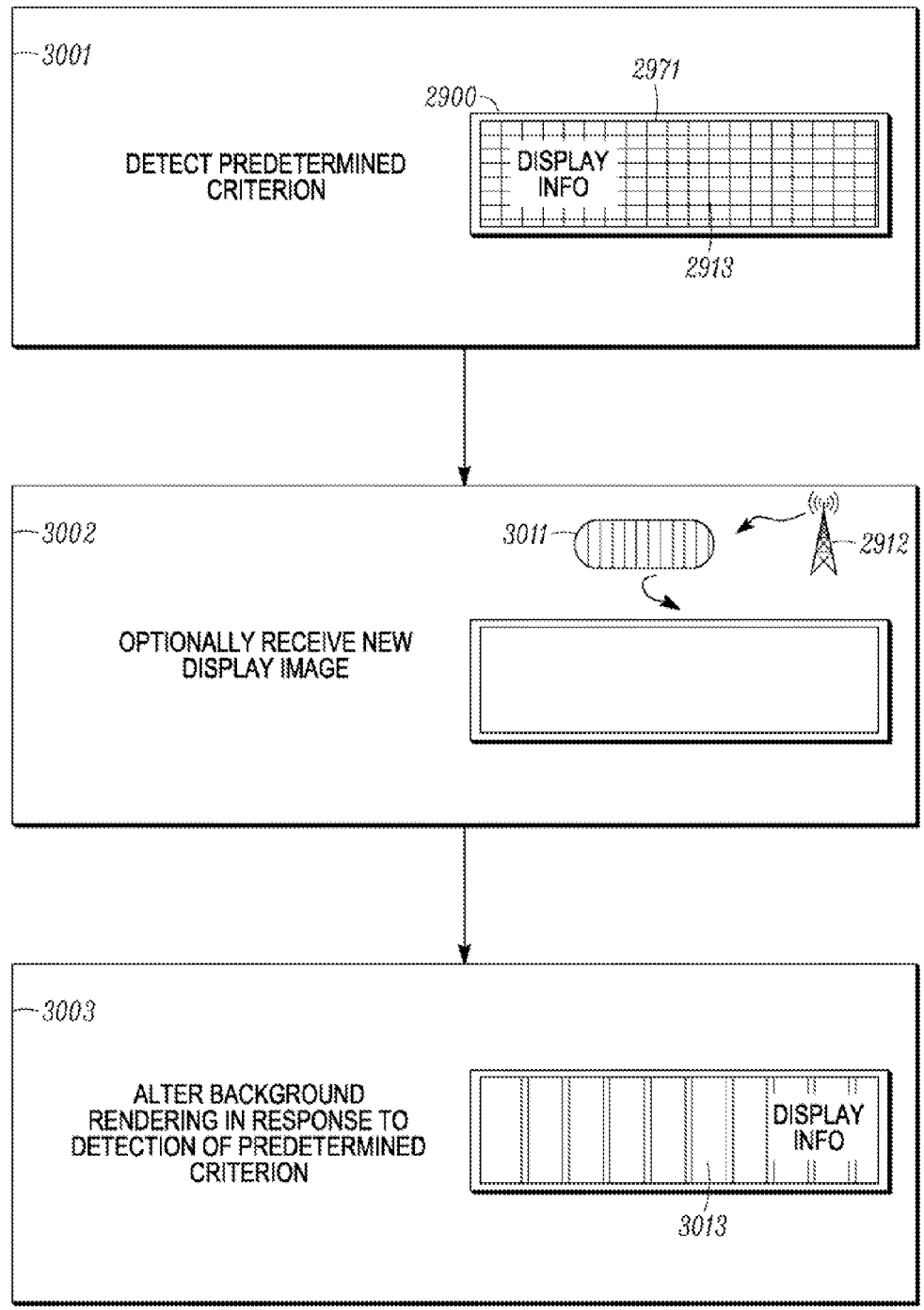
FIG. 30 illustrates a method and apparatus for rendering a background image on a display configured in accordance with one or more embodiments of the invention.

Turning to FIG. 30, the control circuit of the electronic device 2900 can be configured to change the background image 2913 in response to predetermined criteria. The predetermined criteria can vary. One example was explained above, i.e., detection of a person's wardrobe. The electronic device 2900 can include an imager configured to capture images of the clothing that the user is wearing. In another embodiment, the predetermined criteria can be the expiration of a timer. In another embodiment, the predetermined criteria can be a user's mood, which can be detected by temperature or other sensors described above. Other methods of detecting mood, emotional states, or physiological states of the user are described in commonly assigned U.S. Pat. No. 7,874,983, entitled, "Determination of Emotional and Physiological states of a Recipient of Communication," with Zancho et al. as inventors, which is incorporated herein by reference. In yet another embodiment where the electronic device 2900 includes wellness sensors, the predetermined criteria can be a detected health condition of the user. Where the display 2971 is touch sensitive, the predetermined criterion can be an object touching the touch sensitive display. Regardless of which criterion or criteria is used, it is detected at step 3001. When the predetermined condition is detected, the control circuit can be configured to change the background image 2913.

Accordingly, at step 3002, the control circuit can be configured to receive another display image 3011 from the remote source 2912. For example, where the predetermined criterion detected at step 3001 was the color of the user's clothes, the new display image 3011 can be an image that is complementary with the user's clothes. At step 3003, the control circuit can render the new display image 3011 as a new background image 3013.

Figure 31:
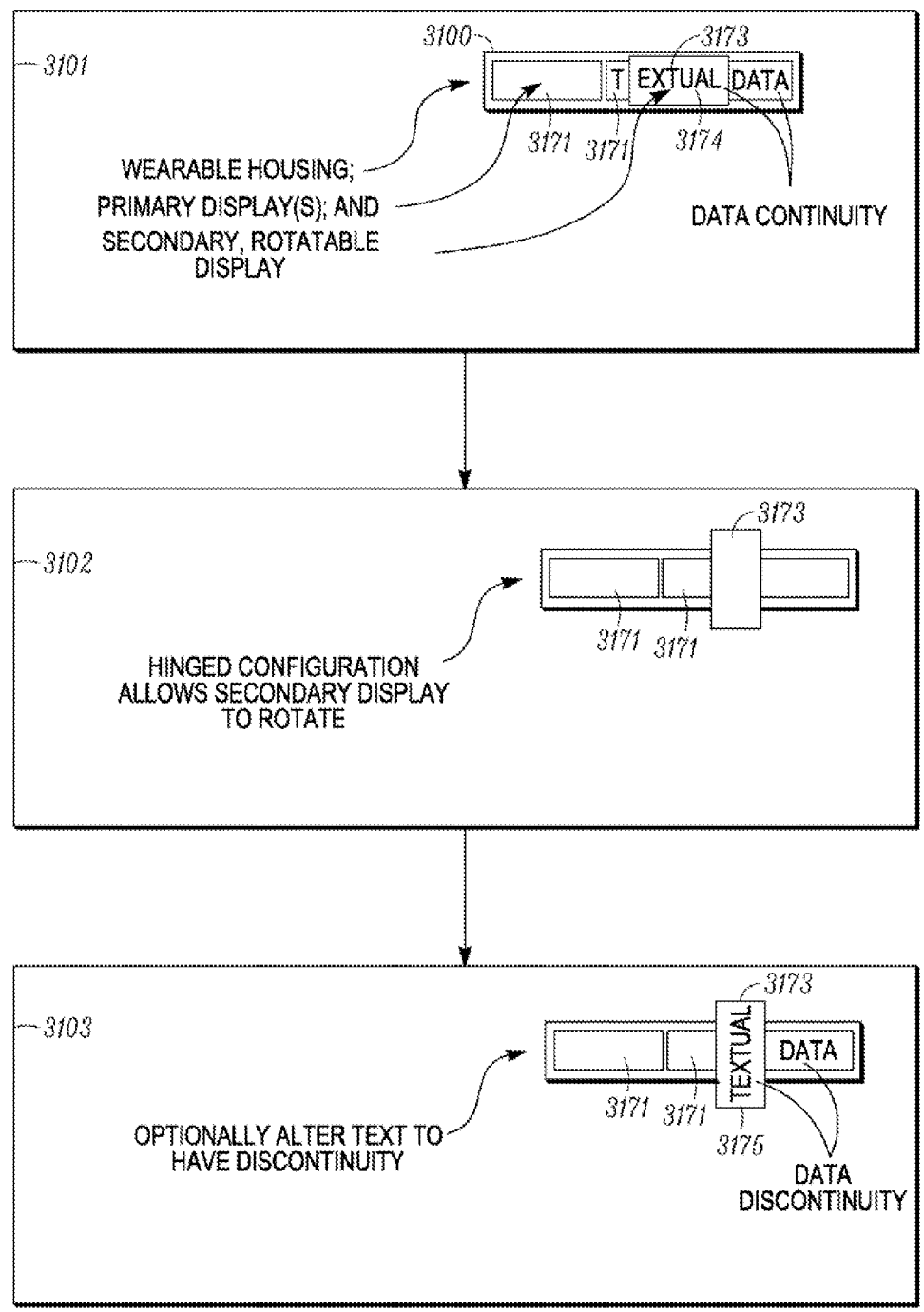
FIG. 31 illustrates a method and apparatus with a rotatable display in operation in accordance with one or more embodiments of the invention.

As mentioned above, in one or more embodiments the electronic devices configured in accordance with embodiments of the invention can be configured with a secondary display coupled to the wearable housing by a hinged connection so as to be rotatable relative to the wearable housing. Turning now to FIG. 31, illustrated therein are steps suitable for a method associated with such a device.

Beginning at step 3101, a wearable electronic device 3100 includes a wearable housing. A primary display 3171 is disposed along a major face of the wearable housing. Where the primary display 3171 is a flexible display, the primary display 3171 will bend and flex to alter its physical geometry as the wearable housing bends and flexes. Where the primary display 3171 is a segmented display, or is made from discrete display devices, those devices can change physical relationships relative to each other when the wearable housing flexes to a physical geometry of the primary display 3171 as the wearable housing bends or flexes.

The wearable electronic device 3100 also includes a secondary display 3173 coupled to the wearable housing. In one embodiment, the secondary display 3173 is coupled to the wearable housing by a hinged connection so as to be rotatable relative to the wearable housing. The hinged connection can be configured to allow the secondary display 3173 to rotate between at least a first orientation relative to the wearable housing, shown in step 3101, to a second, angularly displaced orientation relative to the wearable housing, shown in step 3102. This rotation can be in response to user action, e.g., the user spinning the secondary display 3173 with a finger. Alternatively, the rotation can be assisted by a preloading device, or can be in response to a motor.

The first orientation and the second, angularly displaced orientation relative to the wearable housing can be as shown in FIG. 31. Alternatively, these orientations can be different. For example, the transition from the first orientation to second, angularly displaced orientation can be with a motion occurring parallel with the user's wrist in one embodiment, as shown in FIG. 31. However, the transition from the first orientation to second, angularly displaced orientation can be with a motion occurring perpendicular with the user's wrist in another embodiment, with the secondary display 3173 sticking "out" from the arm. Other motional directions will be obvious to those of ordinary skill in the art having the benefit of this disclosure.

The presentation of data on the displays can change when the secondary display 3173 is rotated. In step 3101, the control circuit of the wearable electronic device 3100 is configured to display data with continuity between the primary display 3171 and the secondary display 3173 when the secondary display 3173 is in a first orientation. The first orientation shown in step 3101 is where the secondary display 3173 is substantially parallel with the wearable housing of the wearable electronic device 3100. Accordingly, in this embodiment the data 3174 is presented with continuity across the two displays. This is achieved in this embodiment by presenting "T DATA" on the primary display and "EXTUAL" on the secondary display 3173 such that the word "TEXTUAL DATA" is spelled across the displays.

When the secondary display rotates to the second, angularly displaced orientation in step 3102, the control circuit can leave the data 3174 in a continuity presentation, or it may change it to another presentation. For the former, at step 3102, the primary display 3171 may present "TEX DATA", while the secondary display presents "TUAL" to provide continuity across its (now shortened) axis running parallel to the wearable housing.

However, in other embodiments, the control circuit is configured to change from a continuous display to a discontinuous display when the secondary display 3173 is rotated. This is shown in FIG. 31 at step 3103. Rather than providing continuous data that runs from display to display, the data 3175 of step 3103 is discontinuous. This is graphically illustrated with the word "TEXTUAL" being presented substantially orthogonal with the word "DATA." The discontinuous presentation can take other forms, however. As an illustration, the data present on the primary display 3171 may be a stock quote and news about a company, while the data present on the secondary display 3173 is a chart of the stock's performance. Other examples will be readily apparent to those of ordinary skill in the art having the benefit of this disclosure.

Figure 32:
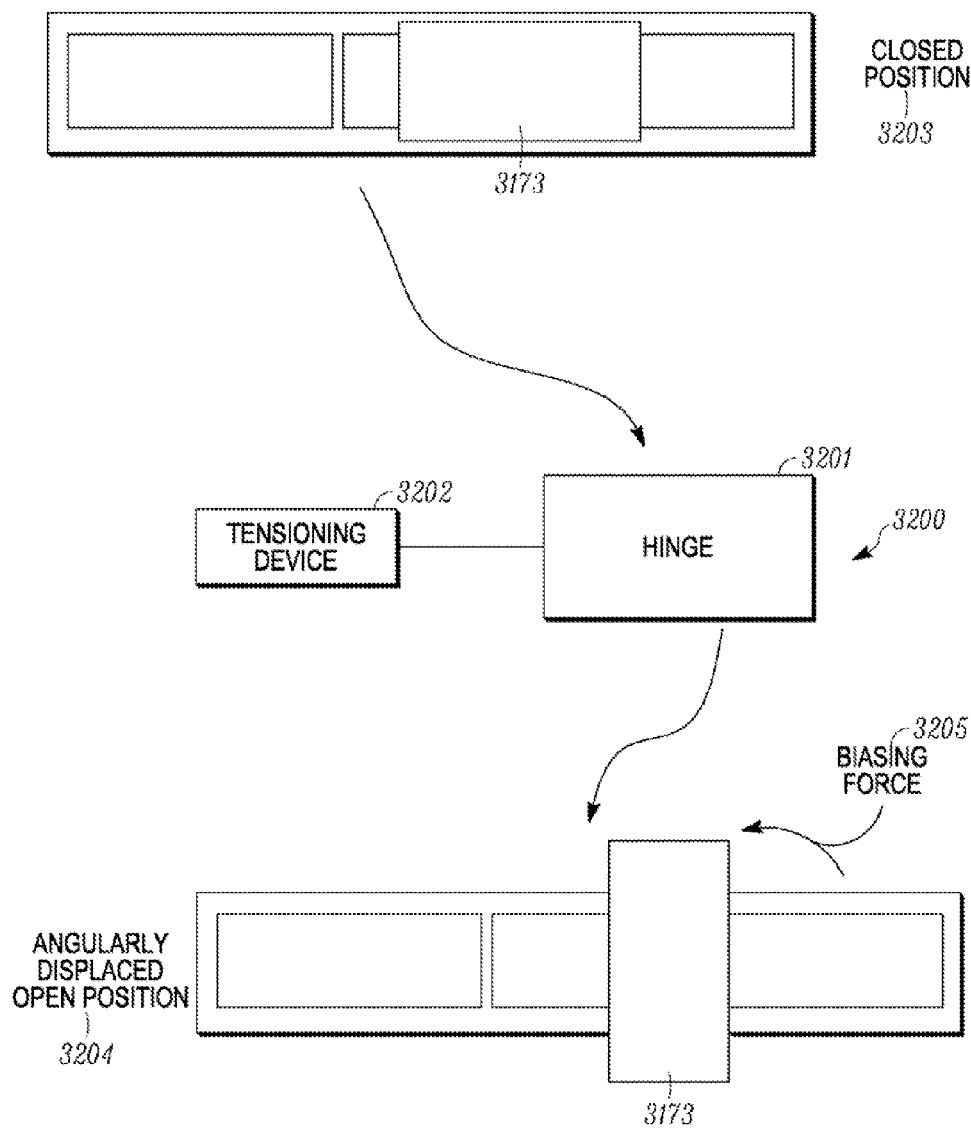
FIGS. 32-34 illustrate various devices having rotatable displays along with their rotation mechanisms, each being configured in accordance with one or more embodiments of the invention.
Figure 33:
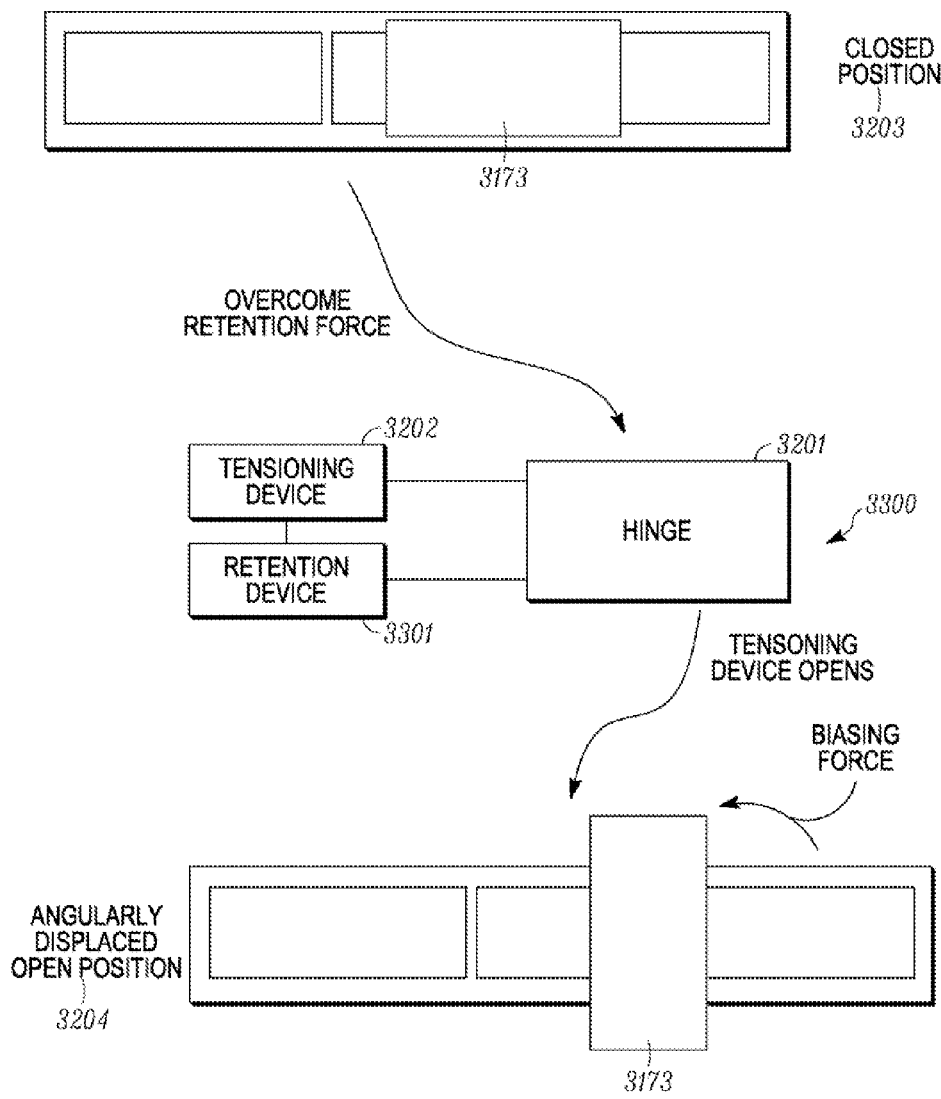
Figure 34:
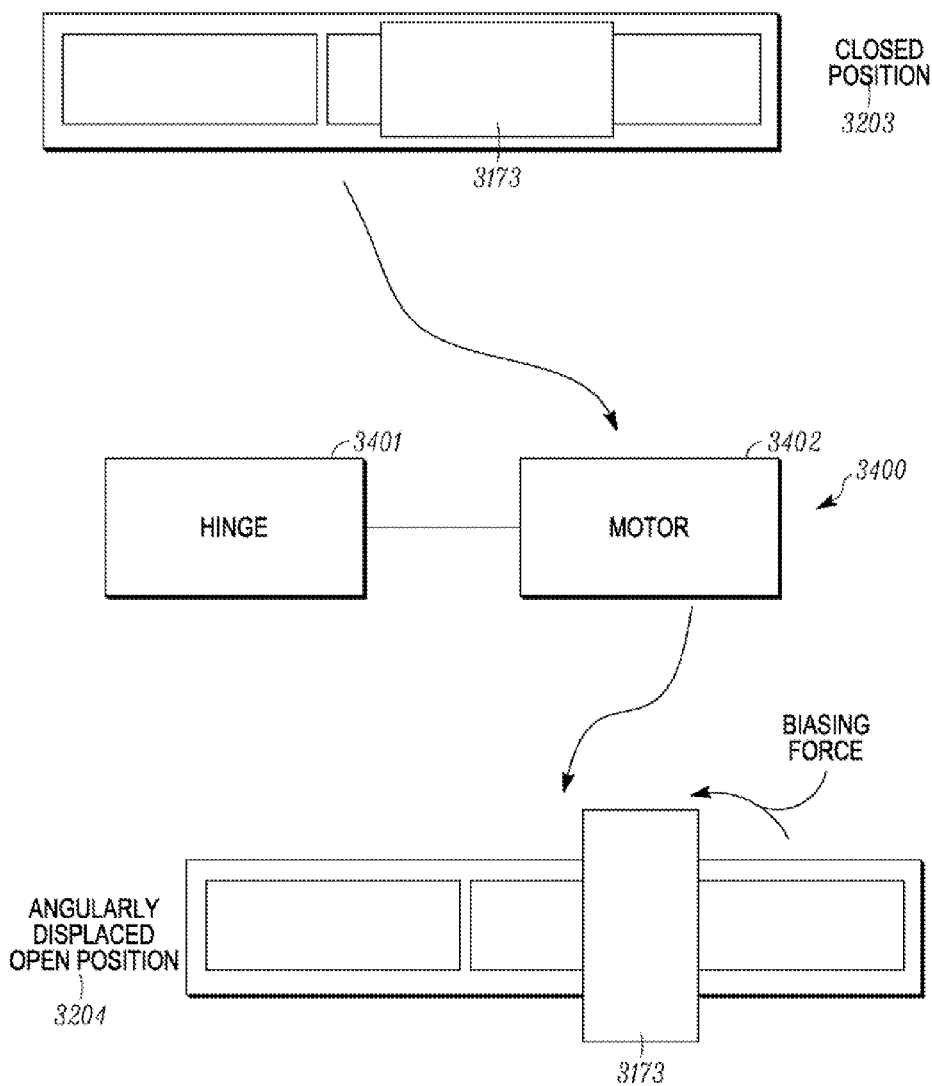

Turning now to FIGS. 32-34, illustrated therein are various ways that the hinged connection between the primary display and the secondary display can be configured. Beginning with FIG. 32, the hinged connection 3200 of this embodiment comprises a hinge 3201 and a tensioning device 3202. The tensioning device 3202 can be a spring or other device configured to bias the hinge 3201 toward a particular direction or orientation, or a device that pre-loads the hinge 3201 to open in a particular direction. In the illustrative embodiment of FIG. 32, the hinged connection 3200 is preloaded with the tensioning device 3202 such that the secondary display 3173 is configured to open a first orientation 3203 to the second, angularly displaced orientation 3204. The tensioning device 3202 does this by applying a biasing force 3205 to the secondary display 3173. Accordingly, when the secondary display 3173 is in the first orientation 3203, the hinged connection 3200 is preloaded with the tensioning device 3202.

Turning to FIG. 33, in this embodiment the hinged connection 3300 includes not only the hinge 3201 and tensioning device 3202, but also a retention device 3301 configured to oppose preloading of the tensioning device 3202 to retain the secondary display 3173 in the first orientation 3203. The retention device 3301 can be a magnetic coupling, a snap, a mechanical protrusion/detent configuration, or other device that holds the secondary display 3173 in the first orientation 3203. Once the user overcomes the retaining force of the retention device 3301, the tensioning device 3302 can open the secondary display 3173 to the second, angularly displaced orientation 3204.

Turning to FIG. 34, in this embodiment the hinged connection 3400 includes a hinge 3401 and a motor 3402. The motor 3402 can be operable to automatically open the secondary display 3173 from the first orientation 3203 to the second, angularly displaced orientation 3204. The motor 3402 may be responsive to a user. For example, the user may touch the secondary display 3173 in one embodiment to actuate the motor 3402. In other embodiments, the motor 3402 can be responsive to a device event, such as an incoming telephone call, incoming text message, incoming multimedia message, or other incoming data. When such information is received, to provide a mechanical alert to the user, the motor 3402 can be configured to at least partially rotate the secondary display 3173 towards the second, angularly displaced orientation 3204.

Many methods and apparatuses for controlling electronic devices configured in accordance with embodiments of the invention have been described above. However, there are still more. As noted above, in one embodiment of a wearable electronic device the wearable housing is flexible. As the wearable housing is active in some embodiments, i.e., as it includes a control circuit capable of working with sensors and executing method steps, the physical configuration of the wearable housing can be used as an input. This input can be used in conjunction with the gaze detecting controls, orientation detecting controls, or touch sensing controls described above.

Figure 35:
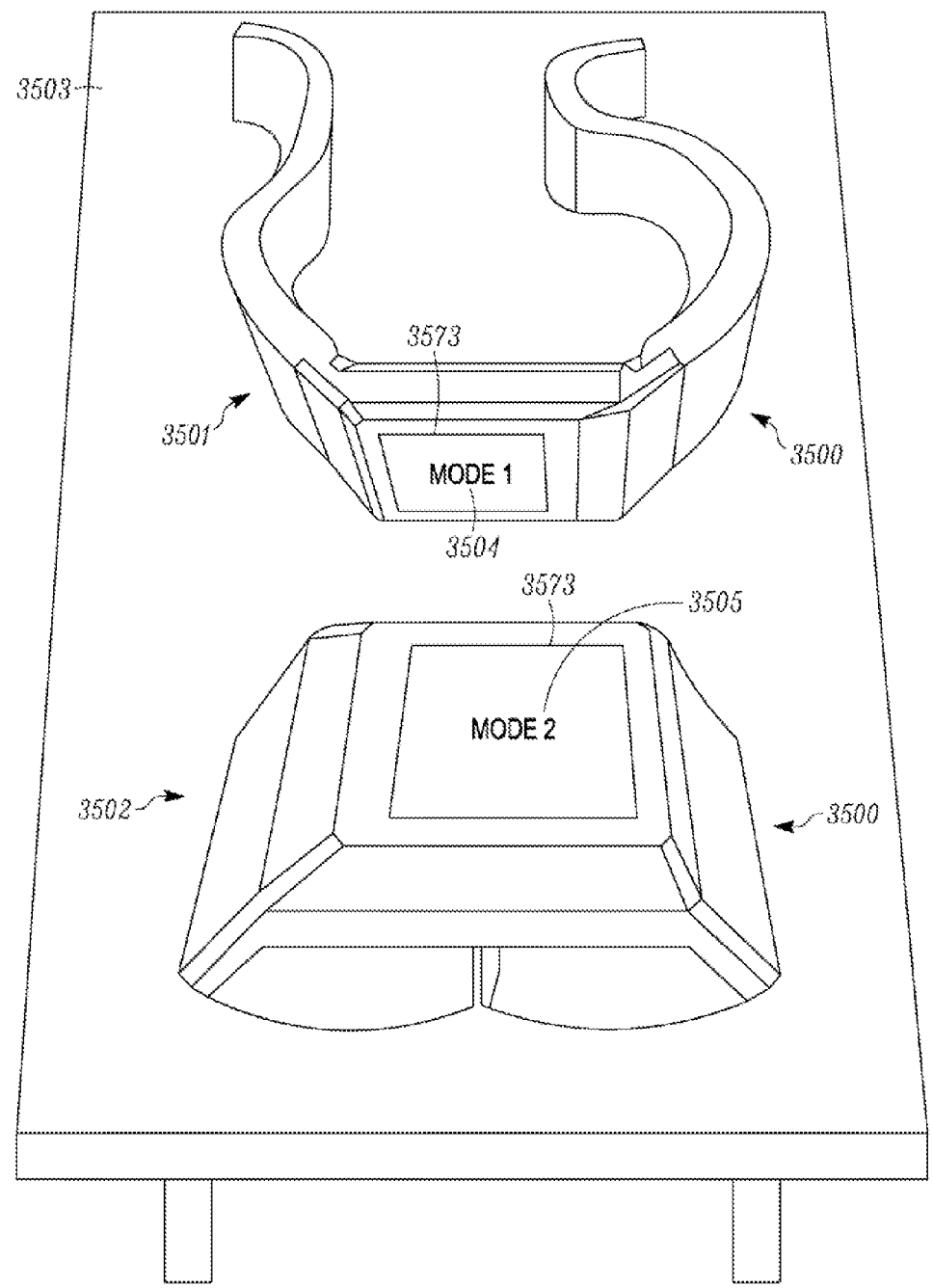
FIG. 35 illustrates one wearable electronic device in two different physical and operational modes in accordance with one or more embodiments of the invention.

Turning to FIG. 35, illustrated therein is another wearable electronic device 3500 configured in accordance with embodiments of the invention. The illustrative wearable electronic device 3500 is shown being placed on a table 3503 in two physical configurations 3501,3502. Physical configuration 3501 shows the wearable electronic device 3500 with its wearable housing elongated, while physical configuration 3502 shows the wearable electronic device 3500 with its wearable housing enfolded, as it might be when enfolded about the appendage of a wearer. The physical orientation of the wearable electronic device can be used to control the operational mode of the wearable electronic device 3500 in some embodiments.

In physical configuration 3501, the wearable electronic device 3500 is in a first operational mode 3504. An example of the operational mode 3504 is that of an alarm clock. This operational mode 3504 might be preferred, for example, when the wearable electronic device 3500 is placed on a nightstand in the evening.

In physical configuration 3502, the wearable electronic device 3500 is in a second operational mode 3505. An example of a second operational mode 3505 is that of a health monitoring mode. This operational mode 3505 might be preferred, for example, when a user is wearing the wearable electronic device 3500 about an appendage. These examples of operational modes are illustrative only, as others will be readily apparent to those of ordinary skill in the art having the benefit of this disclosure. As shown in FIG. 35, a control circuit of the wearable electronic device 3500 can configure the display 3573 in the second operational mode 3505 when the flexible housing is enfolded about the appendage of the user, and configure the display 3573 in the first operational mode 3504 when the flexible housing is elongated.

Figure 36:
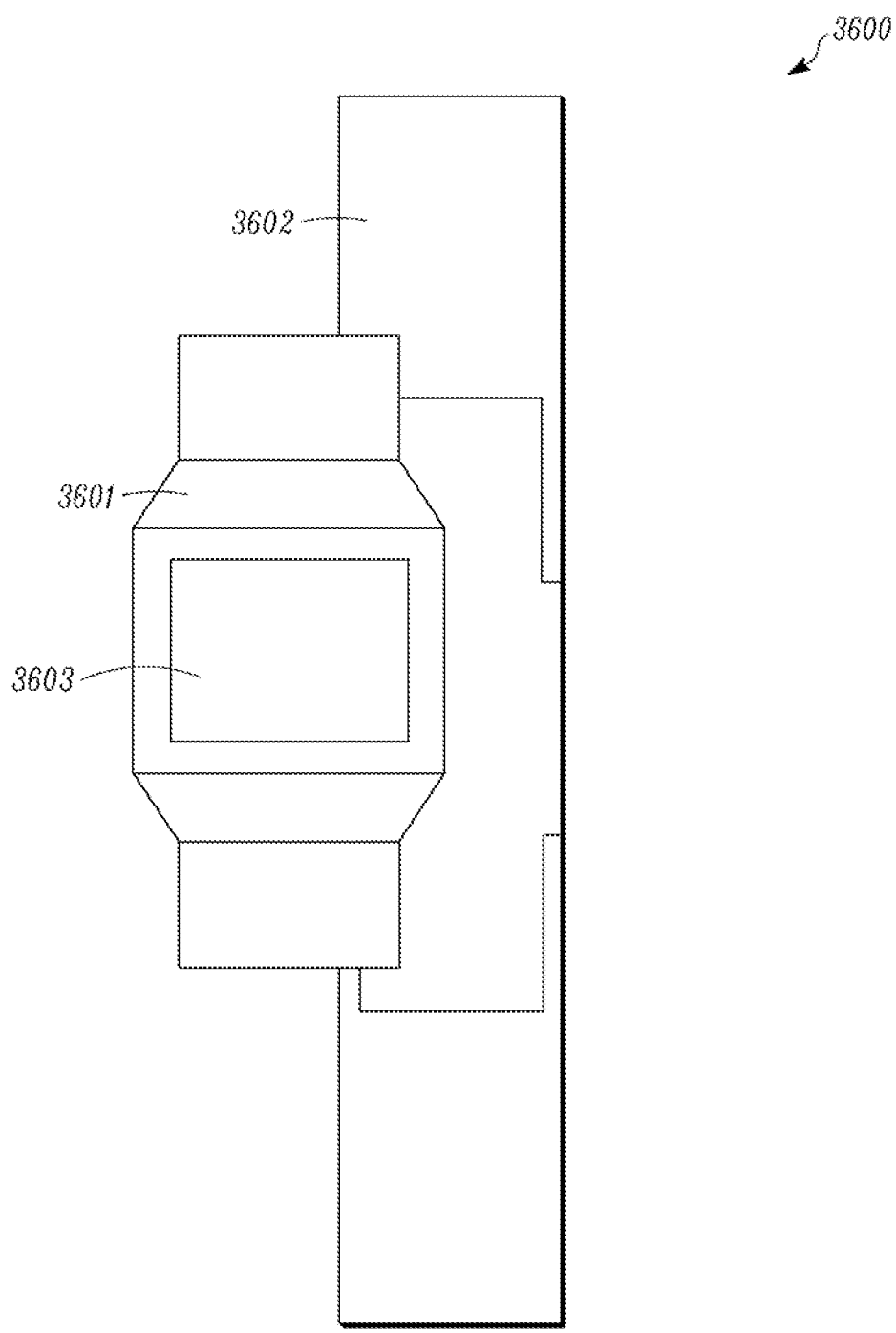
FIG. 36 illustrates an exploded view of one explanatory electronic device with separable components configured in accordance with one or more embodiments of the invention.

Turning now to FIG. 36, illustrated therein is an alternate embodiment of a wearable electronic device 3600 configured in accordance with one or more embodiments of the invention. The explanatory electronic device 3600 of FIG. 36 is configured as a wearable device. In FIG. 36, the electronic device 3600 includes an electronic module 3601 and a strap 3602 that are coupled together to form a wrist wearable device. The illustrative electronic device 3600 of FIG. 36 has a touch sensitive display 3603 that forms a user input operable to detect gesture or touch input, and a control circuit operable with the touch sensitive display 3603.

In one embodiment the electronic device 3600 includes a mobile communication circuit, and thus forms a voice or data communication device, such as a smart phone. Other communication features can be added, including a near field communication circuit for communicating with other electronic devices, as will be shown in FIG. 39 below. Infrared sensors can be provided for detecting gesture input when the user is not "in contact" with the touch sensitive display 3603. One or more microphones can be included for detecting voice or other audible input. The electronic device 3600 of FIG. 36 has an efficient, compact design with a simple user interface configured for efficient operation with one hand (which is advantageous when the electronic device 3600 is worn on the wrist).

In one or more embodiments, in addition to the touch sensitive input functions offered by the touch sensitive display 3603, the electronic device 3600 can be equipped with an accelerometer, disposed either within the electronic module 3601 or the active strap 3602, which is operable with the control circuit for detecting movement. Such a motion detector can also be used as a gesture detection device. Accordingly, when the electronic device 3600 is worn on a wrist, the user can make gesture commands by moving the arm in predefined motions. Additionally, the user can deliver voice commands to the electronic device 3600 via the microphones (where included).

When the touch sensitive display 3603 is configured with a more conventional touch sensor, such as a capacitive sensor having transparent electrodes disposed across the surface of the touch sensitive display 3603, control input can be entered with complex gestures. For instance, in some embodiments a single swiping action across the surface of the touch sensitive display 3603 can be used to scroll through lists or images being presented on the touch sensitive display 3603.

The control circuit of the electronic device 3600 can be configured to execute a number of various functions. In one embodiment, the control circuit is configured to actuate or activate an output device when the electronic device 3600 detects a gesture input received from a user. The gesture input may be detected from contact or motions of a finger or stylus across the touch-sensitive display 3603. In another embodiment, gesture input may be detected from reflections of infrared signals from infrared sensors while the user is making gestures in close proximity to the electronic device 3600. Where the user interface comprises a camera, the gesture input may be detected by capturing successive images of a user making a gesture.

In one embodiment, the electronic device 3600 includes one or more microphones to receive voice input, voice commands, and other audio input. In one embodiment, a single microphone can be used. Optionally, two or more microphones can be included to detect directions from which voice input is being received. For example a first microphone can be located on a first side of the electronic device 3600 for receiving audio input from a first direction. Similarly, a second microphone can be placed on a second side of the electronic device 3600 for receiving audio input from a second direction. The control circuit can then select between the first microphone and the second microphone to detect user input.

In yet another embodiment, gesture input is detected by light. The electronic device 3600 can include a light sensor configured to detect changes in optical intensity, color, light, or shadow in the near vicinity of the electronic device. The light sensor can be configured as a camera or image-sensing device that captures successive images about the device and compares luminous intensity, color, or other spatial variations between images to detect motion or the presence of an object near the user interface. Such sensors can be useful in detecting gesture input when the user is not touching the overall device. In another embodiment, an infrared sensor can be used in conjunction with, or in place of, the light sensor. The infrared sensor can be configured to operate in a similar manner, but on the basis of infrared radiation rather than visible light. The light sensor and/or infrared sensor can be used to detect gesture commands.

Motion detection devices can also be included to detect gesture input. In one embodiment, an accelerometer can be included to detect motion of the electronic device. The accelerometer can also be used to determine the spatial orientation of the electronic device in three-dimensional space by detecting a gravitational direction. In addition to, or instead of, the accelerometer, an electronic compass can be included to detect the spatial orientation of the electronic device relative to the earth's magnetic field. Similarly, the motion detection devices can include one or more gyroscopes to detect rotational motion of the electronic device. The gyroscope can be used to determine the spatial rotation of the electronic device in three-dimensional space. Each of the motion detection devices can be used to detect gesture input.

An audio output can be included to provide aural feedback to the user. For example, one or more loudspeakers can be included to deliver sounds and tones. A motion generation device can be included for providing haptic feedback to a user. For example, a piezoelectric transducer or other electromechanical device can be configured to impart a force upon the wearable electronic device 3600 to provide a thump, bump, vibration, or other physical sensation to the user.

In one embodiment, the electronic module 3601 can be selectively detached from the active strap 3602 so as to be used as a stand alone electronic device. For example, the electronic module 3601 can be detached from the active strap 3602 and worn on a jacket. In this illustrative embodiment, both the active strap 3602 and the electronic module 3601 are "active" devices that include a power source and electronic circuitry and/or hardware. Active devices can include control circuits or processors as well.

In one or more embodiments, the electronic module 3601 can be detached from the active strap 3602 so that it can be coupled with, or can communicate or interface with, other devices. For example, where the electronic module 3601 includes wide area network communication capabilities, such as cellular communication capabilities, the electronic module 3601 may be coupled to a folio or docking device to interface with a tablet-style computer. In this configuration, the electronic module 3601 can be configured to function as a modem or communication device for the tablet-style computer. In such an application, a user may leverage the large screen of the tablet-style computer with the computing functionality of the electronic module 3601, thereby creating device-to-device experiences for telephony, messaging, or other applications. The detachable nature of the electronic module 3601 serves to expand the number of experience horizons for the user.

Figure 37:
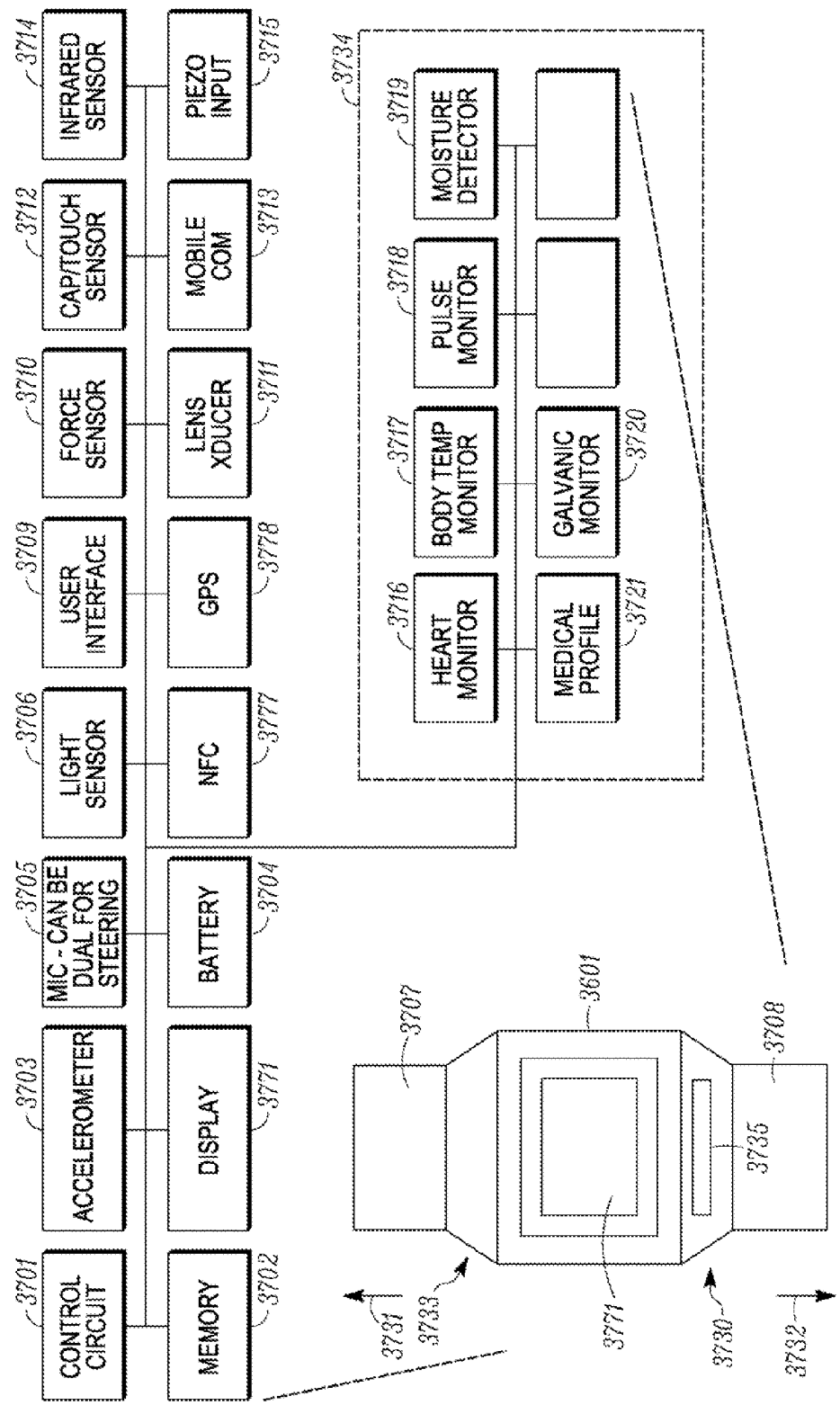
FIG. 37 illustrates a schematic block diagram of one explanatory electronic device configured in accordance with one or more embodiments of the invention.

Turning now to FIG. 37, illustrated are some of the components that can be included with the electronic module 3601 of FIG. 36. It will be clear to those of ordinary skill in the art having the benefit of this disclosure that the components and modules can be used in different combinations, with some components and modules included and others omitted. For altering the presentation orientation of visual output presented on the display 3771, such as in response to a gaze detector or orientation detector as described above, the components of the display system can include a control circuit 3701 and the display 3771. The other components or modules can be included or excluded based upon need or application.

The control circuit 3701 is operable with the display 3771. The control circuit 3701 can be operable with a memory 3702. The control circuit 3701, which may be any of one or more microprocessors, programmable logic, application specific integrated circuit device, or other similar device, is capable of executing program instructions and methods described herein. The program instructions and methods may be stored either on-board in the control circuit 3701, or in the memory 3702, or in other computer readable media coupled to the control circuit 3701. The control circuit 3701 can be configured to operate the various functions of the electronic module 3601, and also to execute software or firmware applications and modules that can be stored in a computer readable medium, such as memory 3702. The control circuit 3701 executes this software or firmware, in part, to provide device functionality. The memory 3702 may include either or both static and dynamic memory components, may be used for storing both embedded code and user data. One suitable example for control circuit 3701 is the MSM7630 processor manufactured by Qualcomm, Inc.

The control circuit 7301 may operate one or more operating systems, such as the Android™ mobile operating system offered by Google, Inc. In one embodiment, the memory 3702 comprises an 8-gigabyte embedded multi-media card (eMMC).

The control circuit 3701 can be configured to alter an operating mode of the electronic module to one of a plurality of functional modes. These functional modes can include a desktop mode, a telephone mode, a wristwatch mode, a health monitoring mode, a clock mode, a calendar mode, a gaming mode, or a media player mode. In one embodiment, the control circuit 3701 selects an operational mode from these functional modes by detecting an angularly displaced orientation of a first electronic module extension 3707, the second electronic module extension 3708, or combinations thereof, each of which can be pivotally attached to the electronic module 3601.

The display 3771 is configured to provide visual output, images, or other visible indicia to a user. In one embodiment, the display 3771 comprises a 1.6 inch organic light emitting diode (OLED) device. In one embodiment, the display 3771 comprises a touch sensor 3712 to form touch sensitive display configured to receive user input across the surface of the display 3771. The display 3771 can also be configured with a force sensor 3710. Where configured with both a touch sensor 3712 and force sensor 3710, the control circuit 3701 can determine not only where the user contacts the display 3771, but also how much force the user employs in contacting the display 3771. Where configured with a force sensor 3710 but no touch sensitive capabilities, the display 3771 can be used as a large "push button" or input control for the electronic module 13601. In one embodiment, the outer lens of the display 3771 can be configured with piezoelectric sensors 3715 or other actuators to be used as both an input device and an acoustic transducer.

The touch sensor 3712 can include a capacitive touch sensor, an infrared touch sensor, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., control circuit 3701 or another display specific control circuit, to detect an object in close proximity with—or touching—the surface of the display 3771 or the housing of the electronic module 3601 by establishing electric field lines between pairs of capacitive sensors and then detecting perturbations of those field lines. The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques.

The force sensor 3710 can take various forms. For example, in one embodiment, the force sensor 3710 comprises resistive switches or a force switch array configured to detect contact with either the display 3771 or the housing of the electronic module 3601. The array of resistive switches can function as a force-sensing layer, in that when contact is made with either the surface of the display 3771 or the housing of the electronic module 3601, changes in impedance of any of the switches may be detected. The array of switches may be any of resistance sensing switches, membrane switches, force-sensing switches such as piezoelectric switches, or other equivalent types of technology. In another embodiment, the force sensor 3710 can be capacitive. In yet another embodiment, piezoelectric sensors 3715 can be configured to sense force as well. For example, where coupled with the lens of the display 3771, the piezoelectric sensors 3715 can be configured to detect an amount of displacement of the lens to determine force. The piezoelectric sensors 3715 can also be configured to determine force of contact against the housing of the electronic module 3601 rather than the display 3771.

A mobile communication circuit 3713 can be included to provide wide area communication capabilities. Where included, the mobile communication circuit 3713 is operable with the control circuit 3701, and is used to facilitate electronic communication with various networks, such as cellular networks, data networks, or the Internet. Note that it is possible to combine the control circuit 3701, the memory 3702, and the mobile communication circuit 7303 into a single device or into devices having fewer parts while retaining the functionality of the constituent parts.

The mobile communication circuit 7313, which may be one of a receiver or transmitter, and may alternatively be a transceiver, operates in conjunction with the control circuit 3701 to electronically communicate through a communication network. For example, in one embodiment, the mobile communication circuit 3713 can configured to communicate through a traditional cellular network, such as a Code Division Multiple Access (CDMA) network or Global System for Mobile communication (GSM) network. Other examples of networks with which the communication circuit may communicate include Push-to-Talk (PTT) networks, proprietary networks, dual band CDMA networks, or Dual Band Universal Mobile Telecommunications System (UMTS) networks, and direct communication networks. The mobile communication circuit 3713 can be configured to provide messaging functionality to the electronic module 3601. In one or more embodiments, the detachable electronic module can communicate with one or more social networking applications through the mobile communication circuit 3713 as well. News feeds and other data can be received through the mobile communication circuit 3713. Moreover, context and location sensitive notifications can be sent and received via the mobile communication circuit 3713.

A battery 3704 or other energy source can be included to provide power for the various components of the electronic module 3601. While a battery 3704 is shown in FIG. 37, it will be obvious to those of ordinary skill in the art having the benefit of this disclosure that other energy storage deices can be used instead of the battery 3704, including a fuel container or an electrochemical capacitor. The battery 3704 can include a lithium ion cell or a nickel metal hydride cell, such cells having reasonably large energy capacity, wide operating temperature range, large number of charging cycles, and long useful life. The battery 3704 may also include over voltage and over current protection and charging circuitry. In one embodiment, the electronic module 3601 includes two batteries, with a battery being stored in each of the electronic module extensions 3707,3708. In one embodiment, the battery 3704 is configured as an 800 mAh lithium polymer cell.

One or more microphones 3705 can be included to receive voice input, voice commands, and other audio input. A single microphone can be included. Optionally, two or more microphones can be included for selective beam steering. For example a first microphone can be located on a first side 3730 of the electronic module 3601 for receiving audio input from a first direction 3732. Similarly, a second microphone can be placed on a second side 3733 of the electronic module 3601 for receiving audio input from a second direction 3731. As described above, an infrared sensor 3714, light sensor 3706, or other sensor can be used as an orientation detector configured to detect a direction in which a user is located. The control circuit 3701 can then select between the first microphone and the second microphone to beam steer audio reception toward the user. Alternatively, the control circuit 3701 processes and combines the signals from two or more microphones to perform beam steering. The one or more microphones 3705 can be used for voice commands. When altering the presentation orientation of information presented on the display, the one or more microphones 3705 can be configured to be responsive to the control circuit 3701. Accordingly, the control circuit 3701 can switch between microphones upon altering the presentation orientation in response to the user input.

A light sensor 3706 is configured to detect changes in optical intensity, color, light, or shadow in the near vicinity of the electronic module 3601. For example, the light sensor 3706 can be configured as an image sensing device that captures successive images about the device and compares luminous intensity, color, or other spatial variations between images to detect motion or the presence of an object near the electronic module 3601. Such sensors can be useful in determining at which side of the electronic module 3601 a user is standing. An infrared sensor 3714 can be used in conjunction with, or in place of, the light sensor 3706. The infrared sensor 3714 can be configured to operate in a similar manner, but on the basis of infrared radiation rather than visible light. The light sensor 3706 and/or infrared sensor 3714 can be as an orientation detector as described above.

A near field communication circuit 3777 can be included for communication with local area networks. Examples of suitable near field communication circuits include Bluetooth communication circuits, IEEE 801.11 communication circuits, infrared communication circuits, magnetic field modulation circuits, and Wi-Fi circuits.

A global positioning system device 3778 can be included for determining where the electronic module 3601 is located. (Note that the global positioning system device 3778 can also be used to determine the spatial orientation of the electronic module 3601 in three-dimensional space by determining the change in position of the device relative to the earth.) The global positioning system device 3778 is configured for communicating with a constellation of earth orbiting satellites or a network of terrestrial base stations to determine an approximate location. Examples of satellite positioning systems suitable for use with embodiments of the present invention include, among others, the Navigation System with Time and Range (NAVSTAR) Global Positioning Systems (GPS) in the United States of America, the Global Orbiting Navigation System (GLONASS) in Russia, and other similar satellite positioning systems. The satellite positioning systems based location fixes of the global positioning system device 308 autonomously or with assistance from terrestrial base stations, for example with assistance from a cellular communication network or other ground based network, or as part of a Differential Global Positioning System (DGPS), as is well known by those having ordinary skill in the art. While a global positioning system device 3778 is one example of a location determination module, it will be clear to those of ordinary skill in the art having the benefit of this disclosure that other location determination devices, such as electronic compasses or gyroscopes, could be used as well.

A user interface 3709 can be included. As noted above, in one embodiment, the display 3771 is configured as a touch sensitive display, and accordingly functions as a user interface in and of itself However, some applications will be better served with additional user interface components as well. The user interface 3709, where included, can be operable with the control circuit 3701 to deliver information to, and receive information from, a user. The user interface 3709 can include a keypad 3735, navigation devices, joysticks, rocker switches, slider pads, buttons, or other controls, and optionally a voice or touch command interface. These various components can be integrated together.

In one or more embodiments, the lens of the display 3771 can be configured as a lens transducer 3711 to deliver audio output to a user. Piezoelectric transducers can be operably disposed with a lens of the display 3771. Actuation of the piezoelectric transducers can cause the lens of the display 3771 to vibrate, thereby emitting acoustic output.

An accelerometer 3703 can be included to detect motion of the electronic module 3601. The accelerometer 3703 can also be used to determine the spatial orientation of the electronic module 3601 in three-dimensional space by detecting a gravitational direction. In addition to, or instead of, the accelerometer 3703, an electronic compass can be included to detect the spatial orientation of the electronic module 3601 relative to the earth's magnetic field. Similarly, one or more gyroscopes can be included to detect rotational motion of the electronic module 3601. The gyroscope can be used to determine the spatial rotation of the electronic module 3601 in three-dimensional space.

Where the electronic module 3601 is configured as a wellness device, or is capable of operating in a health monitoring mode or physical safety device, one or more wellness sensors 3734 can be included as well. For example, a heart monitor 3716 can be configured to employ EKG or other sensors to monitor a user's heart rate. The heart monitor 3716 can include electrodes configured to determine action potentials from the skin of a user. A temperature monitor 3717 can be configured to monitor the temperature of a user. A pulse monitor 3718 can be configured to monitor the user's pulse. The pulse monitor 3718 lends itself to the wristwatch configuration of the electronic device 3600 because the wrist serves as an advantageous location from which to measure a person's pulse.

A moisture detector 3719 can be configured to detect the amount of moisture present on a person's skin. The moisture detector 3719 can be realized in the form of an impedance sensor that measures impedance between electrodes. As moisture can be due to external conditions, e.g., rain, or user conditions, perspiration, the moisture detector 3719 can function in tandem with ISFETS configured to measure pH or amounts of NaOH in the moisture or a galvanic sensor 3720 to determine not only the amount of moisture, but whether the moisture is due to external factors, perspiration, or combinations thereof.

The medical history of a user, as well as the determinations made by the various wellness sensors 3734, can be stored in a medical profile 3721. Periodic updates can be made to the medical profile 3721 as well. The medical profile 3721 can be a module operable with the control circuit 3701. Such modules can be configured as sets of instructions stored in the memory 3702 that are usable by the control circuit 3701 to execute the various wellness monitoring functions of the electronic module 3601. Alternatively, the modules could be configured in hardware, such as through programmable logic. The wellness sensors 3734 shown in FIG. 37 are illustrative only. Embodiments of the present invention may use various combinations of wellness sensors 3734, including subsets of the wellness sensors 3734 shown in FIG. 37. Further, other modules may be added to further increase device functionality. The wellness sensors 3734 can be used to provide the user with a sensor-based health and wellness data assessment. The wellness sensors 3734 can be used in conjunction with the medical profile 3721 to provide context sensitive recommendations on the display 3771.

Figure 38:
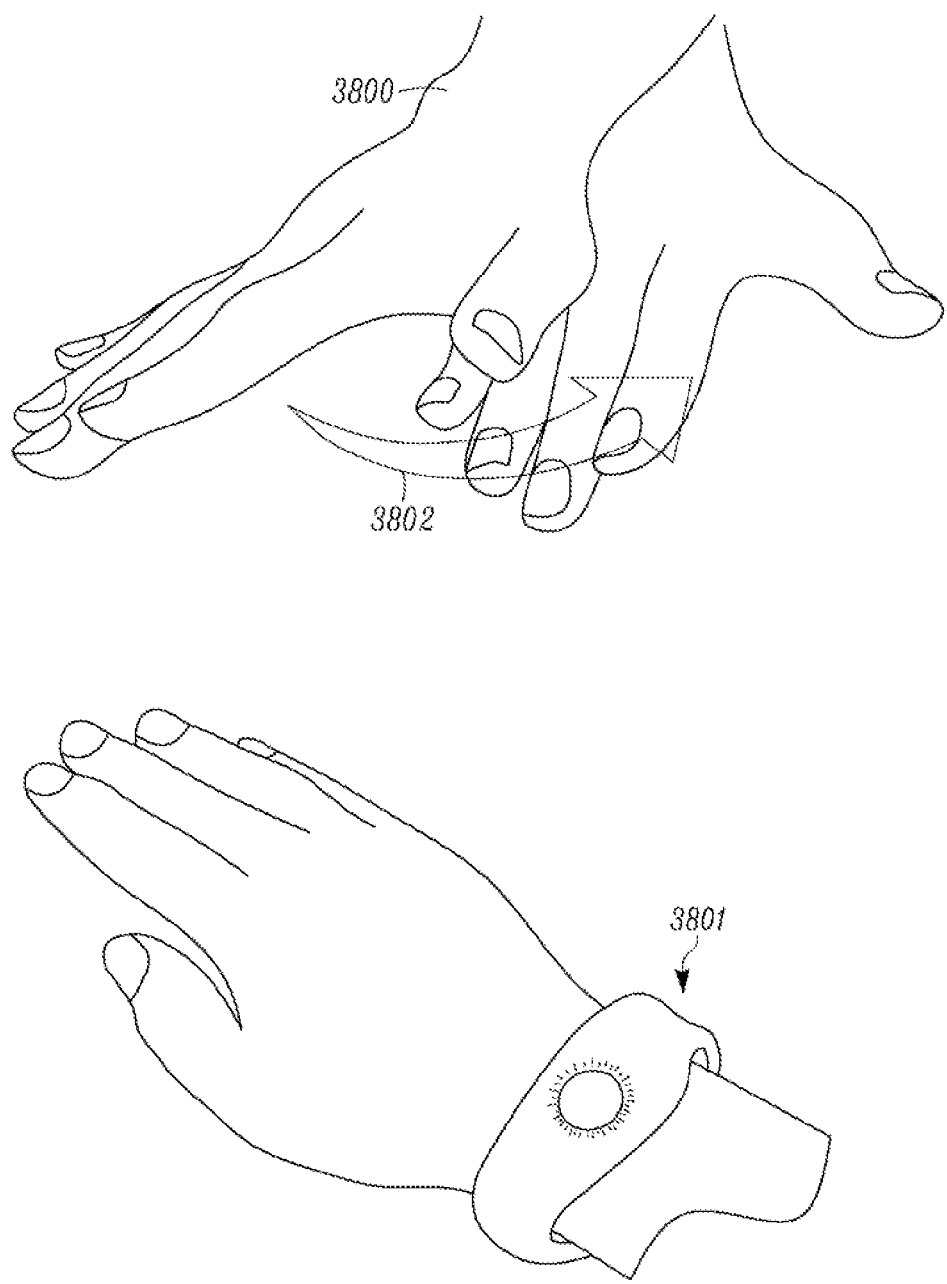
FIG. 38 illustrates one explanatory wearable electronic device having gesture detection capabilities configured in accordance with one or more embodiments of the invention.

Turning now to FIG. 38, illustrated therein is a user 3800 delivering gesture input 3802 to a wearable electronic device 3801. Recall from FIGS. 15, 18-19, and 26-27 that touch input can be used in conjunction with both gaze detectors and orientation detectors. Where the wearable electronic device 3801 is configured to receive gesture input 3802, the gesture input 3802 can be used in conjunction with, or instead of, the touch input described above to perform the touch input functions set forth above.

Figure 39:
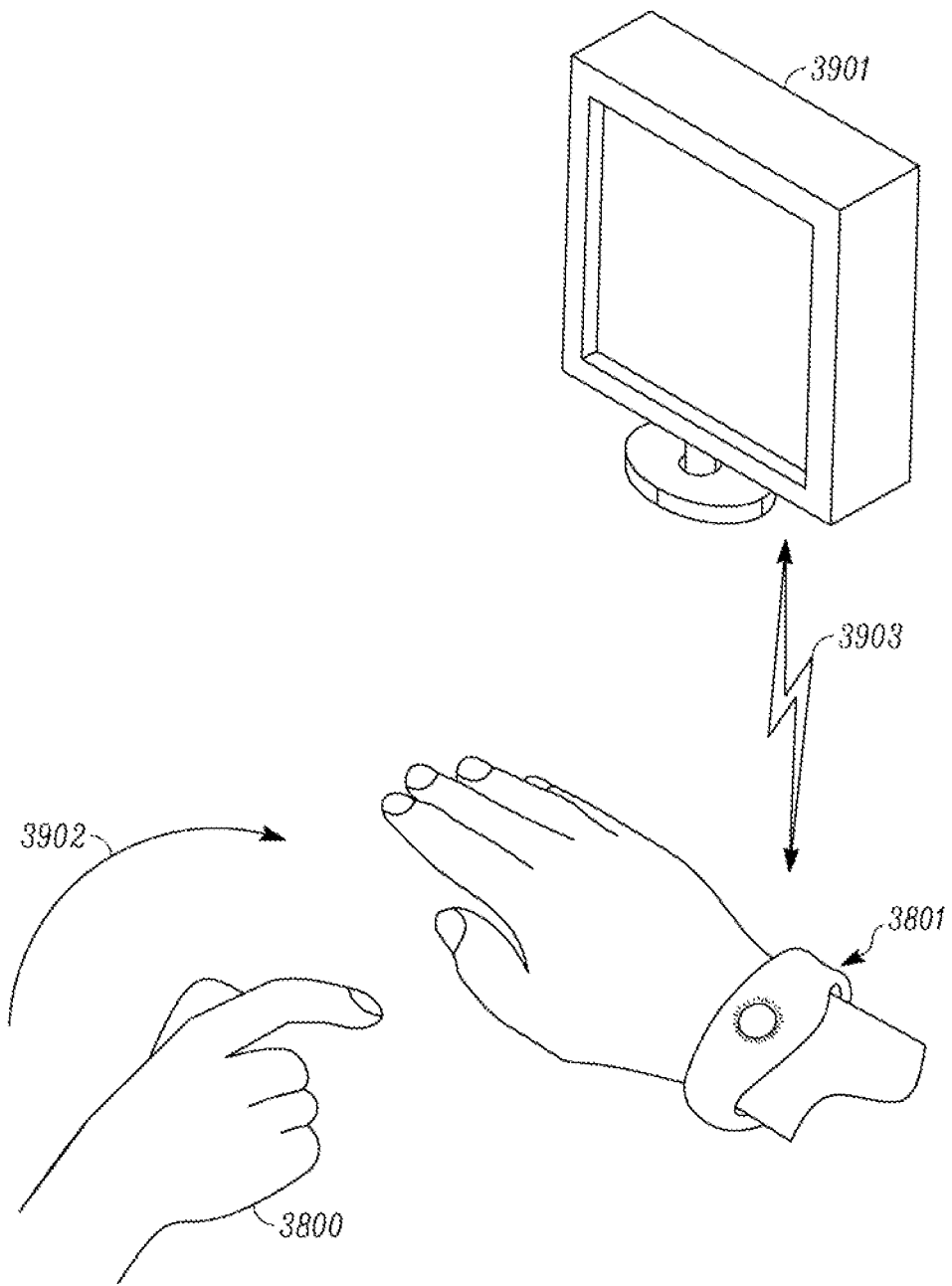
FIG. 39 illustrates another explanatory wearable electronic device having gesture detection capabilities configured in accordance with one or more embodiments of the invention.

Turning now to FIG. 39, illustrated therein is another feature that can be achieved when the wearable electronic device 3801 is configured to receive gesture input 3902. As shown in FIG. 39, a user 3800 is making gesture input 3902 to control the device. Gaze input and orientation input, described in detail above, can also be used as control inputs.

In FIG. 39, the wearable electronic device 3900 is in communication with a remote electronic device 3901. The wearable electronic device can accordingly use gesture input 3902, gaze input, or orientation detection input to control the remote electronic device 3901. For example, the user 3800 can employ gaze input, orientation input, and gesture input 3902 to control a presentation occurring on the remote electronic device 3901 using the wearable electronic device 3801. The wearable electronic device 3801, which includes near field communication circuitry capable of sending one or more control signals 3903 corresponding to the gaze, orientation, or gesture input to the remote electronic device 3901, allows the user to control the remote electronic device 3901 with a mere gaze. Where the remote electronic device 3901 is a projection screen capable of being viewed by an audience, the user can simply gaze upon the wearable electronic device 3801 to "magically" control images projected on the remote electronic device 3901.

Figure 40:
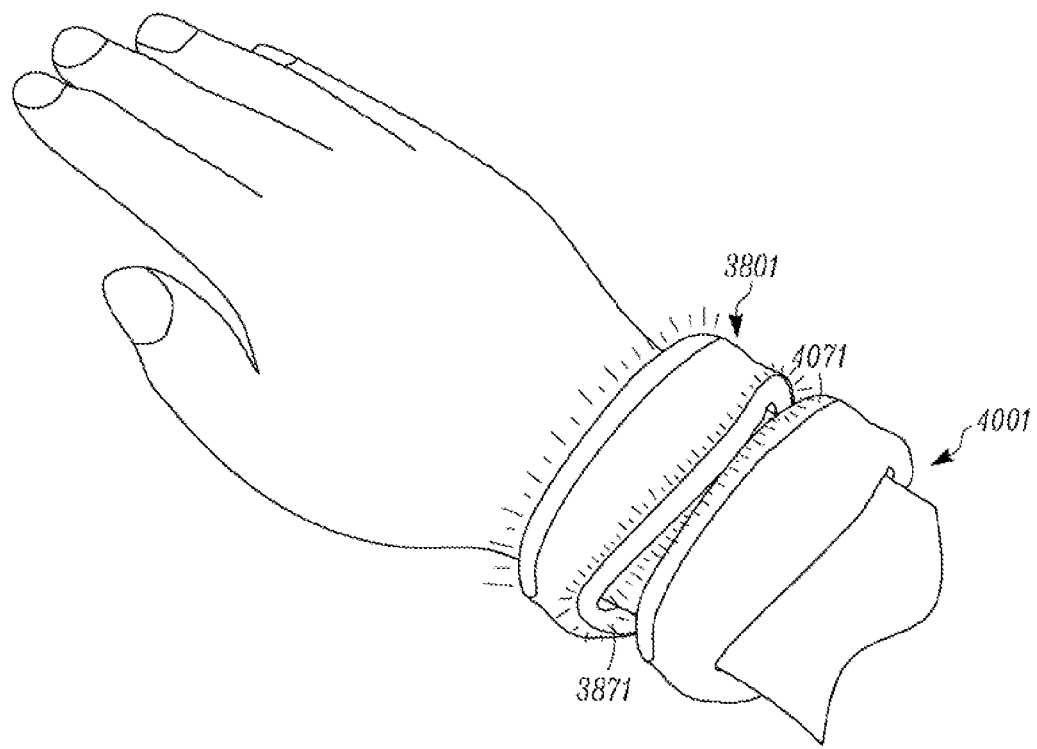
FIG. 40 illustrates a user wearing two explanatory wearable electronic devices operating in tandem in accordance with one or more embodiments of the invention.

Turning now to FIG. 40, illustrated therein are two wearable electronic devices 3801,4001, each including near field communication circuitry capable of sending one or more control signals to the other wearable device. As they are being worn on the same appendage of a user, they can communicate to intelligently expand the available display area. For example, as shown in FIG. 40, display 3871 of wearable electronic device 3801 is being used with display 4071 of wearable electronic device 4001 to form a "common" display. In addition to providing a common display, the wearable electronic devices 3801,4001 can communicate in other ways as well. For example, in one embodiment they can preclude presenting the same information on their displays. In another embodiment, they can extend the information so that the data flows from one display to another.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A wearable electronic device, comprising:
   a flexible housing configured to enfold about an appendage of a user;
   a touch-sensitive display coupled to the flexible housing;
   a gaze detector configured to determine a gaze cone; and
   a control circuit, operable with the touch-sensitive display and the gaze detector, and configured to output a first presentation of data for display at the touch-sensitive display,
   wherein, responsive to the gaze detector determining the gaze cone, the control circuit is configured to alter the first presentation of the data outputting a second presentation of the data for display only at portions of the touch-sensitive display disposed within the gaze cone, and
   wherein after outputting the second presentation of the data and responsive to detecting a touch input at the touch-sensitive display, the control circuit is further configured to override the second presentation of the data by outputting a third presentation of the data in which the data at the portions of the touch-sensitive display that were disposed within the gaze cone in the second presentation are displayed at a location of the touch-sensitive display corresponding to the touch input such that the data is no longer output for display only at the portions of the touch-sensitive display disposed within the gaze cone.

2. The wearable electronic device of claim 1, wherein while outputting the second presentation of data for display, the control circuit is configured to turn other portions of the touch-sensitive display not disposed within the gaze cone to a low-power, sleep, or OFF mode.

3. The wearable electronic device of claim 1, wherein the control circuit is configured to alter the first presentation of the data by one of rotating the data based upon a detected gaze direction, moving the data at the touch-sensitive display based upon the detected gaze direction, or combinations thereof.

4. The wearable electronic device of claim 1, wherein the control circuit is further configured to additionally alter the first presentation of the data responsive to detecting the touch input at the touch-sensitive display.

5. The wearable electronic device of claim 1, wherein the control circuit is configured to configure the touch-sensitive display in a first operational mode responsive to detecting that the flexible housing is enfolded about the appendage of the user, and to configure the touch-sensitive display in a second operational mode responsive to detecting that the flexible housing is elongated.

6. A method comprising:
outputting, by a control circuit of a wearable electronic device and for display at a touch-sensitive display of the wearable electronic device, a first presentation of data;
responsive to a gaze detector of the wearable electronic device determining a gaze cone, altering, by the control circuit, the first presentation of the data by outputting a second presentation of the data for display only at portions of the touch-sensitive display disposed within the gaze cone; and
after outputting the second presentation of the data and responsive to detecting a touch input at the touch-sensitive display, overriding, by the control circuit, the second presentation of the data by outputting a third presentation of the data in which the data at the portions of the touch-sensitive display that were disposed within the gaze cone in the second presentation are displayed at a location of the touch-sensitive display corresponding to the touch input such that the data is no longer output for display only at the portions of the touch-sensitive display disposed within the gaze cone.

7. The method of claim 6, further comprising:
while outputting the second presentation of the data for display, turning other portions of the touch-sensitive display not disposed within the gaze cone to a low-power, sleep, or OFF mode.

8. The method of claim 6, wherein altering the first presentation of the data comprises one of rotating the data based upon a detected gaze direction, moving the data on the touch-sensitive display based upon the detected gaze direction, or combinations thereof.

9. The method of claim 6, further comprising:
responsive to detecting that a flexible housing of the wearable electronic device is enfolded about an appendage of a user, configuring the touch-sensitive display in a first operational mode; and
responsive to detecting that the flexible housing is elongated, configuring the touch-sensitive display in a second operational mode.

* * * * *